US012699758B2

(12) United States Patent
Takahashi et al.

(10) Patent No.: US 12,699,758 B2
(45) Date of Patent: Aug. 4, 2026

(54) INFORMATION PROCESSING SYSTEM, INFORMATION PROCESSING APPARATUS AND METHOD, STORAGE CASE AND INFORMATION PROCESSING METHOD, AND PROGRAM

(71) Applicant: Sony Group Corporation, Tokyo (JP)

(72) Inventors: Kei Takahashi, Tokyo (JP); Yudai Kato, Chiba (JP); Keita Sekijima, Tokyo (JP); Riho Sato, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/699,088

(22) PCT Filed: Oct. 14, 2022

(86) PCT No.: PCT/JP2022/038305
§ 371 (c)(1),
(2) Date: Apr. 5, 2024

(87) PCT Pub. No.: WO2023/063407
PCT Pub. Date: Apr. 20, 2023

(65) Prior Publication Data
US 2024/0330425 A1 Oct. 3, 2024

(30) Foreign Application Priority Data

Oct. 14, 2021 (JP) ................................. 2021-168501
Sep. 1, 2022 (WO) .................. PCT/JP2022/032917

(51) Int. Cl.
*G06F 21/32* (2013.01)
*G06F 3/01* (2006.01)
(Continued)

(52) U.S. Cl.
CPC .............. *G06F 21/32* (2013.01); *G06F 3/017* (2013.01); *G06F 3/167* (2013.01); *H04R 1/1041* (2013.01)

(58) Field of Classification Search
CPC .......... G06F 21/32; G06F 3/017; G06F 3/167; H04R 1/1041
See application file for complete search history.

(56) References Cited

U.S. PATENT DOCUMENTS 10,623,845 B1 * 4/2020 Kim ........................ H04R 25/50
2009/0296951 A1 * 12/2009 De Haan ................. G06F 3/017
381/74

(Continued)

FOREIGN PATENT DOCUMENTS

CN 104581480 A 4/2015
CN 111741390 A 10/2020
(Continued)

OTHER PUBLICATIONS

PCT/JP2022/038305, Jan. 10, 2023, International Search Report.
(Continued)

*Primary Examiner* — Stephen T Gundry
(74) *Attorney, Agent, or Firm* — Wolf, Greenfield & Sacks, P.C.

(57) ABSTRACT

Described herein is an information processing system, an information processing apparatus and method, a storage case and an information processing method, and a program capable of recognizing a tap operation with high accuracy in a short time.
An information processing apparatus worn on one ear of a user, the information processing apparatus including: a sensor that performs measurement related to vibration; a communication unit that transmits an intensity value of vibration obtained from an output of the sensor to another information processing apparatus worn on another ear of the
(Continued)

user, and receives the intensity value detected by the another information processing apparatus from the another information processing apparatus; and a control unit that detects a tap operation on the basis of the intensity value obtained from the output of the sensor and the intensity value received from the another information processing apparatus. The present technology can be applied to headphones.

12 Claims, 53 Drawing Sheets

(51) Int. Cl.
G06F 3/16 (2006.01)
H04R 1/10 (2006.01)

(56) References Cited

U.S. PATENT DOCUMENTS

| | | | | |
|---|---|---|---|---|
| 2010/0310087 | A1* | 12/2010 | Ishida | H04R 1/1041 |
| | | | | 381/74 |
| 2011/0144779 | A1* | 6/2011 | Janse | H04M 1/026 |
| | | | | 700/94 |
| 2011/0249824 | A1 | 10/2011 | Asada et al. | |
| 2014/0050327 | A1* | 2/2014 | Asada | H04R 29/00 |
| | | | | 381/56 |
| 2015/0173686 | A1* | 6/2015 | Furuta | A61B 5/681 |
| | | | | 600/301 |
| 2016/0261676 | A1* | 9/2016 | Nishimoto | H04L 67/06 |
| 2017/0102917 | A1* | 4/2017 | Park | G02B 27/0179 |
| 2017/0255447 | A1* | 9/2017 | Sendai | G06F 3/011 |
| 2018/0085051 | A1* | 3/2018 | Kawashima | A61B 5/6892 |
| 2018/0124255 | A1* | 5/2018 | Kawamura | G06F 3/0346 |
| 2018/0242069 | A1 | 8/2018 | Hviid et al. | |
| 2018/0271428 | A1* | 9/2018 | Takagi | A61B 5/4064 |
| 2019/0230450 | A1* | 7/2019 | Aase | H04R 25/405 |
| 2020/0245057 | A1* | 7/2020 | Igarashi | H04R 3/04 |
| 2020/0257380 | A1* | 8/2020 | Hiroi | G06F 3/018 |
| 2020/0321792 | A1 | 10/2020 | Rhee et al. | |
| 2020/0336820 | A1 | 10/2020 | Tasaka | |
| 2021/0306732 | A1* | 9/2021 | Akaike | H04R 5/033 |
| 2023/0059427 | A1* | 2/2023 | Yin | H04R 5/033 |
| 2023/0116597 | A1* | 4/2023 | Yamamoto | H04R 1/1041 |
| | | | | 381/71.2 |
| 2023/0143234 | A1* | 5/2023 | Takatsuka | A61B 5/378 |
| | | | | 726/16 |
| 2023/0161411 | A1* | 5/2023 | Takatsuka | A61B 5/6815 |
| | | | | 345/156 |
| 2023/0254626 | A1* | 8/2023 | Yamamoto | G10K 11/17827 |
| | | | | 381/74 |
| 2023/0409688 | A1* | 12/2023 | Koshinaka | G06F 21/32 |
| 2024/0160709 | A1* | 5/2024 | Miyahara | G06F 21/32 |
| 2024/0233743 | A1* | 7/2024 | Kotani | G10L 17/02 |
| 2024/0257828 | A1* | 8/2024 | Tokozume | H04R 1/1091 |
| 2024/0289088 | A1* | 8/2024 | Zhu | H03G 7/00 |
| 2024/0295925 | A1* | 9/2024 | Yokoyama | G06F 1/163 |
| 2024/0303018 | A1* | 9/2024 | Takamizawa | G09G 5/393 |
| 2024/0311458 | A1* | 9/2024 | Miyahara | H04R 1/10 |
| 2024/0338075 | A1* | 10/2024 | Esaka | G06F 3/01 |
| 2025/0093955 | A1* | 3/2025 | Yamano | G06F 3/01 |
| 2025/0190073 | A1* | 6/2025 | Kawamae | A61B 5/4064 |

FOREIGN PATENT DOCUMENTS

| | | |
|---|---|---|
| CN | 112449264 A | 3/2021 |
| CN | 112469010 A | 3/2021 |
| EP | 4 021 036 A1 | 6/2022 |
| EP | 4 027 653 A1 | 7/2022 |
| JP | 2011-221702 A | 11/2011 |
| JP | 2020-042799 A | 3/2020 |
| KR | 20200117461 A | 10/2020 |
| WO | WO 2012/124776 A1 | 9/2012 |
| WO | WO 2019/082527 A1 | 5/2019 |
| WO | WO 2019/087428 A1 | 5/2019 |

OTHER PUBLICATIONS

International Search Report and English translation thereof mailed Jan. 10, 2023 in connection with International Application No. PCT/JP2022/038305.

Miura, Convenient usage of "AirPods"—Different double-tap operation for left and right, countermeasures in case of loss, etc. Kakaku. com magazine, Aug. 16, 2018:10. Retrieved from the Internet <https://kakakumag.com/av-kaden/?id=12604> (last retrieval date Nov. 15, 2022).

Nishikawa, Double tap to fast forward and rewind YouTube videos. Efficiency of iPad becomes improved! Convenience technique, IN: ISBN: 978-4-86636-435-3, Jun. 1, 2020:p. 230.

* cited by examiner

FUNCTIONS CALLED BY
RIGHT EAR CONTINUOUS HITS

⦿ VOLUME
ADJUSTMENT

◯ EXTERNAL SOUND
AMPLIFICATION

◯ ALERT NOTIFICATION

Q161

VOLUME RANGE
TO BE ADJUSTED

MAXIMUM
VALUE

MINIMUM
VALUE

Q162

SPEED OF CONTINUOUS HITS

SHORTISH     LONGISH

Figure 39:
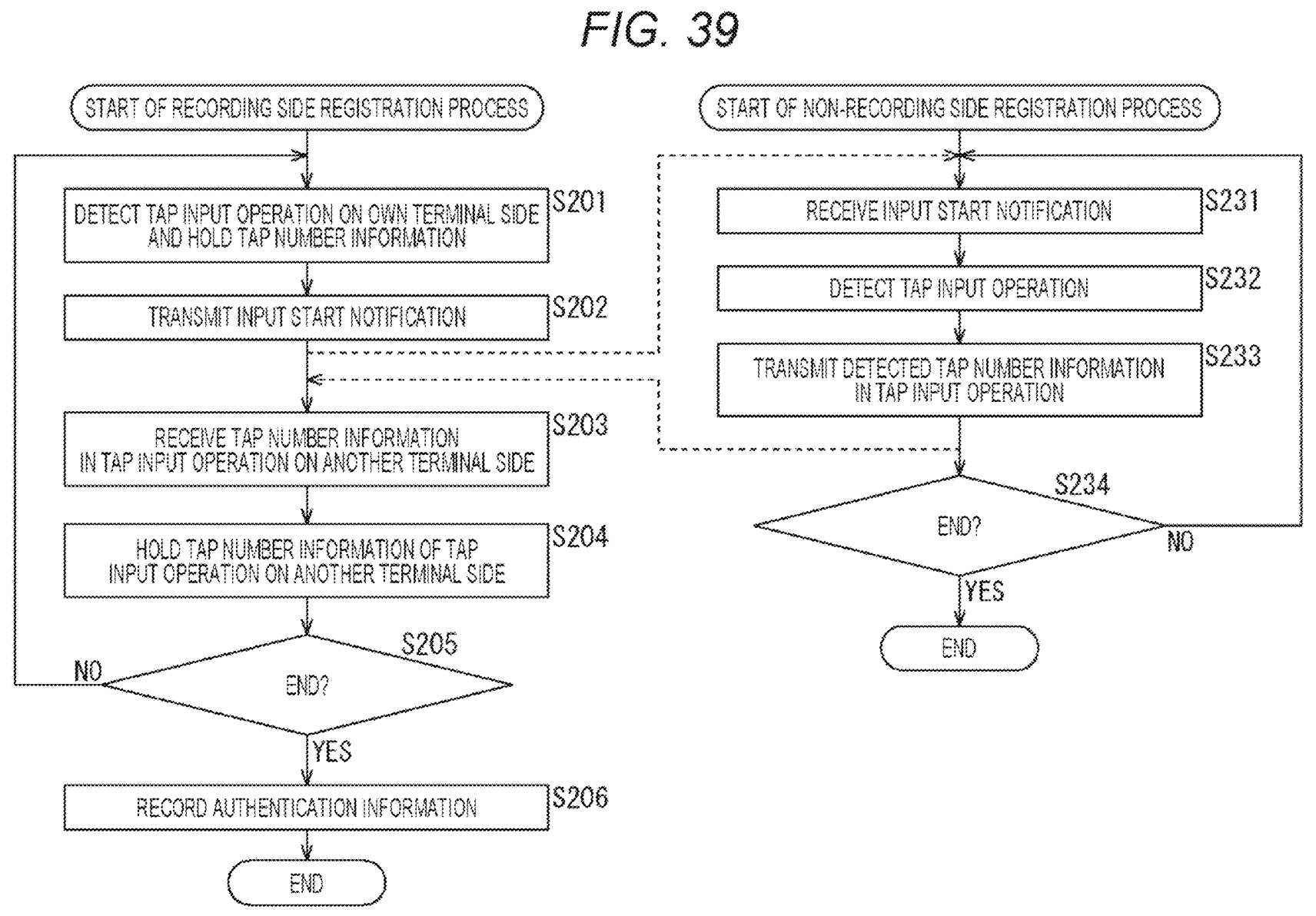

START OF NON-RECORDING SIDE REGISTRATION PROCESS

RECEIVE INPUT START NOTIFICATION — S231

DETECT TAP INPUT OPERATION — S232

TRANSMIT DETECTED TAP NUMBER INFORMATION IN TAP INPUT OPERATION — S233

END? — S234

NO

YES

END

START OF RECORDING SIDE REGISTRATION PROCESS

DETECT TAP INPUT OPERATION ON OWN TERMINAL SIDE AND HOLD TAP NUMBER INFORMATION — S201

TRANSMIT INPUT START NOTIFICATION — S202

RECEIVE TAP NUMBER INFORMATION IN TAP INPUT OPERATION ON ANOTHER TERMINAL SIDE — S203

HOLD TAP NUMBER INFORMATION OF TAP INPUT OPERATION ON ANOTHER TERMINAL SIDE — S204

END? — S205

NO

YES

RECORD AUTHENTICATION INFORMATION — S206

END

*FIG. 40*

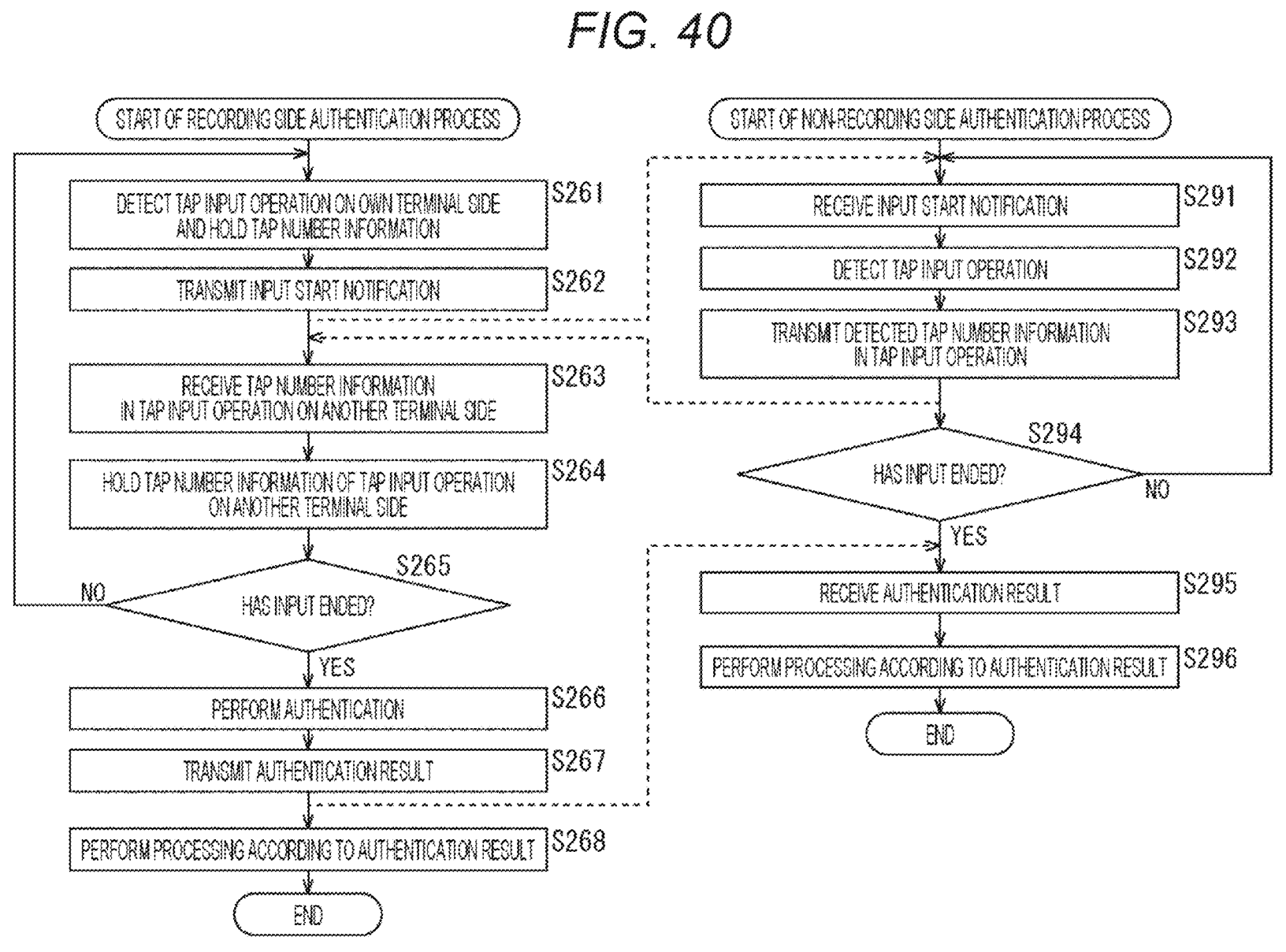

START OF NON-RECORDING SIDE AUTHENTICATION PROCESS

RECEIVE INPUT START NOTIFICATION — S291

DETECT TAP INPUT OPERATION — S292

TRANSMIT DETECTED TAP NUMBER INFORMATION IN TAP INPUT OPERATION — S293

HAS INPUT ENDED? — S294
NO
YES

RECEIVE AUTHENTICATION RESULT — S295

PERFORM PROCESSING ACCORDING TO AUTHENTICATION RESULT — S296

END

START OF RECORDING SIDE AUTHENTICATION PROCESS

DETECT TAP INPUT OPERATION ON OWN TERMINAL SIDE AND HOLD TAP NUMBER INFORMATION — S261

TRANSMIT INPUT START NOTIFICATION — S262

RECEIVE TAP NUMBER INFORMATION IN TAP INPUT OPERATION ON ANOTHER TERMINAL SIDE — S263

HOLD TAP NUMBER INFORMATION OF TAP INPUT OPERATION ON ANOTHER TERMINAL SIDE — S264

HAS INPUT ENDED? — S265
NO
YES

PERFORM AUTHENTICATION — S266

TRANSMIT AUTHENTICATION RESULT — S267

PERFORM PROCESSING ACCORDING TO AUTHENTICATION RESULT — S268

END

| DATA THAT CAN BE ACQUIRED IN EDGE REGION | DEVICE DATA |
| | USE HISTORY DATA |
| | PERSONALIZED DATA |
| | BIOMETRIC DATA |
| | EMOTIONAL DATA |
| | APPLICATION DATA |
| | FITTING DATA |
| | PREFERENCE DATA |
| | ... |

| Headphones/TWS | OTC-Hearing Aid | HEARING AID |
|---|---|---|
| NORMAL LISTENER | PEOPLE WITH MILD/MODERATE HEARING LOSS | PEOPLE WITH SEVERE HEARING LOSS |

INFORMATION PROCESSING SYSTEM, INFORMATION PROCESSING APPARATUS AND METHOD, STORAGE CASE AND INFORMATION PROCESSING METHOD, AND PROGRAM

CROSS-REFERENCE TO RELATED APPLICATIONS

This application claims the benefit under 35 U.S.C. § 371 as a U.S. National Stage Entry of International Application No. PCT/JP2022/038305, filed in the Japanese Patent Office as a Receiving Office on Oct. 14, 2022, which claims priority to Application No. PCT/JP2022/032917, filed in the Japanese Patent Office as a Receiving Office on Sep. 1, 2022, and Japanese Patent Application Number JP2021-168501, filed in the Japanese Patent Office on Oct. 14, 2021, each of which is hereby incorporated by reference in its entirety.

TECHNICAL FIELD

The present technology relates to an information processing system, an information processing apparatus and method, a storage case and an information processing method, and a program, and more particularly, to an information processing system, an information processing apparatus and method, a storage case and an information processing method, and a program capable of recognizing a tap operation with high accuracy in a short time.

BACKGROUND ART

For example, when an acceleration sensor is mounted on an inner-ear headphone, it is possible to detect vibration when a user taps a face in the headphone.

Therefore, the user can operate the headphones without performing a tap operation aiming at a small headphone main body. Furthermore, it is also possible to assign different functions to the tap operation on the headphone main body and the tap operation on the face.

On the other hand, the vibration when the user taps the face is similar to various noises.

For example, vibration at the time of tapping on the face is similar to vibration at the time of walking, vibration of chewing, and vibration at the time of reproducing sound from headphones, and it is necessary to separate the vibration from these vibrations.

Furthermore, when the acceleration sensor is mounted on each of the terminals of the headphones worn on the left and right ears, it is also possible to change the function assigned for each location (place) tapped by the user.

For example, the calling function can be changed depending on a case where the user taps around the left ear or a case where the user taps around the right ear.

In such a case, for example, when the user strongly taps the left ear, the right ear and its periphery also vibrate through the head. Therefore, since the headphone may detect the tap operation on the left and right at the same time to cause an erroneous operation, it is necessary to prevent such an erroneous operation.

Moreover, for example, a technology has also been proposed in which a sensor is mounted on each of terminals of headphones worn on left and right ears, and a gesture performed by a user is determined using the sensors (See, for example, Patent Document 1).

CITATION LIST

Patent Document

Patent Document 1: WO 2019/082527 A

SUMMARY OF THE INVENTION

Problems to be Solved by the Invention

By the way, in particular, recognition of a tap operation on left and right separate headphones including terminals worn on the left and right ears will be considered.

Each of terminals worn on the left and right ears is provided with an acceleration sensor, a processing device such as a central processing unit (CPU), and a sound reproducing device, and the left and right terminals are connected by a wireless communication path such as Bluetooth (registered trademark) or near field magnetic induction (NFMI).

Furthermore, when the user taps a periphery of the ear of the head on which the terminal of the headphone is worn, the terminal detects vibration by the acceleration sensor and operates a device such as a portable player wirelessly connected to the terminal. At this time, for example, the user is notified that the tap operation has been detected by reproducing a sound effect from the device body with a headphone (terminal).

In the detection of the tap operation by the user, the detection accuracy can be improved by using an output value of the acceleration sensor of the terminal on a right ear side and an output value of the acceleration sensor of the terminal on a left ear side. This is because only one of the left and right ears greatly vibrates in the tap operation of the user, but many noises are simultaneously transmitted to the left and right ears. For example, the entire head vibrates during walking or chewing.

On the other hand, in order to always synchronously recognize the data of the left ear side and the right ear side, it is necessary to transmit the data between the left and right terminals. However, when the data is always transmitted, power consumption increases, or a bit rate necessary for communication for music reproduction cannot be maintained.

Moreover, when communication time between the left and right terminals becomes long, the time from when the user performs a tap operation until there is a reaction to the tap operation becomes long, and comfortable operation experience is inhibited.

In the above-described technology, it is difficult to recognize a tap operation with high accuracy in a short time.

The present technology has been made in view of such a situation, and makes it possible to recognize a tap operation with high accuracy in a short time.

Solutions to Problems

An information processing apparatus according to a first aspect of the present technology is an information processing apparatus worn on one ear of a user, the information processing apparatus including: a sensor that performs measurement related to vibration; a communication unit that transmits an intensity value of vibration obtained from an output of the sensor to another information processing apparatus worn on another ear of the user, and receives the intensity value detected by the another information processing apparatus from the another information processing apparatus; and a control unit that detects a tap operation on the basis of the intensity value obtained from the output of the sensor and the intensity value received from the another information processing apparatus.

An information processing method or a program according to the first aspect of the present technology includes the steps of: by an information processing apparatus including a sensor that performs measurement related to vibration, and being worn on one ear of a user, transmitting an intensity value of vibration obtained from an output of the sensor to another information processing apparatus worn on another ear of the user; receiving the intensity value detected by the another information processing apparatus from the another information processing apparatus; and detecting a tap operation on the basis of the intensity value obtained from the output of the sensor and the intensity value received from the another information processing apparatus.

In the first aspect of the present technology, in an information processing apparatus including a sensor that performs measurement related to vibration, and being worn on one ear of a user, an intensity value of vibration obtained from an output of the sensor is transmitted to another information processing apparatus worn on another ear of the user, the intensity value detected by the another information processing apparatus is received from the another information processing apparatus, and a tap operation is detected on the basis of the intensity value obtained from the output of the sensor and the intensity value received from the another information processing apparatus.

An information processing apparatus according to a second aspect of the present technology includes: an operation detection unit that detects a tap by a user; and a control unit that, in a case where a continuous hit start operation of continuously tapping a predetermined number of times is detected, reproduces once a sound effect corresponding to a continuous hit operation of continuously tapping the predetermined number of times or more, and executes a function assigned to the continuous hit operation by changing a control value by one step, and that, in a case where a continuous hit continuation operation of tapping one or more times within a predetermined time is detected after the continuous hit start operation is detected, reproduces the sound effect once, and executes the function by changing the control value by one step.

An information processing method or a program according to the second aspect of the present technology includes the steps of: detecting a tap by a user; in a case where a continuous hit start operation of continuously tapping a predetermined number of times is detected, reproducing once a sound effect corresponding to a continuous hit operation of continuously tapping the predetermined number of times or more, and executing a function assigned to the continuous hit operation by changing a control value by one step; and in a case where a continuous hit continuation operation of tapping one or more times within a predetermined time is detected after the continuous hit start operation is detected, reproducing the sound effect once, and executing the function by changing the control value by one step.

In the second aspect of the present technology, a tap by a user is detected, in a case where a continuous hit start operation of continuously tapping a predetermined number of times is detected, a sound effect corresponding to a continuous hit operation of continuously tapping the predetermined number of times or more is reproduced once, and a function assigned to the continuous hit operation is executed by changing a control value by one step, and in a case where a continuous hit continuation operation of tapping one or more times within a predetermined time is detected after the continuous hit start operation is detected, the sound effect is reproduced once, and the function is executed by changing the control value by one step.

An information processing system according to a third aspect of the present technology is an information processing system including: a terminal that is worn by a user, detects a tap operation by the user, and executes a function assigned to the tap operation; and an information processing apparatus, in which the information processing apparatus includes: a first control unit that displays a setting screen for a setting related to the function and generates setting information indicating a setting result related to the function according to an operation on the setting screen; and a first communication unit that transmits the setting information to the terminal, and the terminal includes: a second communication unit that receives the setting information from the information processing apparatus; and a second control unit that detects the tap operation on the basis of the setting information or executes the function assigned to the tap operation on the basis of the setting information.

According to the third aspect of the present technology, in an information processing system including: a terminal that is worn by a user, detects a tap operation by the user, and executes a function assigned to the tap operation; and an information processing apparatus, in the information processing apparatus, a setting screen for a setting related to the function is displayed and setting information indicating a setting result related to the function is generated according to an operation on the setting screen; and the setting information is transmitted to the terminal. Furthermore, in the terminal, the setting information is received from the information processing apparatus; and the tap operation is detected on the basis of the setting information or the function assigned to the tap operation is executed on the basis of the setting information.

An information processing apparatus according to a fourth aspect of the present technology is an information processing apparatus worn on one ear of a user, the information processing apparatus including: a control unit that detects one or a plurality of taps on a side of the one ear as a tap input operation and holds tap number information indicating a number of taps performed in the tap input operation; and a communication unit that receives the tap number information of the tap input operation performed on a side of another ear of the user transmitted from another information processing apparatus worn on the another ear, in which the control unit records in a recording unit information indicating a combination of the tap number information of the tap input operation alternately performed one or a plurality of times on the side of the one ear and the side of the another ear as authentication information to be registered for authentication of the user, or sets the information as number-of-times pattern information input by the user at a time of authentication, and performs authentication of the user on the basis of the number-of-times pattern information and the authentication information recorded in advance.

An information processing method or a program according to a fourth aspect of the present technology is an information processing method or a program of an information processing apparatus worn on one ear of a user, the information processing method or the program including steps of: detecting one or a plurality of taps on a side of the one ear as a tap input operation and holding tap number information indicating a number of taps performed in the tap input operation; receiving the tap number information of the tap input operation performed on a side of another ear of the user transmitted from another information processing apparatus worn on the another ear; and recording in a recording unit information indicating a combination of the tap number information of the tap input operation alternately performed one or a plurality of times on the side of the one ear and the side of the another ear as authentication information to be registered for authentication of the user, or setting the information as number-of-times pattern information input by the user at a time of authentication, and performing authentication of the user on the basis of the number-of-times pattern information and the authentication information recorded in advance.

According to the fourth aspect of the present technology, in an information processing apparatus worn on one ear of a user, one or a plurality of taps on a side of the one ear are detected as a tap input operation and tap number information indicating a number of taps performed in the tap input operation is held, the tap number information of the tap input operation performed on a side of another ear of the user transmitted from another information processing apparatus worn on the another ear is received, and information indicating a combination of the tap number information of the tap input operation alternately performed one or a plurality of times on the side of the one ear and the side of the another ear is recorded in a recording unit as authentication information to be registered for authentication of the user, or the information is set as number-of-times pattern information input by the user at a time of authentication, and authentication of the user is performed on the basis of the number-of-times pattern information and the authentication information recorded in advance.

An information processing apparatus according to a fifth aspect of the present technology is an information processing apparatus worn on one ear of a user, the information processing apparatus including a control unit that detects one or a plurality of taps on a side of the one ear as a tap input operation and holds tap number information indicating a number of taps performed in the tap input operation, in which the control unit records in a recording unit information indicating a combination of the tap number information of the tap input operation performed one or a plurality of times as authentication information to be registered for authentication of the user, or sets the information as number-of-times pattern information input by the user at a time of authentication, and performs authentication of the user on the basis of the number-of-times pattern information and the authentication information recorded in advance.

An information processing method or a program of a fifth aspect of the present technology is an information processing method or a program of an information processing apparatus worn on one ear of a user, the information processing method or the program including steps of: detecting one or a plurality of taps on a side of the one ear as a tap input operation and holding tap number information indicating a number of taps performed in the tap input operation; and recording in a recording unit information indicating a combination of the tap number information of the tap input operation performed one or a plurality of times as authentication information to be registered for authentication of the user, or setting the information as number-of-times pattern information input by the user at a time of authentication, and performing authentication of the user on the basis of the number-of-times pattern information and the authentication information recorded in advance.

According to the fifth aspect of the present technology, in an information processing apparatus worn on one ear of a user, one or a plurality of taps on a side of the one ear is detected as a tap input operation and tap number information indicating a number of taps performed in the tap input operation is held, and information indicating a combination of the tap number information of the tap input operation performed one or a plurality of times is recorded in a recording unit as authentication information to be registered for authentication of the user, or the information is set as number-of-times pattern information input by the user at a time of authentication, and authentication of the user is performed on the basis of the number-of-times pattern information and the authentication information recorded in advance.

A storage case according to a sixth aspect of the present technology is a storage case that stores terminals worn on left and right ears of a user, the storage case including: a first operation detection unit that is provided at a predetermined position and outputs a sensor output signal according to a tap on the predetermined position by the user; a second operation detection unit that is provided at another position different from the predetermined position and outputs a sensor output signal according to a tap on the another position by the user; and a control unit that detects one or a plurality of the taps on the predetermined position as a tap input operation on the basis of the sensor output signal supplied from the first operation detection unit and holds tap number information indicating a number of taps performed in the tap input operation on the predetermined position, and detects the tap input operation on the another position on the basis of the sensor output signal supplied from the second operation detection unit and holds the tap number information of the tap input operation on the another position, in which the control unit sets information indicating a combination of the tap number information of the tap input operation alternately performed one or a plurality of times at the predetermined position and the another position as authentication information to be registered for authentication of the user, and causes at least one of recording of the authentication information in a recording unit and transmission of the authentication information to be performed.

An information processing method or a program according to a sixth aspect of the present technology is an information processing method or a program of a storage case that stores terminals worn on left and right ears of a user, the storage case including: a first operation detection unit that is provided at a predetermined position and outputs a sensor output signal according to a tap on the predetermined position by the user; and a second operation detection unit that is provided at another position different from the predetermined position and outputs a sensor output signal according to a tap on the another position by the user, the information processing method or the program including steps of: detecting one or a plurality of the taps on the predetermined position as a tap input operation on the basis of the sensor output signal supplied from the first operation detection unit and holding tap number information indicating a number of taps performed in the tap input operation on the predetermined position, and detecting the tap input operation on the another position on the basis of the sensor output signal supplied from the second operation detection unit and holding the tap number information of the tap input operation on the another position; and setting information indicating a combination of the tap number information of the tap input operation alternately performed one or a plurality of times at the predetermined position and the another position as authentication information to be registered for authentication of the user, and performing at least one of recording of the authentication information in a recording unit and transmission of the authentication information.

According to the sixth aspect of the present technology, in a storage case that stores terminals worn on left and right ears of a user, the storage case including: a first operation detection unit that is provided at a predetermined position and outputs a sensor output signal according to a tap on the predetermined position by the user; and a second operation detection unit that is provided at another position different from the predetermined position and outputs a sensor output signal according to a tap on the another position by the user, one or a plurality of the taps on the predetermined position are detected as a tap input operation on the basis of the sensor output signal supplied from the first operation detection unit and tap number information indicating a number of taps performed in the tap input operation on the predetermined position is held, and the tap input operation on the another position is detected on the basis of the sensor output signal supplied from the second operation detection unit and the tap number information of the tap input operation on the another position is held, information indicating a combination of the tap number information of the tap input operation alternately performed one or a plurality of times at the predetermined position and the another position is set as authentication information to be registered for authentication of the user, and at least one of recording of the authentication information in a recording unit and transmission of the authentication information is performed.

BRIEF DESCRIPTION OF DRAWINGS

FIG. 8 is a diagram illustrating an example of a pattern when a detection result of a tap event is determined.

FIG. 9 is a diagram illustrating an example of a pattern when a detection result of a tap event is determined.

FIG. 39 is a flowchart for explaining a recording side registration process and a non-recording side registration process.

FIG. 40 is a flowchart illustrating a recording side authentication process and a non-recording side authentication process.

FIG. 48 is a diagram illustrating a configuration example of a computer.

FIG. 51 is a diagram illustrating an example of data utilization.

FIG. 52 is a diagram illustrating an example of data.

FIG. 53 is a diagram illustrating an example of cooperation with another device.

FIG. 54 is a diagram illustrating an example of application transition.

MODE FOR CARRYING OUT THE INVENTION

Hereinafter, an embodiment to which the present technology is applied will be described with reference to the drawings.

First Embodiment

<About Present Technology>

The present technology enables recognition of a tap operation by a user with high accuracy in a short time (reaction time) while performing communication between left and right terminals constituting a headphone.

In particular, in the present technology, a user's tap operation on the periphery of the ear is recognized (detected) with high accuracy in the inner ear type headphones separately provided on the left and right.

Figure 1:
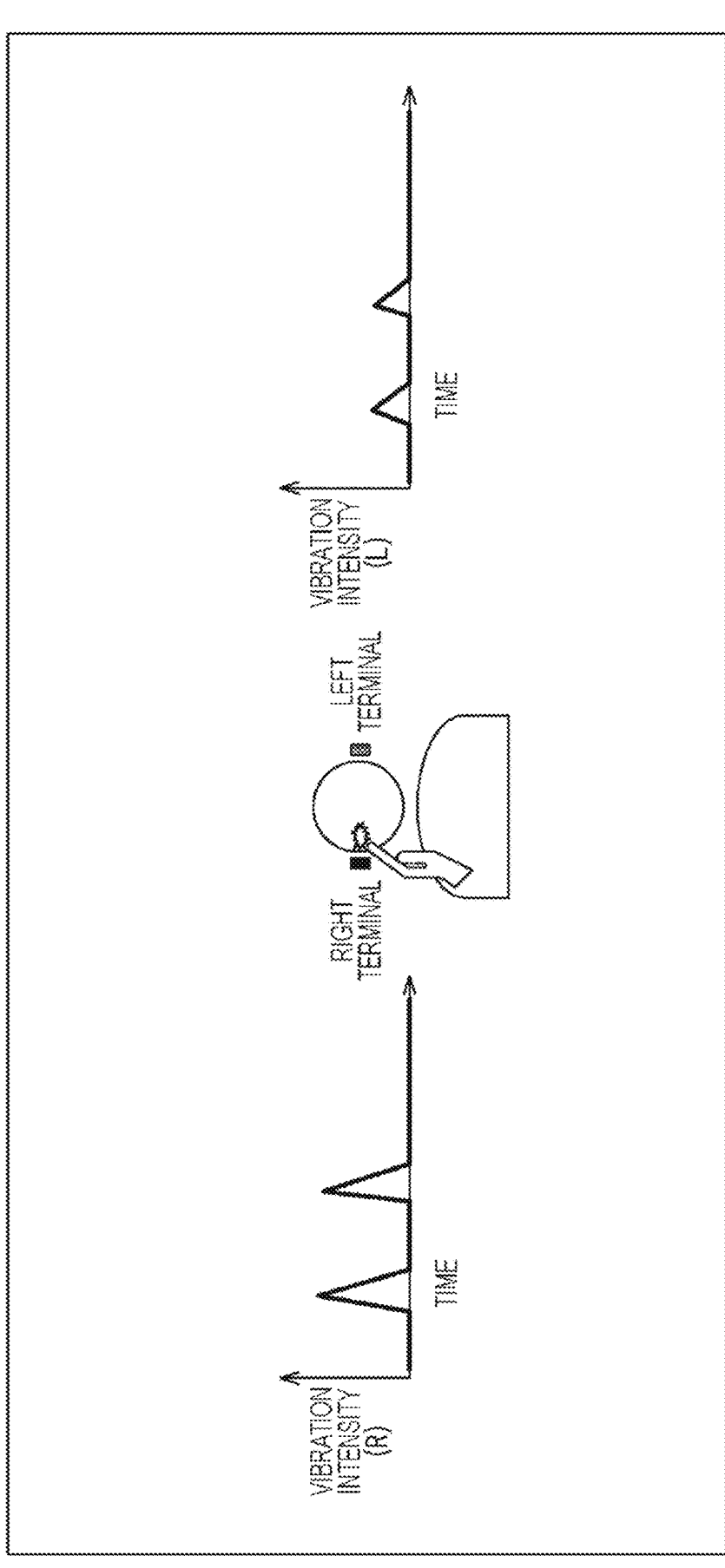
FIG. 1 is a diagram for describing the present technology.

That is, for example, as illustrated in FIG. 1, when the user wears headphones separately on the left and right and performs a tap operation on the periphery of the right ear, a relatively large vibration intensity is detected as illustrated on the left side in the drawing in the terminal on the right ear side, and a vibration intensity smaller than that on the right ear side is detected as illustrated on the right side in the drawing in the terminal on the left ear side.

In such a case, in the present technology, the sensor values obtained by the left and right terminals are used, and occurrence of erroneous detection of a tap operation on the left ear at the time of a tap operation on the periphery of the right ear and occurrence of erroneous detection with noise other than the tap operation are suppressed. Furthermore, in the present technology, the amount of communication and the communication time between the left and right terminals can be reduced, and the reaction time until the system recognizes the tap operation can be shortened.

The present technology particularly has the following features 1 to 3.

(Feature 1)

The tap intensities are compared between both ears, and the recognition result of the stronger tap intensity is adopted.

This feature 1 is more specifically realized by the following features 1-1 to 1-3.

(Feature 1-1)

Because communication between the left and right terminals takes time, rather than collecting data on one terminal to determine a tap event, tap intensities are exchanged between the left and right terminals, and tap events (tap operations) are separately determined.

(Feature 1-2)

In recognition of a double tap operation or a triple tap operation, it takes time to perform communication between the left and right terminals after determination of the double tap operation. Therefore, each time a tap is recognized, the recognition result is transmitted to the terminal on another ear side.

(Feature 1-3)

Since a tap may be detected (recognized) only on the left ear side or only on the right ear side, a timeout is set in the worst time of communication between the left and right terminals, and a tap event is determined only on the own terminal after a certain period of time elapses.

(Feature 2)

A signal similar to a tap operation is detected by a power-saving processor, and an actual tap operation detection process is performed by a higher-performance processor.

(Feature 3)

In the tap operation, a signal when the user's finger touches the face is compared with a signal when the finger moves away, and the signal when the finger moves away is not adopted as the tap operation.

According to the present technology as described above, for example, it is possible to recognize a tap operation with high accuracy in a short reaction time with left and right separate headphones.

In particular, in the present technology, the master and the slave are not provided between the left and right terminals constituting the headphone, and the peak value of the sensor value of the acceleration sensor or the like is transmitted from each of the left and right terminals to perform the determination, so that the determination can be performed in a one-way communication time between the left and right terminals.

Furthermore, even if the right and left terminals separately make a determination related to the detection of the tap operation, the states are synchronized between the right and left terminals according to an algorithm, and no mismatch occurs. That is, the detection results of the peak values are exchanged between the left and right terminals, and the determination is performed using the same detection result, so that different tap operations are not detected in the left and right terminals.

Moreover, according to the present technology, it is possible to reduce the amount of communication required between the left and right terminals algorithmically.

For example, when communication for transmission and reception of the output value of the acceleration sensor is always performed between the left and right terminals, a band for the communication is required, and thus, a band available for communication for music reproduction is narrowed, and sound breakage occurs when the radio wave condition is poor.

On the other hand, in the present technology, since the communication amount between the right and left terminals is small, it is possible to sufficiently secure the band available for communication for music reproduction and to suppress the occurrence of skipping.

<Configuration of Headphone>

The present technology as described above is applicable to, for example, inner-ear headphones.

Figure 2:
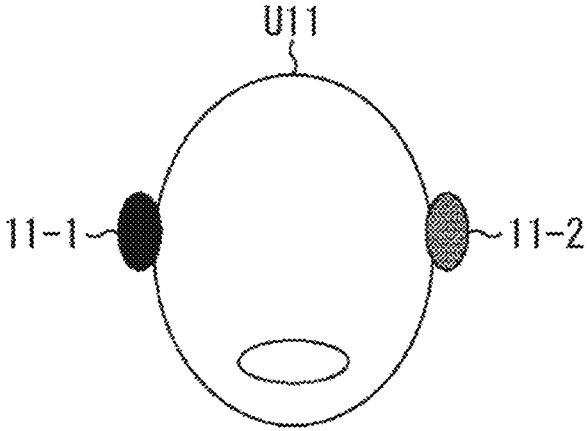
FIG. 2 is a diagram illustrating a configuration example of headphones.

As illustrated in FIG. 2, for example, the inner ear type left and right separate headphones to which the present technology is applied include a terminal 11-1 worn on the right ear of the user U11 and a terminal 11-2 worn on the left ear of the user U11.

The terminal 11-1 and the terminal 11-2 are connected to each other by a communication path such as NFMI, Bluetooth (registered trademark), or Wi-Fi (registered trademark). Hereinafter, the terminal 11-1 and the terminal 11-2 will also be simply referred to as the terminal 11 in a case where it is not particularly necessary to distinguish them.

Furthermore, each terminal 11 also performs wireless communication with a reproduction control device such as a smartphone or a portable player (not illustrated), and reproduces music or the like under the control of the reproduction control device.

The terminal 11 is an information processing apparatus (sound output apparatus) that can be worn on the ear of the user, performs wireless communication with another terminal 11 (Hereinafter, also referred to as a partner terminal) forming a pair or the reproduction control device, and reproduces a sound such as music on the basis of audio data or an operation command supplied from the reproduction control device.

Note that, although an example in which the user U11 wears the terminal 11 on each of the left and right ears will be described below, the user U11 may wear the terminal 11 only on one of the left and right ears.

In each terminal 11, an operation of tapping by the user U11 with a finger, that is, a tap operation, is detected.

The tap operation here includes, for example, a single tap operation in which the user U11 performs tapping only once, a double tap operation in which the user U11 performs tapping continuously twice within a short period, and a triple tap operation in which the user U11 performs tapping continuously three times within a short period.

Figure 3:
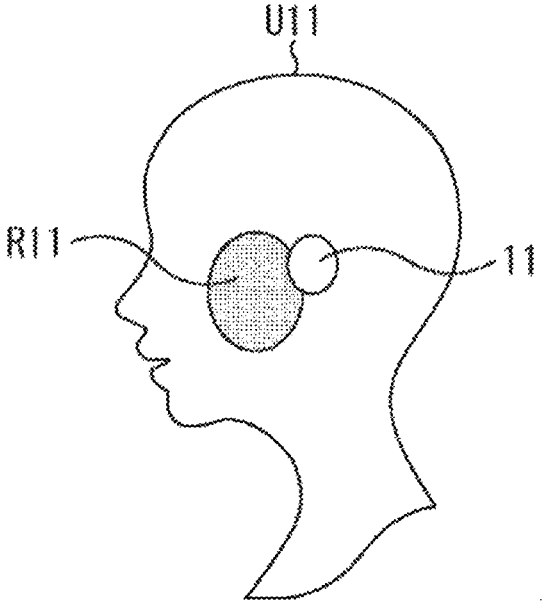
FIG. 3 is a diagram for explaining a tap operation.

In the terminal 11, not only the operation of the user U11 directly tapping the terminal 11, but also the operation of tapping the periphery of the ear of the user U11 wearing the terminal 11, that is, the periphery of the terminal 11 is detected as illustrated in FIG. 3, for example.

Specifically, for example, when the user U11 taps a region R11 around his/her ear on which the terminal 11 is worn, the tap (tap operation) is recognized by the terminal 11 as a tap event.

Hereinafter, in particular, a case where the user U11 taps not the terminal 11 but the periphery of the terminal 11, that is, the periphery (periphery) of the ear of the user U11 wearing the terminal 11 will be described.

Furthermore, in the following description, the tap event to be recognized is a double tap operation and a triple tap operation on the periphery of the ear of the user U11, and an operation of simultaneously tapping the periphery of both left and right ears is not to be recognized.

In the terminal 11, a tap operation (tap event) by the user U11 is recognized using a mounted sensor. Then, in the reproduction control device, control related to music reproduction or the like is performed according to the tap operation recognized by the terminal 11.

For example, a tap operation on the periphery of the right ear and a tap operation on the periphery of the left ear by the user U11 are distinguished, and different functions are assigned to these tap operations.

Specifically, the function assigned to the tap operation is, for example, an operation related to music reproduction control such as reproduction, stop, music forward, music backward, and volume control, an operation of turning on/off noise cancellation, calling of a voice agent, a response operation to a notification or an inquiry by the voice agent, or the like.

Figure 4:
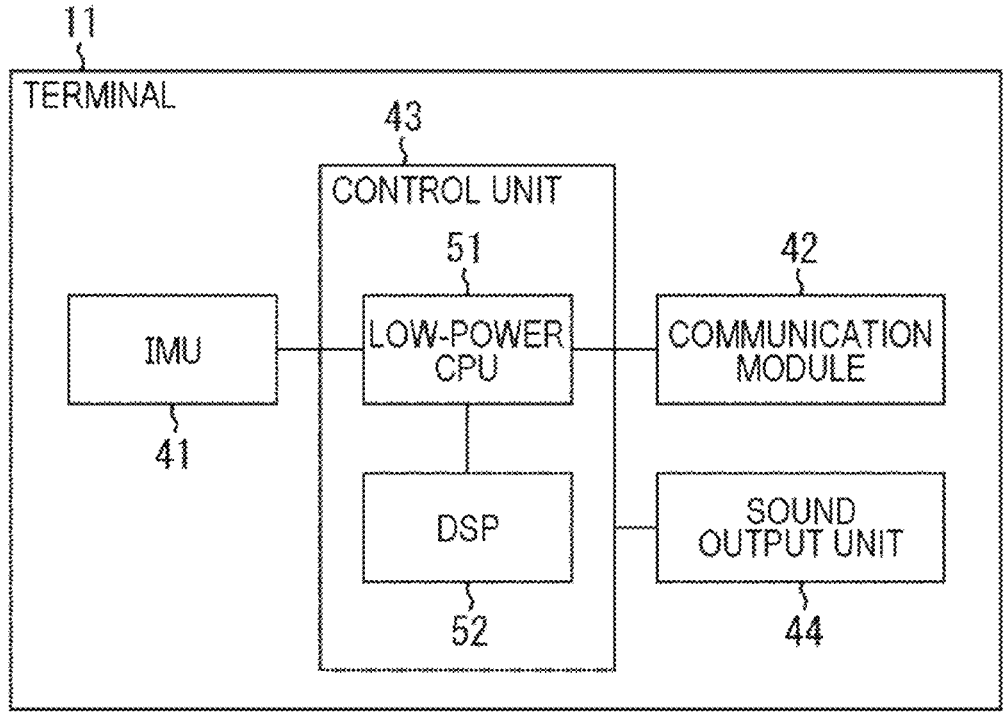
FIG. 4 is a diagram illustrating a configuration example of a terminal.

FIG. 4 is a block diagram illustrating a functional configuration of the terminal 11. Note that here, it is assumed that the terminal 11-1 and the terminal 11-2 have the same configuration.

The terminal 11 includes an inertial measurement unit (IMU) 41, a communication module 42, a control unit 43, and a sound output unit 44.

The IMU 41 is a sensor that has at least an acceleration sensor, performs measurement related to vibration applied to the terminal 11 (IMU 41), and outputs a signal indicating a measurement result, that is, a signal related to vibration.

For example, the IMU 41 measures (detects) acceleration generated in the terminal 11 as measurement related to vibration, and supplies a measurement result to the control unit 43. Note that the IMU 41 may be provided with a gyro sensor and a geomagnetic sensor in addition to the acceleration sensor.

The communication module 42 functions as a communication unit, and performs wireless communication with a partner terminal and a reproduction control device under the control of the control unit 43.

For example, the communication module 42 transmits the detection result of the peak value of the acceleration supplied from the control unit 43 to the partner terminal, or receives the detection result of the peak value of the acceleration transmitted from the partner terminal and supplies the detection result to the control unit 43. The peak value of the acceleration here is a value (intensity value of the signal) at the peak of a signal related to vibration, that is, a signal indicating a measurement result of the acceleration (Hereinafter, also referred to as a sensor output signal) based on the output of the IMU 41. It can be said that this peak value indicates the intensity value of vibration.

Furthermore, for example, the communication module 42 transmits a detection result of a tap event supplied from the control unit 43 to the reproduction control device, and receives audio data and an operation command transmitted from the reproduction control device and supplies the audio data and the operation command to the control unit 43.

The control unit 43 controls the entire operation of the terminal 11.

For example, the control unit 43 detects a peak of a signal related to vibration, that is, a peak of a sensor output signal on the basis of a measurement result of acceleration supplied from the IMU 41. Furthermore, for example, the control unit 43 detects a tap operation by the user on the basis of a sensor output signal supplied from the IMU 41, a detection result of a peak value (intensity value) in the own terminal, and a detection result of a peak value (intensity value) in a partner terminal supplied from the communication module 42.

Moreover, for example, the control unit 43 supplies the audio data to the sound output unit on the basis of the audio data or the operation command supplied from the communication module 42 and causes the sound output unit 44 to output the audio data, thereby reproducing music or the like based on the audio data, or performing processing according to the operation command such as stopping the reproduction of the music or the like or forwarding the song.

The control unit 43 includes a low-power CPU 51 having low (small) power consumption and a high-performance digital signal processor (DSP) 52 having high (large) power consumption.

The low-power CPU 51 is an arithmetic processing unit (processor) that requires less power consumption for operation than the DSP 52, but has lower performance, that is, lower arithmetic performance (processing performance) than the DSP 52. Conversely, the DSP 52 has higher performance than the low-power CPU 51, but has higher power consumption than the low-power CPU 51 and requires more power.

Note that, at the normal time, the DSP 52 is in a sleep state, that is, a non-activated state. The low-power CPU 51 activates the DSP 52 as necessary to enter a non-sleep state, that is, an operation state.

The sound output unit 44 includes, for example, a speaker unit and the like, and outputs (reproduces) sounds such as music and sound effects on the basis of the audio data supplied from the control unit 43.

As described above, each of the left and right terminals 11 includes processing units such as the IMU 41 and the control unit 43, and appropriately performs wireless communication with the partner terminal and the reproduction control device to reproduce music or the like.

Furthermore, the control unit 43 of each terminal 11 functions as a tap detection mechanism that detects a tap operation by the user, and when detecting the peak value of the acceleration, transmits the detection result to the partner terminal.

Detecting the peak value of the acceleration on the own terminal side can be said to be detecting a tap operation by the user on the own terminal side or a tap similar event similar to the tap operation.

The tap similar event is, for example, vibration (noise) not caused by a tap operation around the ear on the own terminal side, such as vibration caused by chewing or running or vibration caused by a tap operation performed around the ear on the partner terminal side transmitted (oozed) to the own terminal side.

<Detection of Tap Event>

Next, an outline of tap event detection performed independently in each terminal 11 will be described.

In the terminal 11, a double tap operation or a triple tap operation is detected as the detection of the tap event.

Figure 5:
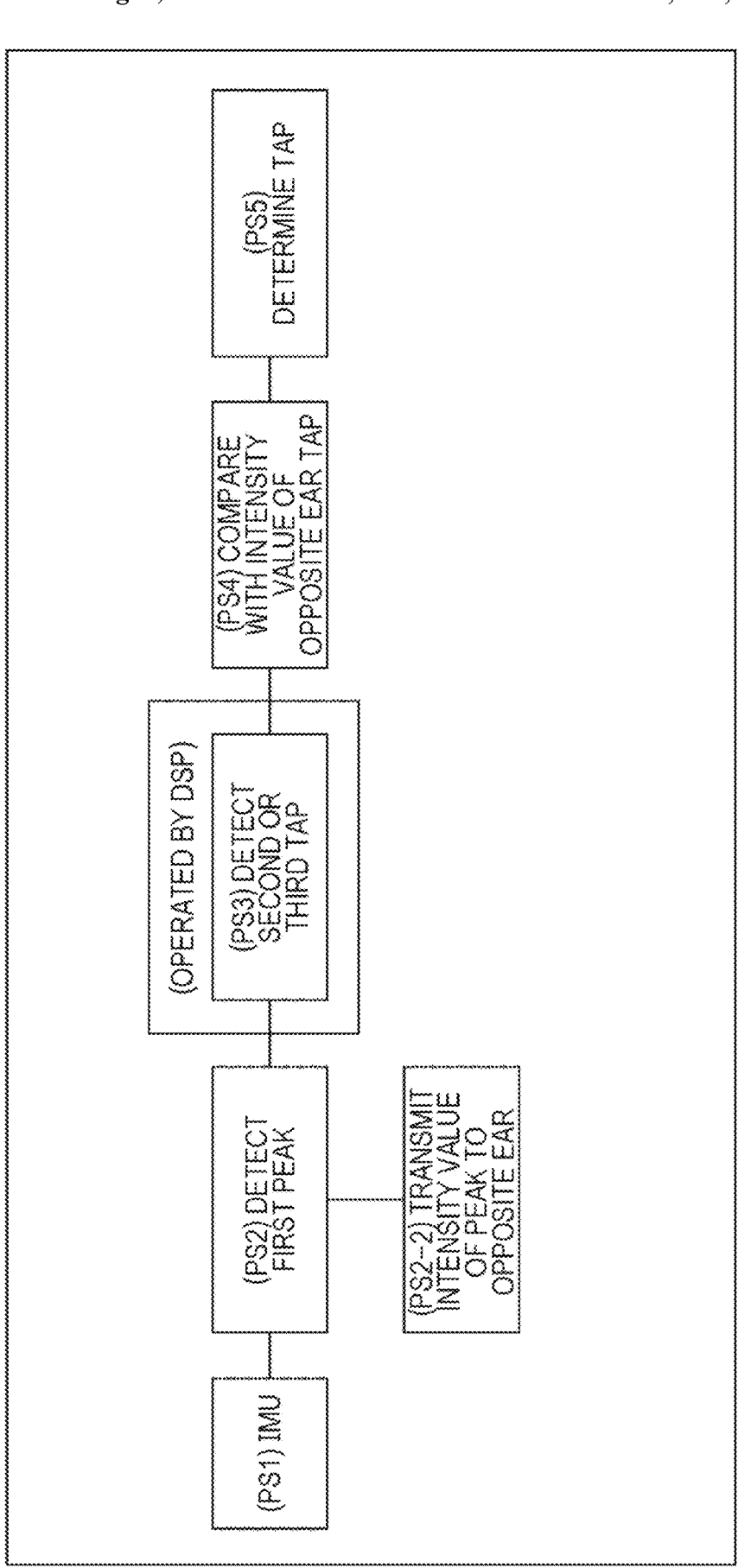
FIG. 5 is a diagram for explaining an outline of tap event detection.

For example, as illustrated in FIG. 5, first, the low-power CPU 51 acquires, as processing PS1, a sensor output signal that is a time-series signal output from the IMU 41, that is, a sensor value.

In subsequent processing PS2, the low-power CPU 51 detects the first peak of the acceleration (sensor value) on the basis of the acquired sensor output signal.

This first peak is a peak of acceleration corresponding to large vibration (movement) such as vibration or noise due to one tap in a tap operation by the user.

In the terminal 11, since the double tap operation and the triple tap operation as the tap event are detection targets, the first tap in the double tap operation and the triple tap operation is detected in the processing PS2.

When the peak is detected in the processing PS2, the low-power CPU 51 activates the DSP 52 to execute the processing PS3, and performs the processing PS2-2 of transmitting the intensity value (peak intensity value) of the peak detected in the processing PS2 to the terminal 11 worn on the opposite ear, that is, the partner terminal.

After activation, the DSP 52 performs the processing PS3 in accordance with an instruction from the low-power CPU 51.

That is, the DSP 52 sequentially acquires a sensor output signal (acceleration) output from the IMU 41 via the low-power CPU 51, and detects a tap event on the basis of the acquired sensor output signal.

For example, at the time of detecting a tap event, the DSP 52 detects the second or third tap in the tap operation by detecting the next tap performed within a specified time from the most recently detected tap, such as the first tap or the second tap.

For example, in a case where the third tap is not detected within the specified time in a state where the second tap is detected (determined), it is assumed that the double tap operation is detected.

When a tap event (tap operation) is detected in the processing PS3, thereafter, in the processing PS4, the low-power CPU 51 compares the intensity value of the peak detected in the processing PS2 in the own terminal with the intensity of the tap in the opposite ear, that is, the intensity value of the peak received from the partner terminal.

Then, in the processing PS5, the low-power CPU 51 determines the detection result of the tap event in the terminal on the basis of the comparison result between the intensity value of the peak obtained in the terminal and the intensity value of the peak obtained in the partner terminal in the processing PS4. That is, it is determined whether or not the event detected in the own terminal is a tap operation.

For example, a magnification of the intensity value of the peak received from the partner terminal and the intensity value of the peak detected by the own terminal are compared, and in a case where a ratio of the intensity values of the peak is more than or equal to a certain value, such as a case where the intensity value of the peak (tap intensity) in the own terminal is twice or more the intensity value of the peak of the partner terminal, the tap event of the own terminal is determined. In other words, it is recognized that a specific tap operation has been performed on the own terminal side.

When the detection result of the tap event in the own terminal is determined, the low-power CPU 51 notifies the upper layer of the determined (recognized) tap event in the own terminal. That is, the low-power CPU 51 transmits information indicating the tap event recognized by its own terminal to the reproduction control device by the communication module 42. As a result, the reproduction control device performs processing according to the notified tap event, such as music reproduction control.

The detection of the tap event described with reference to FIG. 5 will be described in more detail.

Figure 6:
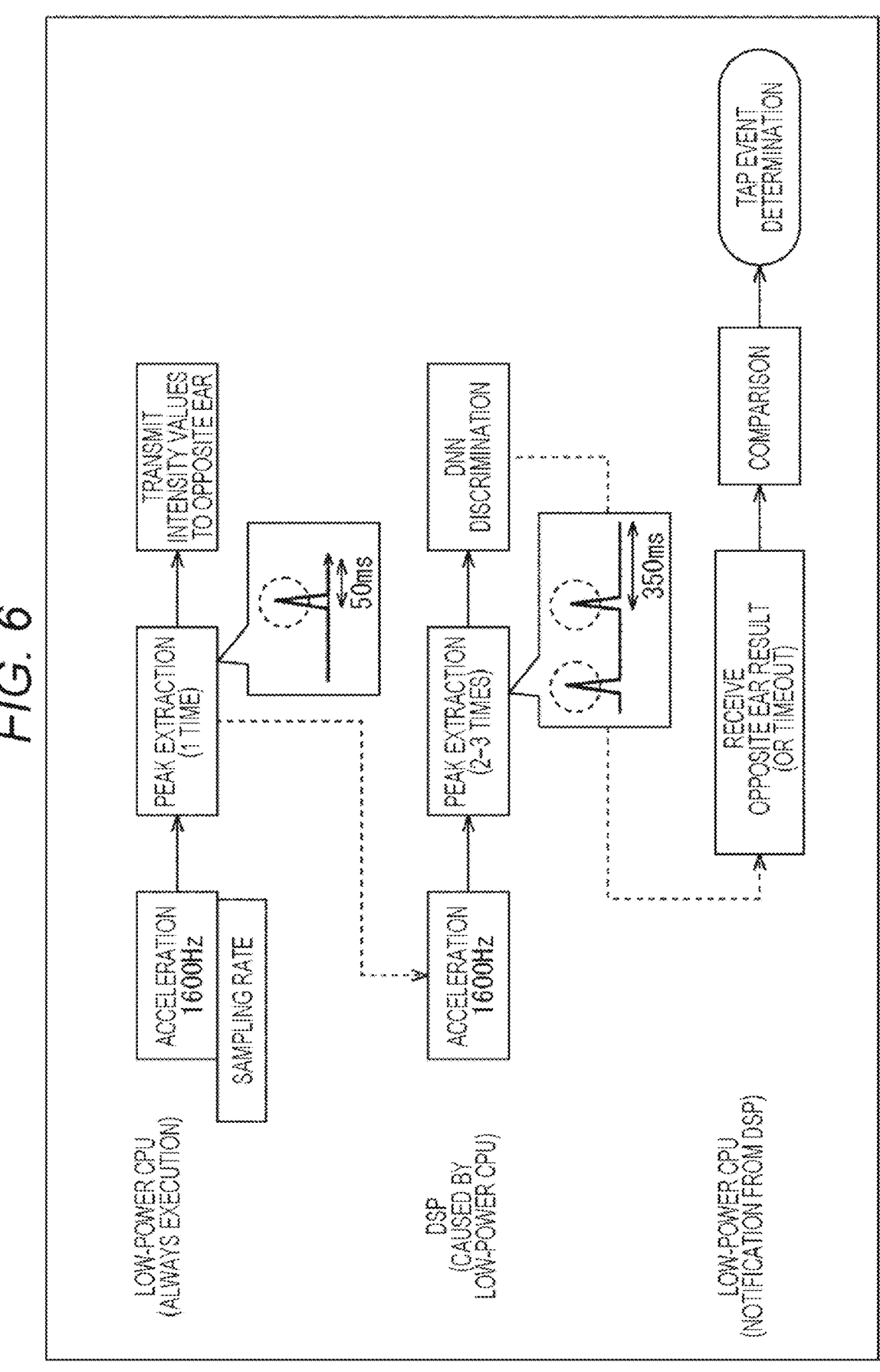
FIG. 6 is a diagram illustrating a more detailed example of tap event detection.

FIG. 6 is a diagram illustrating a more detailed example of the tap event detection.

In particular, the upper part of FIG. 6 illustrates processing corresponding to the processing PS1 to PS2-2 of FIG. 5 performed by the low-power CPU 51, and the middle part of FIG. 6 illustrates processing corresponding to the processing PS3 of FIG. 5 performed by the DSP 52. In the drawing, the processing corresponding to the processing PS4 and the processing PS5 of FIG. 5 performed by the low-power CPU 51 are illustrated in the lower part.

As illustrated in the upper part of the drawing, the low-power CPU 51 acquires, for example, a sensor output signal indicating a measurement result of acceleration with a sampling rate of 1600 Hz, and detects (extracts) a peak of the acceleration.

For example, the low-power CPU 51 applies an evaluation function for threshold calculation to the sensor output signal, and performs threshold processing on a value obtained as a result.

Specifically, the low-power CPU 51 acquires a sensor output signal indicating a time waveform of acceleration in each of three directions (three axial directions) orthogonal to each other from the IMU 41, and performs filtering using a band pass filter or the like on the acquired sensor output signal.

Then, the low-power CPU 51 calculates the norm on the basis of the signals for the three directions (axes) obtained by the filtering, and compares the norm value (evaluation function) obtained as a result with a predetermined threshold value.

In a case where the norm value at a predetermined timing exceeds a threshold, and then the norm value at a timing after a predetermined time, such as 50 ms later, becomes less than the threshold value, the low-power CPU 51 sets a timing at which the norm value becomes the maximum value as a peak.

In such peak detection by the low-power CPU 51, a tap-like signal (peak) can be detected by processing with a relatively small processing amount.

When the peak is detected, the low-power CPU 51 transmits the norm value at the detected peak to the partner terminal as the intensity value of the peak detected by the own terminal, and activates the DSP 52. Note that, hereinafter, the detection of the peak performed by the low-power CPU 51 is also referred to as first peak detection or first peak detection process.

In the DSP 52, a peak corresponding to the second tap or the third tap is detected on the basis of the sensor output signal (acceleration) supplied from the IMU 41. Here, the peak may be detected by a method similar to that in the case of the low-power CPU 51, or the peak may be detected by another different method.

However, in the DSP 52, in a case where the next peak is detected within a predetermined specified time from the first peak detected by the low-power CPU 51, the peak is regarded as a peak corresponding to the second tap. In other words, even if a peak is detected after a specified time from the first peak, the peak is not set as a peak corresponding to the second tap, and as a result, a tap event (tap operation) is not detected.

Here, the above-described specified time, which is a length of the period for which the second peak is to be detected, is, for example, 350 ms, but may be any time such as 500 ms.

Similarly, in a case where the second peak is detected by the DSP 52, when the next peak is detected within a predetermined specified time from the second peak, the peak is regarded as a peak corresponding to the third tap. The specified time in this case is, for example, 350 ms similarly to the case of the second peak.

Therefore, for example, in a case where the third peak is not detected even after a specified time such as 350 ms has elapsed from the second peak, it is determined that the double tap operation is detected at the time point when the specified time has elapsed.

On the other hand, for example, in a case where the third peak is detected within a specified time such as 350 ms from the second peak, the triple tap operation is detected at the time point when the specified time such as 350 ms has elapsed from the second peak.

Note that, hereinafter, such detection of a peak performed by the DSP 52 is also referred to as second or subsequent peak detection or second or subsequent peak detection process.

Furthermore, the specified time for detecting (determining) the second peak and the specified time for detecting the third peak may have different lengths, or the specified time may be different between the detection of the double tap operation and the detection of the triple tap operation.

In general, a tap operation tends to be performed more quickly during a triple tap operation than during a double tap operation. Therefore, for example, the above-described specified time corresponding to the time between two consecutive taps in three taps of the triple tap operation may be set shorter than the specified time corresponding to the interval between two taps in the double tap operation.

Furthermore, the DSP 52 may perform deep neural network (DNN) discrimination processing of identifying a tap and other noises by applying a machine learning algorithm according to deep learning separately from the above-described processing performed as the second and subsequent peak detection process.

In such a case, the DSP 52 holds a DNN discriminator including a DNN generated in advance by machine learning.

The DNN discriminator receives, for example, a sensor output signal that is an output of the IMU 41 as an input, and outputs a discrimination result indicating whether or not the input sensor output signal is a signal corresponding to a tap operation.

Here, the discrimination result may be, for example, a signal indicating whether the input signal is a signal corresponding to a tap operation or a signal of other noise, or may be a signal indicating whether the input signal is a signal corresponding to a double tap operation, a signal corresponding to a triple tap operation, or a signal of other noise.

The DSP 52 performs DNN discrimination processing on the basis of a DNN discriminator held in advance and a sensor output signal supplied from the IMU 41. Note that the DNN discrimination processing may be performed after the second and subsequent peak detection process, or may be performed in parallel with the second and subsequent peak detection process.

The DSP 52 determines the final detection result of the tap event on the basis of the results of the second and subsequent peak detection processes, that is, the detection result of the tap event and the result of the DNN discrimination processing, and supplies (outputs) the final detection result to the low-power CPU 51.

As an example, for example, in a case where the tap operation is detected in the second and subsequent peak detection processes and a discrimination result indicating that the signal corresponds to the tap operation is obtained in the DNN discrimination processing, a detection result indicating that the tap operation, more specifically, the double tap operation or the triple tap operation is detected is output. Therefore, in this case, when a discrimination result indicating that the signal is a noise signal is obtained in the DNN discrimination processing, a detection result indicating that the tap operation has not been detected is output regardless of the detection results in the second and subsequent peak detection process.

Furthermore, when receiving the supply of the detection result of the tap event from the DSP 52, the low-power CPU 51 performs the processing illustrated in the lower part of the drawing.

Specifically, the first peak detection is performed not only in the own terminal but also in the partner terminal on the opposite ear side, and when the first peak is detected, the intensity value of the first peak detected on the partner terminal side is transmitted from the partner terminal to the own terminal.

Therefore, in a case where the intensity value of the peak is received from the partner terminal, the low-power CPU 51 acquires the received intensity value of the peak from the communication module 42.

Note that, even if a peak is detected in the first peak detection process on the own terminal side, there is a case where no peak is detected in the first peak detection process on the partner terminal side, that is, there is a case where no intensity value of the peak is transmitted from the partner terminal.

Therefore, in a case where the intensity value of the peak is not transmitted from the partner terminal even after a predetermined timeout period has elapsed from the time of the peak detected in the first peak detection process on the own terminal side, the low-power CPU 51 causes a timeout. That is, it is regarded that no peak is detected in the first peak detection process in the partner terminal, and the reception waiting process is terminated.

When the intensity value of the peak is received from the partner terminal or caused to time out, the low-power CPU 51 then performs the processing PS4 and the processing PS5 described above, that is, processing of comparing the intensity values of the peak and processing of determining the detection result of the tap event.

More specifically, in a case where a timeout occurs, comparison of peak intensity values (processing PS4) is not performed, and in processing PS5, the detection result of the tap event detected by the DSP 52 is determined as it is.

Note that the low-power CPU 51 may dynamically determine the above-described timeout period on the basis of at least one of a communication time, a radio wave condition, and a communication scheme of the wireless communication between the terminals 11. For example, the timeout period may be determined according to a radio wave condition in communication between the terminals 11, a connection profile of communication between the terminals 11, that is, a communication scheme such as Bluetooth (registered trademark) or NFMI, or the like. Furthermore, for example, the timeout period may be dynamically determined (changed) by the low-power CPU 51 according to the arrival time of a message such as the intensity value of the peak received immediately before from the partner terminal, that is, the communication time required between the terminals 11, and the like.

In addition, in a situation where the user wears the terminal 11 only on one ear and uses only one terminal 11, since the intensity value of the peak is not transmitted from the partner terminal, the low-power CPU 51 may immediately determine the detection result of the tap event without waiting for timeout. That is, when the detection result of the tap event is supplied from the DSP 52, the detection result may be determined as it is.

Meanwhile, in the headphone, the terminal 11 is worn on each of the left and right ears.

Figure 7:
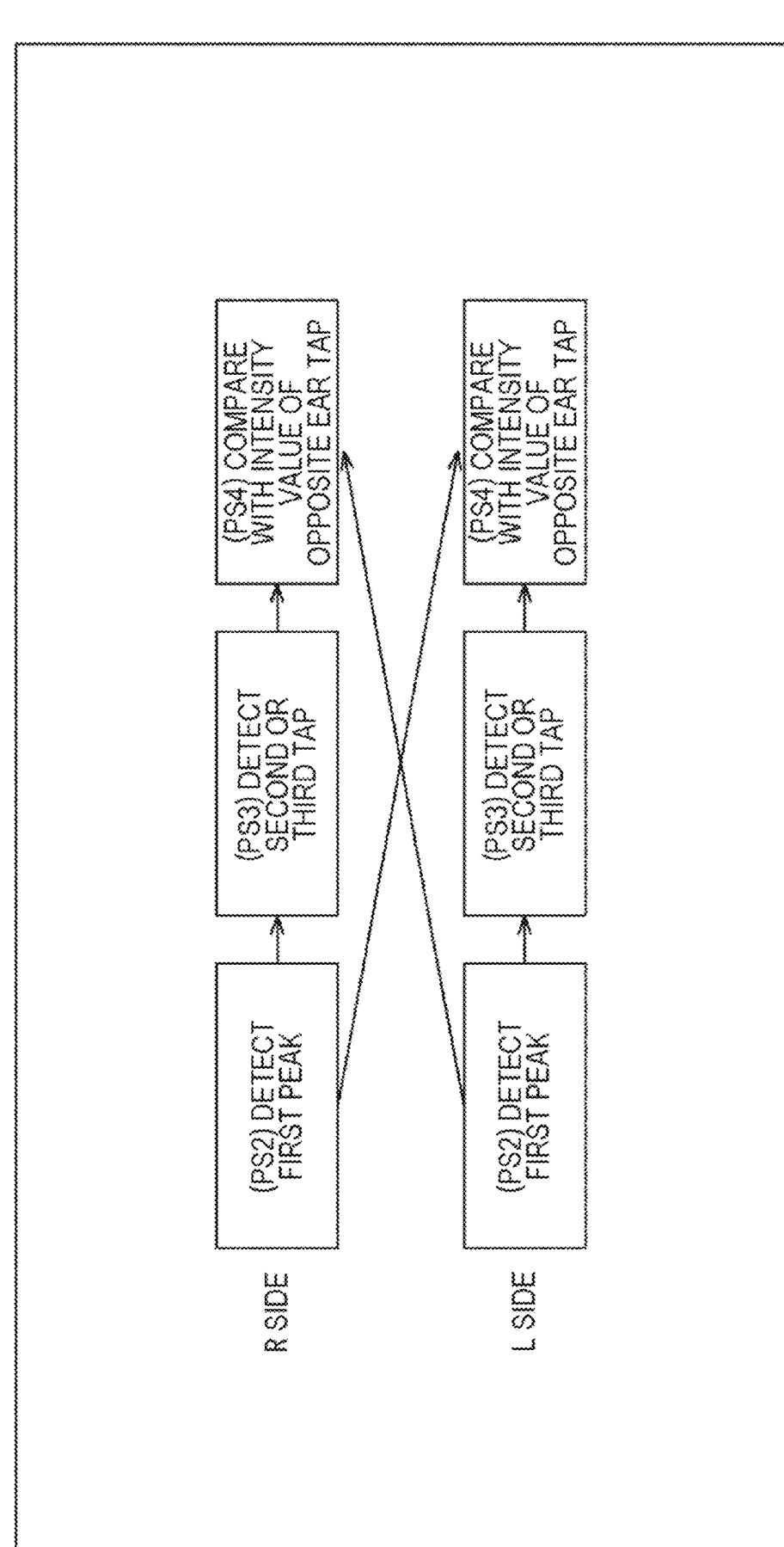
FIG. 7 is a diagram for explaining detection of a tap event in each of left and right terminals.

Therefore, the processing PS1 to PS5 described above are independently performed by the terminal 11 on the right ear side (R side) and the terminal 11 on the left ear side (L side) as illustrated in FIG. 7. In other words, the processing PS1 to PS5 are not performed in synchronization in the left and right terminals 11.

At this time, the processing PS2, that is, the first peak detection process is performed in each of the left and right terminals 11, and the intensity value of the peak is transmitted to the partner terminal as necessary.

Furthermore, in each of the left and right terminals 11, the processing PS3 and the processing PS4 are performed, and a final detection result of the tap event is obtained on the basis of a result of the second and subsequent peak detection process and a comparison result with the intensity value of the peak received from the partner terminal.

In particular, in the low-power CPU 51, after the first peak is detected and the processing PS3 is started, that is, even during the second and subsequent peak detection processes, the first peak detection process (processing PS2) is continuously performed, and the intensity value of the newly detected peak is transmitted to the partner terminal.

Therefore, for example, in a case where the user performs a double tap operation, the next processing PS2 is performed after the peak corresponding to the first tap is detected in the processing PS2. Therefore, when the peak corresponding to the second tap is detected in the processing PS2, the intensity value of the peak is transmitted to the partner terminal twice.

In a case where a plurality of peak intensity values is received from the partner terminal at the time of performing the processing PS4 in this manner, the low-power CPU 51 compares the maximum value among the intensity values of one or a plurality of peaks detected by itself with the maximum value among the plurality of peak intensity values received from the partner terminal.

Each terminal 11 independently detects (recognizes) a tap event, but the same peak intensity value is used as the peak intensity value in the processing PS4 in both the left and right terminals 11, so that the detection result of the tap event is uniquely determined.

Furthermore, the patterns when the detection result of the tap event is determined are different depending on the intensity values (vibration intensities) of the peaks detected by the terminals 11 on the R side (right ear side) and the L side (left ear side), and the following patterns PT1 to PT4 are considered as such patterns, for example. Note that here, an example in which a double tap operation is detected will be described.

(Pattern PT1)

A double tap operation is detected on both the R side and the L side, and as a result of comparing the peak intensity values, the intensity value on the R side is strong (large), and the detection result of the tap event is determined.

(Pattern PT2)

A double tap operation is detected on both the R side and the L side, and as a result of comparing the peak intensity values, the magnification of the peak intensity value on both the R side and the L side does not exceed the threshold and is rejected.

(Pattern PT3)

A double tap operation is detected on the R side, but only one peak is detected on the L side, and a detection result of a tap event on the R side is determined as a result of comparison of peak intensity values.

(Pattern PT4)

A double tap operation is detected on the R side, but no peak is detected on the L side, and a detection result of a tap event on the R side is determined after a timeout period has elapsed.

Here, the patterns PT1 to PT4 will be described more specifically with reference to FIGS. 8 to 11.

Figure 8:
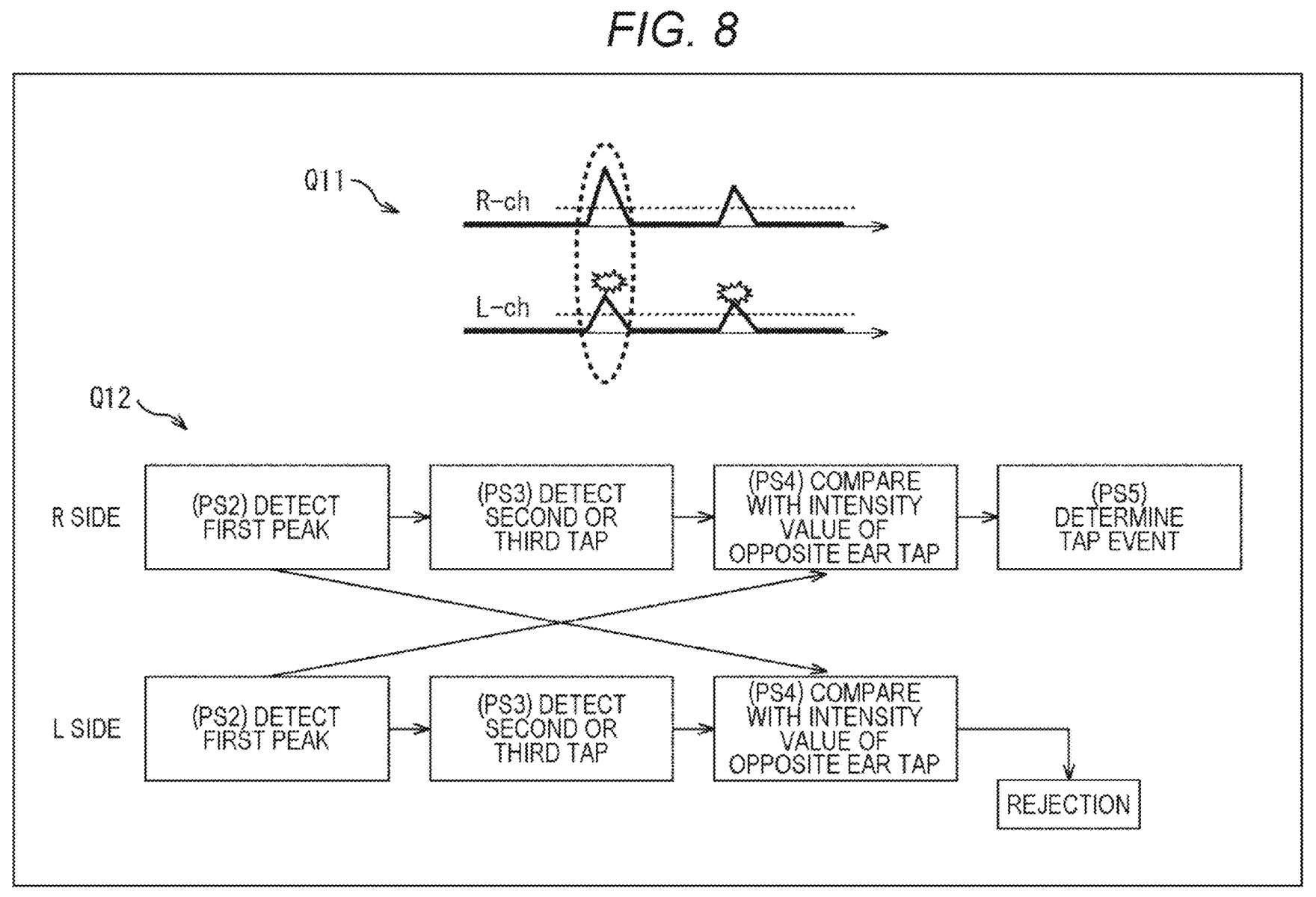
Figure 9:
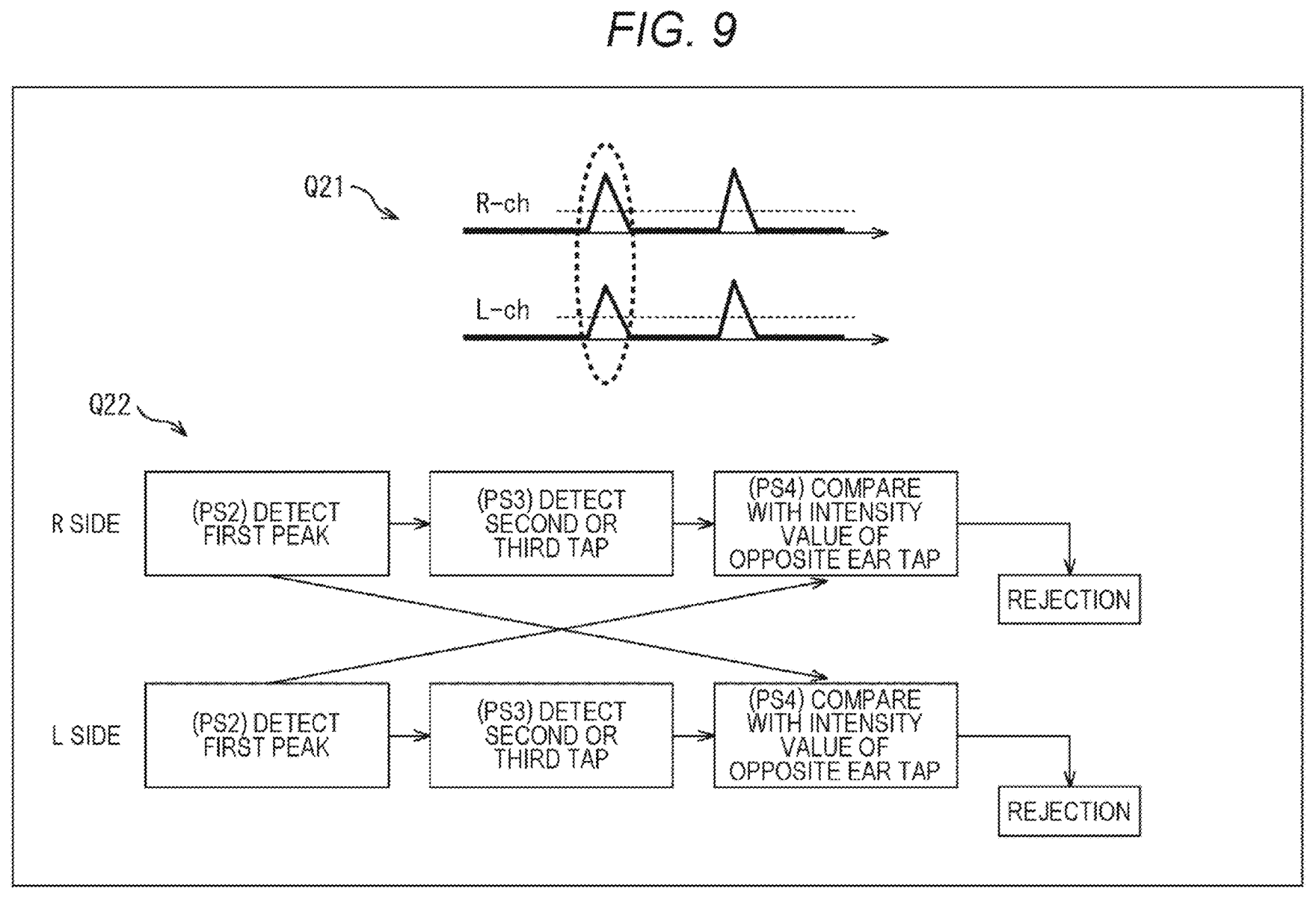
Figure 10:
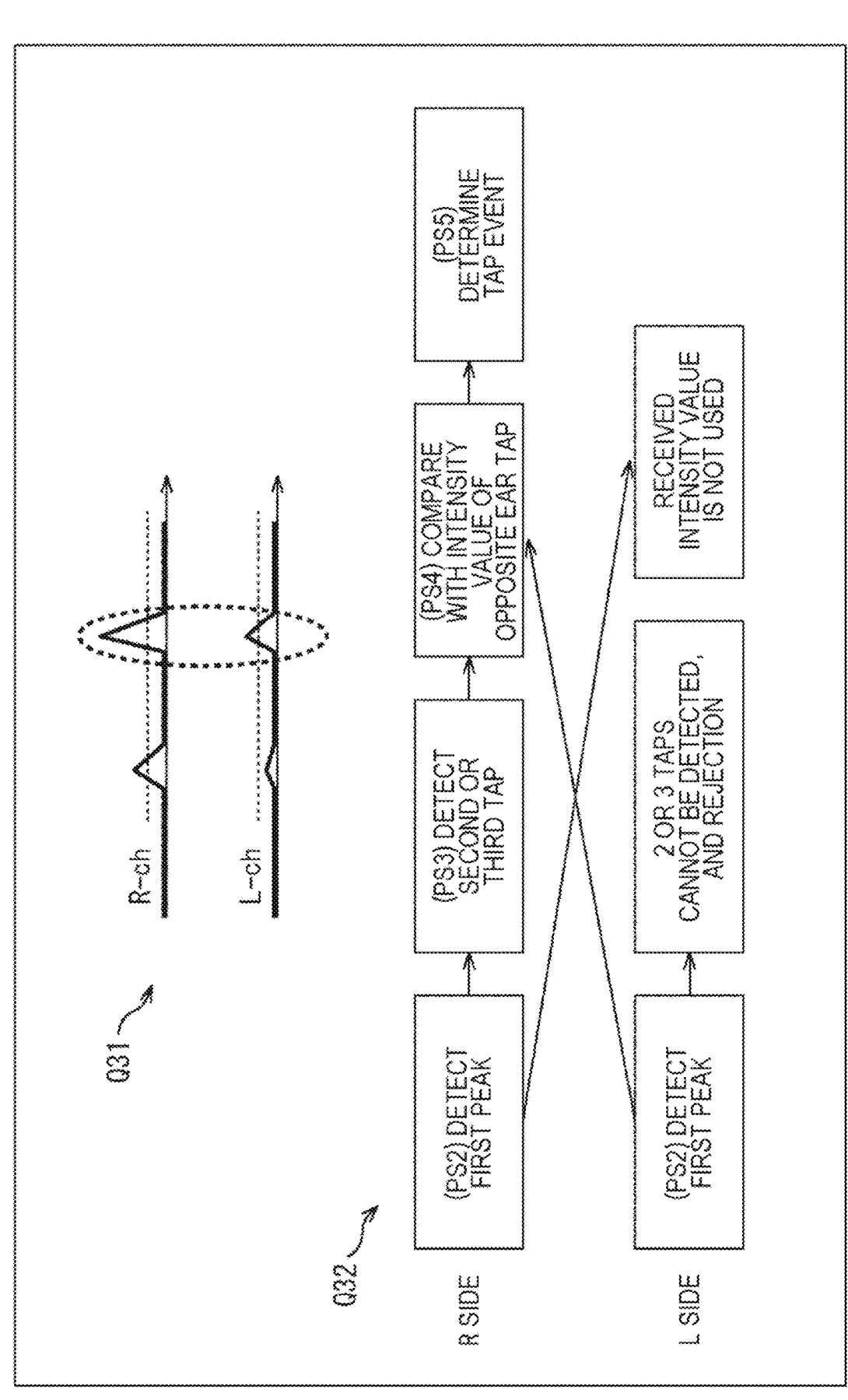
FIG. 10 is a diagram illustrating an example of a pattern when a detection result of a tap event is determined.
Figure 11:
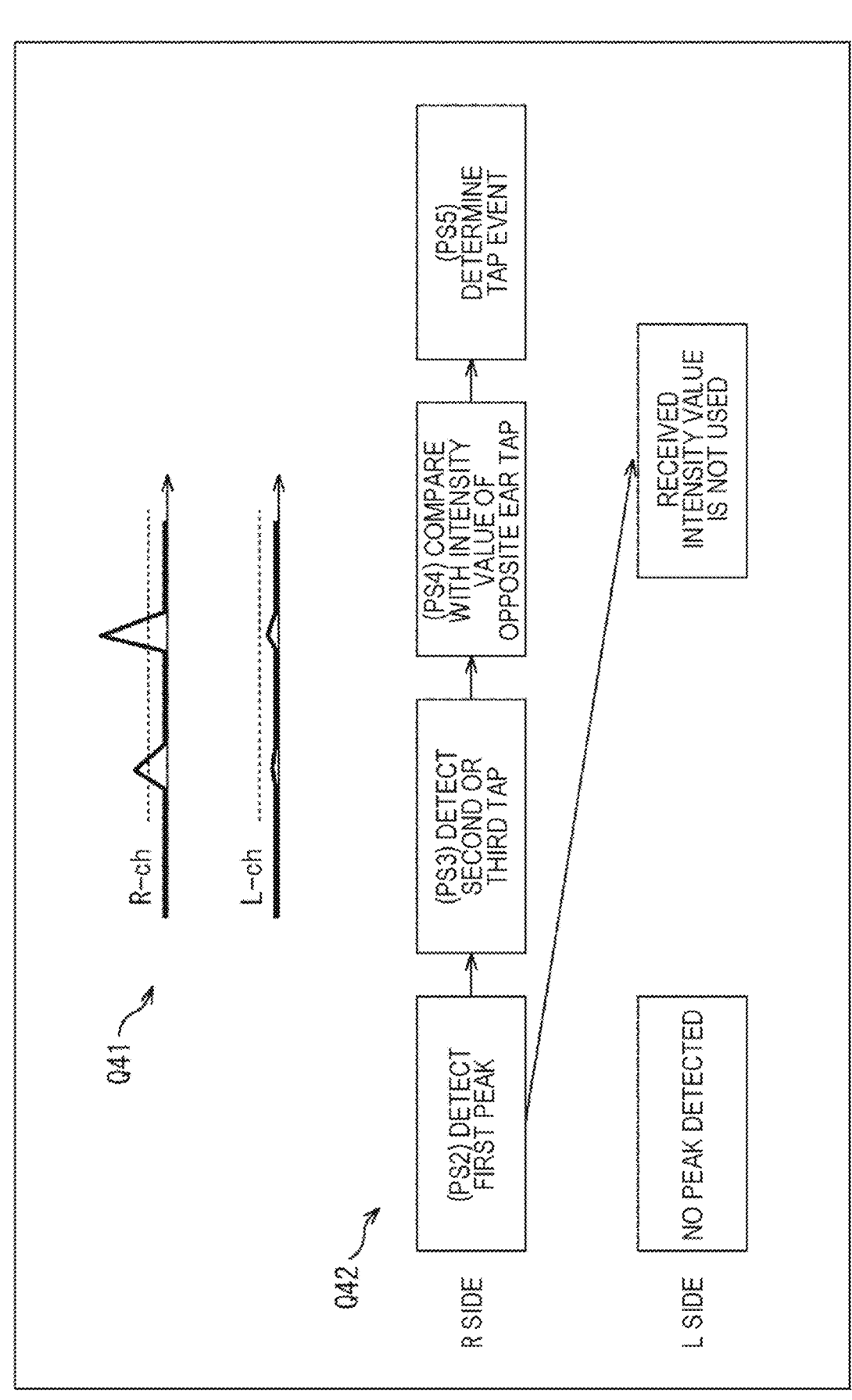
FIG. 11 is a diagram illustrating an example of a pattern when a detection result of a tap event is determined.

Note that, in a portion indicated by an arrow Q11 in FIG. 8, a portion indicated by an arrow Q21 in FIG. 9, a portion indicated by an arrow Q31 in FIG. 10, and a portion indicated by an arrow Q41 in FIG. 11, a time waveform of acceleration based on the sensor output signal obtained by the IMU 41, more specifically, the above-described norm value (evaluation function) is illustrated.

In particular, the polygonal line on the upper side in the drawing indicates the norm value obtained on the R side (right ear side), and the polygonal line on the lower side in the drawing indicates the norm value obtained on the L side (left ear side). In particular, in each polygonal line (norm value), a portion protruding upward in the drawing from the horizontal dotted line is detected as a peak in the first peak detection process.

FIG. 8 illustrates an example of the pattern PT1.

In this example, as indicated by an arrow Q11, in each of the R side and the L side, two peaks corresponding to two taps at the time of the double tap operation are detected by the first peak detection process, and intensity values of these peaks are exchanged between the terminals 11 on the R side and the L side. In particular, here, on the R side, a peak having an intensity value larger than that on the L side is detected.

In this case, in the terminals 11 on the R side and the L side, the processing PS3 and the processing PS4 are performed as indicated by an arrow Q12.

Specifically, since two peaks are detected in the processing PS2 (first peak detection process) on both the R side and the L side, the maximum value of the peak intensity value detected on the R side is compared with the maximum value of the peak intensity value detected on the L side in the processing PS4.

In this example, on each of the R side and the L side, the intensity value of the first peak (peak detected first) is larger than the intensity value of the second peak (peak detected next). Therefore, the intensity value of the first peak detected on the R side is compared with the intensity value of the first peak detected on the L side.

Specifically, in the R-side terminal 11, in the processing PS4, the intensity value of the first peak detected on the R side is divided by the intensity value of the first peak detected on the L side, whereby the ratio (magnification) of the peak intensity values is calculated as the intensity ratio.

Then, since it is determined that the obtained intensity ratio is larger than the predetermined threshold on the R side, the detection result of the tap event (double tap operation) detected on the R side is determined in the processing PS5. That is, the detection result of the tap event on the R side is determined, whereby it is recognized that the double tap operation is performed on the R side.

On the other hand, in the L-side terminal 11, in the processing PS4, the intensity ratio is calculated by dividing the intensity value of the first peak detected on the L side by the intensity value of the first peak detected on the R side.

Then, on the L side, since it is determined that the obtained intensity ratio is less than or equal to the predetermined threshold, the tap event (double tap operation) detected on the L side is rejected. That is, it is recognized that no tap event has been detected on the L side.

As described above, in the headphone, the intensity value of the peak detected on the R side and the intensity value of the peak detected on the L side are exchanged. Therefore, since the same peak intensity value is used in the processing PS4 performed on the R side and the processing PS4 performed on the L side, for example, inconsistency such as determination of the detection result of the tap event on both the R side and the L side does not occur. That is, the tap event can be detected with higher accuracy.

FIG. 9 illustrates an example of the pattern PT2.

In this example, as indicated by an arrow Q21, in each of the R side and the L side, two peaks corresponding to two taps at the time of the double tap operation are detected by the first peak detection process, and intensity values of these peaks are exchanged between the terminals 11 on the R side and the L side. In particular, here, peaks having substantially the same intensity value are detected on the R side and the L side.

In this case, in the terminals 11 on the R side and the L side, the processing PS2 to PS4 are performed as indicated by an arrow Q22.

Specifically, since two peaks are detected in the processing PS2 (first peak detection process) on both the R side and the L side, the maximum value of the peak intensity value detected on the R side is compared with the maximum value of the peak intensity value detected on the L side in the processing PS4.

In this example, the intensity value of the first peak is larger than the intensity value of the second peak on each of the R side and the L side. Therefore, the intensity value of the first peak detected on the R side is compared with the intensity value of the first peak detected on the L side.

Here, for example, it is assumed that the intensity value of the first peak detected on the R side is "12", the intensity value of the first peak detected on the L side is "10", and the threshold (magnification) used for the threshold processing of the intensity ratio is "2".

In such a case, in the terminal 11 on the R side, 1.2 (=12/10) is obtained as the value of the intensity ratio which is the ratio of the peak intensity values, and the value "1.2" of the intensity ratio is less than the threshold value "2", so that the tap event detected on the R side is rejected.

Similarly, in the terminal 11 on the L side, 0.83 (=10/12) is obtained as the value of the intensity ratio, and the value "0.83" of the intensity ratio is less than the threshold "2", so that the tap event detected on the L side is also rejected.

As a result, a detection result (recognition result) that no tap event has been detected in both the R-side terminal 11 and the L-side terminal 11 is obtained.

In such an example, a case where the peak detected by the terminal 11 is noise propagating equally to the left and right, such as vibration during chewing by the user, for example, is assumed.

FIG. 10 illustrates an example of the pattern PT3.

In this example, as indicated by an arrow Q31, two peaks corresponding to two taps at the time of the double tap operation are detected by the first peak detection process on the R side, and one peak is detected by the first peak detection process on the L side. Then, the intensity values of the detected peaks are exchanged between the terminals 11 on the R side and the L side.

In particular, here, on the R side, the intensity value of the second peak is larger than the intensity value of the first peak, and the intensity value of the second peak detected on the R side is larger than the intensity value of the peak detected on the L side.

In this case, in the terminals 11 on the R side and the L side, the processing PS3 and the processing PS4 are performed as indicated by an arrow Q32.

Specifically, the processing PS4 is performed on the R side. At this time, in the processing PS4, the maximum value of the peak intensity value detected on the R side is compared with the peak intensity value detected on the L side.

Specifically, in the R-side terminal 11, in the processing PS4, the intensity ratio is calculated by dividing the intensity value of the second peak detected on the R side by the intensity value of the peak detected on the L side.

Then, since it is determined that the obtained intensity ratio is larger than the predetermined threshold on the R side, the tap event (double tap operation) detected on the R side is determined in processing PS5.

On the other hand, in the L-side terminal 11, since no tap event has been detected in the processing PS3, that is, the second and subsequent peak detection processes, the processing PS4 is not performed. That is, the peak intensity value received from the R-side terminal 11 is not used, and the event detection result indicating that no tap event has been detected is determined.

In this case, on the R side, since the processing PS4 is performed using the intensity value of the peak detected on the L side, there is no mismatch in the detection of the tap event between the R side and the L side similarly to the example illustrated in FIG. 8.

FIG. 11 illustrates an example of the pattern PT4.

In this example, as indicated by an arrow Q41, two peaks corresponding to two taps at the time of the double tap operation are detected in the first peak detection process on the R side, and no peak is detected in the first peak detection process on the L side. Therefore, the intensity values of the two peaks are transmitted from the terminal 11 on the R side to the terminal 11 on the L side, but the intensity values of the peaks are not transmitted from the terminal 11 on the L side to the terminal 11 on the R side.

In this case, in each of the terminals 11 on the R side and the L side, each process is performed as indicated by an arrow Q42.

Specifically, although the processing PS4 and the processing PS5 are performed on the R side, no peak intensity value is transmitted from the terminal 11 on the L side. Therefore, when the timeout period elapses, a tap event (double tap operation) detected on the R side is determined without substantially performing the processing PS4.

On the other hand, in the L-side terminal 11, since no peak is detected in the processing PS2, that is, the first peak detection process, the processing PS3 to PS5 are not performed. That is, the peak intensity value received from the R-side terminal 11 is not used, and the event detection result indicating that no tap event has been detected is determined.

Note that, in a case where the double tap operation or the triple tap operation is detected, even if only the intensity value of the first peak is exchanged between the left and right terminals 11, it is possible to suppress the occurrence of erroneous detection due to noise such as seepage of vibration of the tap on one ear side to the another ear side. Therefore, the terminal 11 may transmit only the intensity value of the first peak, that is, the first detected peak, to the partner terminal.

However, since there is a case where the intensity value of the peak corresponding to the second or third tap is larger than the intensity value corresponding to the first tap, when the intensity values of all the peaks are exchanged (transmitted and received) between the left and right terminals 11, occurrence of erroneous detection can be suppressed, and a tap event can be detected with higher accuracy.

<Description of Peak Detection Process>

Next, the operation of each terminal 11 worn on the left and right ears of the user will be described.

When the terminal 11 is activated and supply of the sensor output signal from the IMU 41 to the low-power CPU 51 is started, the terminal 11 performs a peak detection process and an event detection process.

The peak detection process and the event detection process are performed in parallel each time a fixed amount, that is, a signal for a fixed period is supplied from the IMU 41. Furthermore, the peak detection process and the event detection process are performed in each of the terminals 11 worn on the left and right ears of the user.

First, the peak detection process by the terminal 11 will be described with reference to a flowchart of FIG. 12.

In step S11, the low-power CPU 51 performs peak detection on the basis of the sensor output signal indicating the measurement result of the acceleration supplied from the IMU 41. This peak detection processing is the first peak detection process described above, that is, the processing PS2.

Figure 13:
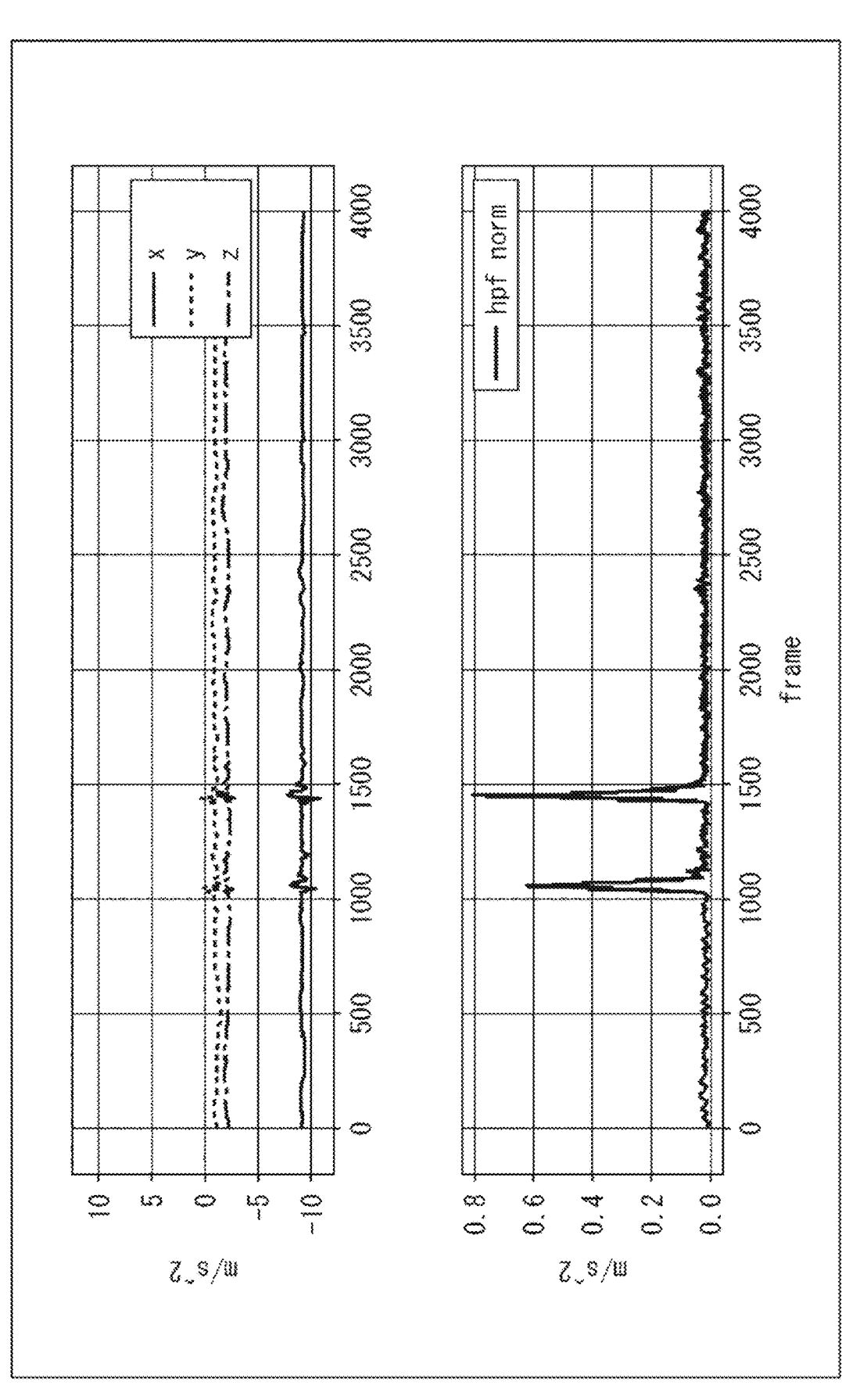
FIG. 13 is a diagram for explaining detection of a peak.

For example, as illustrated in the upper side of FIG. 13, a sensor output signal indicating a measurement result of acceleration in each of three directions orthogonal to each other is supplied from the IMU 41 to the low-power CPU 51. Note that in FIG. 13, the horizontal axis represents time, that is, a frame of the sensor output signal, and the vertical axis represents acceleration, that is, an intensity value.

The low-power CPU 51 performs filtering on the sensor output signal in such each direction by a band pass filter or the like, and calculates a norm on the basis of a signal obtained as a result. As a result, for example, a norm value at each time (frame) illustrated on the lower side in the drawing is obtained as an evaluation function.

The low-power CPU 51 detects the peak of the acceleration (sensor output signal) by comparing the norm value obtained in this manner with a predetermined threshold value. Specifically, as described above, in a case where the norm value becomes less than the threshold after a predetermined time after the norm value exceeds the threshold, it is determined that the peak is detected.

In the example illustrated in the lower part of FIG. 13, it can be seen that there are two peaks. These peaks are generated by tapping when the user performs a double tap operation.

Figure 12:
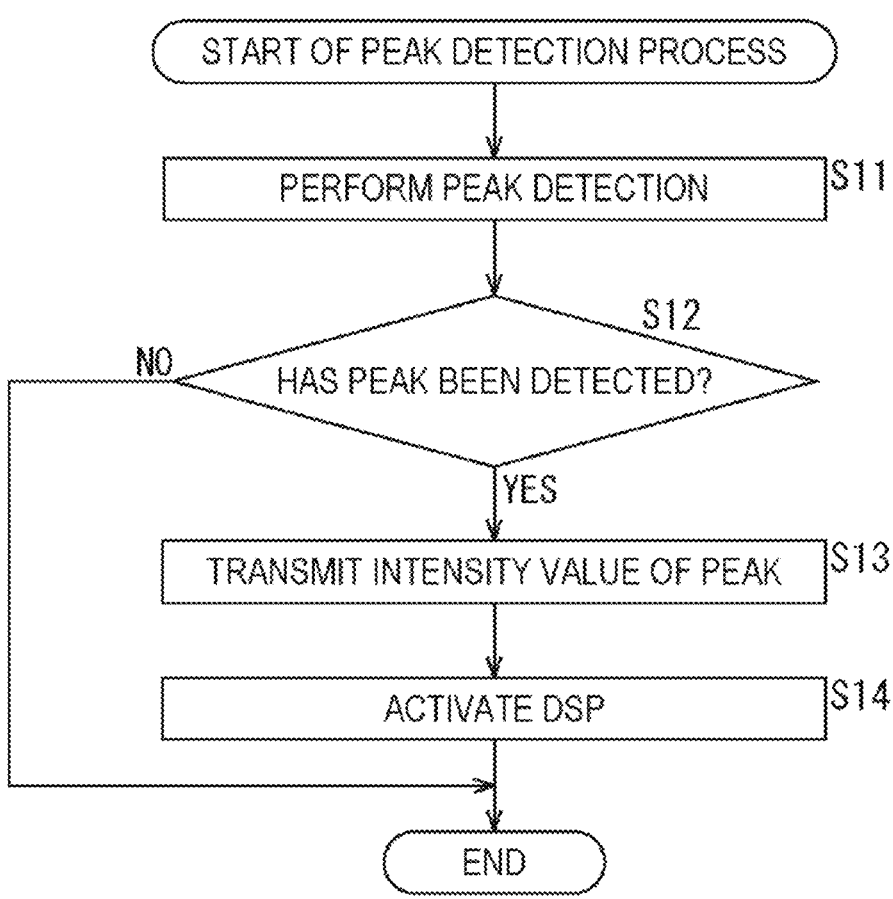
FIG. 12 is a flowchart illustrating a peak detection process.

Returning to the description of the flowchart of FIG. 12, in step S12, the low-power CPU 51 determines whether or not a peak has been detected in the processing of step S11.

In a case where it is determined in step S12 that no peak has been detected, transmission of the peak intensity value to the partner terminal is not performed, and thus the peak detection process ends.

On the other hand, in a case where it is determined in step S12 that a peak has been detected, the low-power CPU 51 supplies the intensity value of the detected peak to the communication module 42, and thereafter, the process proceeds to step S13.

In step S13, the communication module 42 transmits the intensity value of the peak supplied from the low-power CPU 51 to the partner terminal by wireless communication. The processing of step S13 corresponds to the above-described processing PS2-2. As described above, in the peak detection process, each time a peak is detected by the low-power CPU 51, the peak intensity value is immediately transmitted to the partner terminal.

In step S14, the low-power CPU 51 activates the DSP 52, supplies the sensor output signal indicating the measurement result of the acceleration supplied from the IMU 41 to the DSP 52, and executes the second and subsequent peak detection processes (processing PS3).

Note that when the DSP 52 is already activated and the second and subsequent peak detection processes are performed by the DSP 52, the processing of step S14 is not performed.

When the processing of step S14 is performed and the DSP 52 is activated, the peak detection process ends.

As described above, the terminal 11 sequentially detects the peak, and immediately transmits the intensity value of the peak to the partner terminal when the peak is detected. As described above, by transmitting the peak intensity value every time a peak is detected, a tap operation can be recognized with high accuracy in a short time. That is, the detection result of the tap event can be determined with high accuracy in a short reaction time.

<Description of Event Detection Process>

Figure 14:
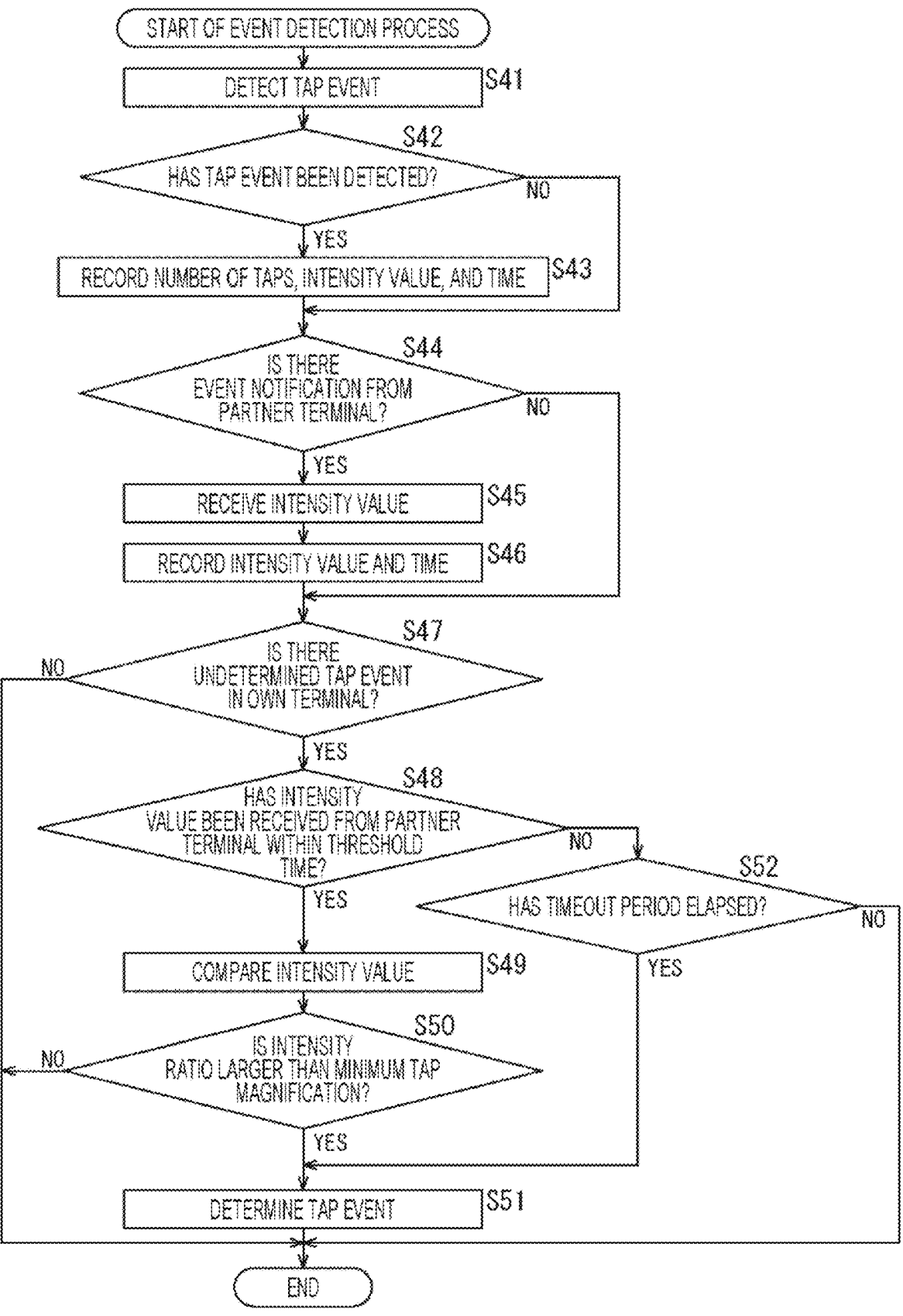
FIG. 14 is a flowchart for explaining an event detection process.

Furthermore, in parallel with the peak detection process described with reference to FIG. 12, the event detection process illustrated in FIG. 14 is performed in the terminal 11. Hereinafter, the event detection process performed by the terminal 11 will be described with reference to the flowchart of FIG. 14.

In step S41, the DSP 52 detects a tap event on the basis of a sensor output signal supplied from the IMU 41 via the low-power CPU 51.

The processing of step S41 corresponds to the second and subsequent peak detection process (processing PS3) described above. However, in a case where no peak is detected in the peak detection process of FIG. 12, the process of step S41 is not performed.

For example, in step S41, the DSP 52 detects a double tap operation or a triple tap operation as a tap event by detecting a peak corresponding to the second tap or the third tap on the basis of the sensor output signal.

At this time, for example, as described with reference to FIG. 6, in a case where the next peak is detected within a specified time from the last detected peak, the DSP 52 assumes that the peak is a peak corresponding to the tap. Furthermore, the DSP 52 receives supply of information indicating a detection result of a peak by the first peak detection process from the low-power CPU 51, and detects a tap event using the information.

Note that the DSP 52 may determine that a peak that does not satisfy a peak condition to be described later determined by a positional relationship between a plurality of peaks, that is, a relationship of a length of time between peaks (interval between peaks) or a relationship of intensity values of peaks is not a peak corresponding to a tap.

Furthermore, the DSP 52 performs calculation based on the sensor output signal and a DNN discriminator held in advance, thereby discriminating whether or not the sensor output signal obtained by the IMU 41 is a signal corresponding to a tap event, that is, a tap operation.

The DSP 52 determines the final detection result of the tap event on the basis of the results of the second and subsequent peak detection processes and the discrimination result by the DNN discriminator, and supplies the discrimination result to the low-power CPU 51.

For example, regarding a tap operation detected as a tap event, the DSP 52 supplies information including the number of taps, a peak intensity value in each tap, a time at which each tap is performed (detected), and the like to the low-power CPU 51 as a detection result of the tap event.

In step S42, the low-power CPU 51 determines whether or not a tap event has been detected by the processing in step S41.

In a case where it is determined in step S42 that no tap event has been detected, that is, in a case where a detection result indicating that no tap event has been detected is supplied from the DSP 52, the processing in step S43 is skipped, and thereafter, the process proceeds to step S44.

On the other hand, in a case where it is determined in step S42 that a tap event is detected, the low-power CPU 51 records the number of taps, the intensity value of the peak, and the time of the peak on the basis of the detection result of the tap event supplied from the DSP 52 in step S43.

For example, in a case where a double tap operation or a triple tap operation is detected by the DSP 52, a peak corresponding to the second tap or the third tap is also detected in step S11 of the peak detection process performed in parallel with the event detection process. Therefore, by comparing the detection result of the tap event by the DSP 52 with the detection result of the peak by the low-power CPU 51, it is possible to specify which tap of the tap operation the peak detected by the low-power CPU 51 corresponds to.

The low-power CPU 51 records the number of taps in the detected tap event (tap operation), the peak intensity value for each tap, and the time (peak occurrence time) on the basis of the detection result of the peak in step S11 and the result of the tap event detection from the DSP 52. In this case, the peak intensity value to be recorded is the peak intensity value detected by the low-power CPU 51, but the peak intensity value detected by the DSP 52 may be recorded as it is.

When it is determined in step S42 that no tap event has been detected or the processing in step S43 is performed, the low-power CPU 51 determines in step S44 whether or not there is an event notification from the partner terminal.

The event notification here is a notification of a peak intensity value detected by a partner terminal, and in step S44, it is determined that there is an event notification in a case where the peak intensity value is transmitted from the partner terminal.

In a case where it is determined in step S44 that there is no event notification, the processing in steps S45 and S46 is skipped, and thereafter, the process proceeds to step S47.

On the other hand, in a case where it is determined in step S44 that there is an event notification, in step S45, the communication module 42 receives the event notification transmitted from the partner terminal, that is, the intensity value of the peak, and supplies the received event notification to the low-power CPU 51.

In step S46, the low-power CPU 51 records the peak intensity value supplied from the communication module 42 and the time when the peak intensity value is received.

In a case where the processing of step S46 has been performed or it is determined in step S44 that there is no event notification, the low-power CPU 51 determines in step S47 whether or not there is an undetermined tap event in the own terminal.

That is, in step S47, in a case where there is a tap event for which a detection result of the tap event has not been determined among the tap events detected in step S41, it is determined that there is an undetermined tap event.

In a case where it is determined in step S47 that there is no undetermined tap event, the event detection process ends.

On the other hand, in a case where it is determined in step S47 that there is an undetermined tap event, in step S48, the low-power CPU 51 determines whether or not a peak intensity value has been received from the partner terminal within a predetermined threshold time.

For example, in a case where the peak intensity value has been received from the partner terminal within a predetermined threshold time from the occurrence time of the first peak in an undetermined tap event (tap operation) or the detection time of the peak, it is determined in step S48 that the peak intensity value has been received.

In a case where it is determined in step S48 that the peak intensity value has been received, in step S49, the low-power CPU 51 compares the intensity value of the peak detected by the own terminal with the intensity value of the peak received from the partner terminal.

That is, for an undetermined tap event to be processed, the low-power CPU 51 calculates an intensity ratio on the basis of the maximum value of the peak intensity value recorded in step S43 and the maximum value of the peak intensity value recorded in step S46, and compares the obtained intensity ratio with a predetermined threshold. Hereinafter, this threshold is also referred to as a minimum tap magnification.

In particular, in step S49, an intensity ratio between the maximum value of one or a plurality of peak intensity values for an undetermined tap event to be processed obtained by the own terminal within a predetermined period and the maximum value of one or a plurality of peak intensity values received from the partner terminal within the predetermined period is calculated.

In step S50, the low-power CPU 51 determines whether or not the intensity ratio obtained in step S49 is larger than the minimum tap magnification.

In a case where it is determined in step S50 that the intensity ratio is less than or equal to the minimum tap magnification, the tap event to be processed is rejected, and the event detection process ends. That is, the undetermined tap event to be processed is finally recognized as not a tap event, in other words, a noise.

On the other hand, in a case where it is determined in step S50 that the intensity ratio is larger than the minimum tap magnification, the low-power CPU 51 determines the detection result of the tap event to be processed in step S51.

For example, the low-power CPU 51 generates a tap event detection notification indicating that a double tap operation or a triple tap operation on the own terminal side is detected as a tap event, supplies the tap event detection notification to the communication module, and causes the communication module 42 to transmit the tap event detection notification to the reproduction control device.

Since the audio data of the sound effect corresponding to the tap event detection notification is transmitted from the reproduction control device to the terminal 11 that has transmitted the tap event detection notification, for example, the communication module 42 receives the audio data from the reproduction control device and supplies the audio data to the control unit 43.

The control unit 43 supplies the audio data supplied from the communication module 42 to the sound output unit 44 to reproduce a sound effect based on the audio data. In this case, for example, the sound effect is reproduced only in the terminal 11 on the side on which the user performs the tap operation. As a result, the user can know that the tap operation performed by the user is recognized.

Furthermore, the reproduction control device appropriately transmits an operation command according to the tap event detection notification to each terminal 11, and the communication module 42 of each terminal 11 receives the operation command from the reproduction control device and supplies the operation command to the control unit 43. Then, the control unit 43 performs processing according to the operation command, such as stopping playing music, according to the supplied operation command.

When the processing in step S51 is performed and the detection result of the tap event is determined, the event detection process ends.

Furthermore, in a case where it is determined in step S48 that the peak intensity value has not been received, in step S52, the low-power CPU 51 determines whether or not a timeout period has elapsed.

For example, in step S52, in a case where a predetermined time-out period (timeout period) has elapsed from the occurrence time of the last peak or the detection time of the peak in the undetermined tap event (tap operation), it is determined that the timeout period has elapsed.

In a case where it is determined in step S52 that the timeout period has elapsed, thereafter, the process proceeds to step S51, and the detection result of the undetermined tap event to be processed is determined.

In this case, since the peak intensity value has not been transmitted from the partner terminal, the comparison of the peak intensity values is not performed, and the tap event detected on the own terminal side is determined as it is.

On the other hand, in a case where it is determined in step S52 that the timeout period has not yet elapsed, since the detection result of the tap event cannot be determined until the timeout period has elapsed, the event detection process ends. In this case, in the processing of steps S48 to S51 of the event detection process performed thereafter, the detection result of the tap event is determined or the tap event is rejected by timeout or comparison of the peak intensity value.

As described above, the terminal 11 detects the tap event in its own terminal, and finally determines the detection result of the tap event on the basis of the detection result and the comparison result of the peak intensity value. As a result, the tap operation can be recognized with high accuracy in a short time.

<Wireless Communication Between Left and Right Terminals 11>

Here, with reference to FIGS. 15 to 17, a timing of wireless communication performed between the left and right terminals 11 and a process of detecting a tap event performed in the terminal 11 will be described.

Figure 15:
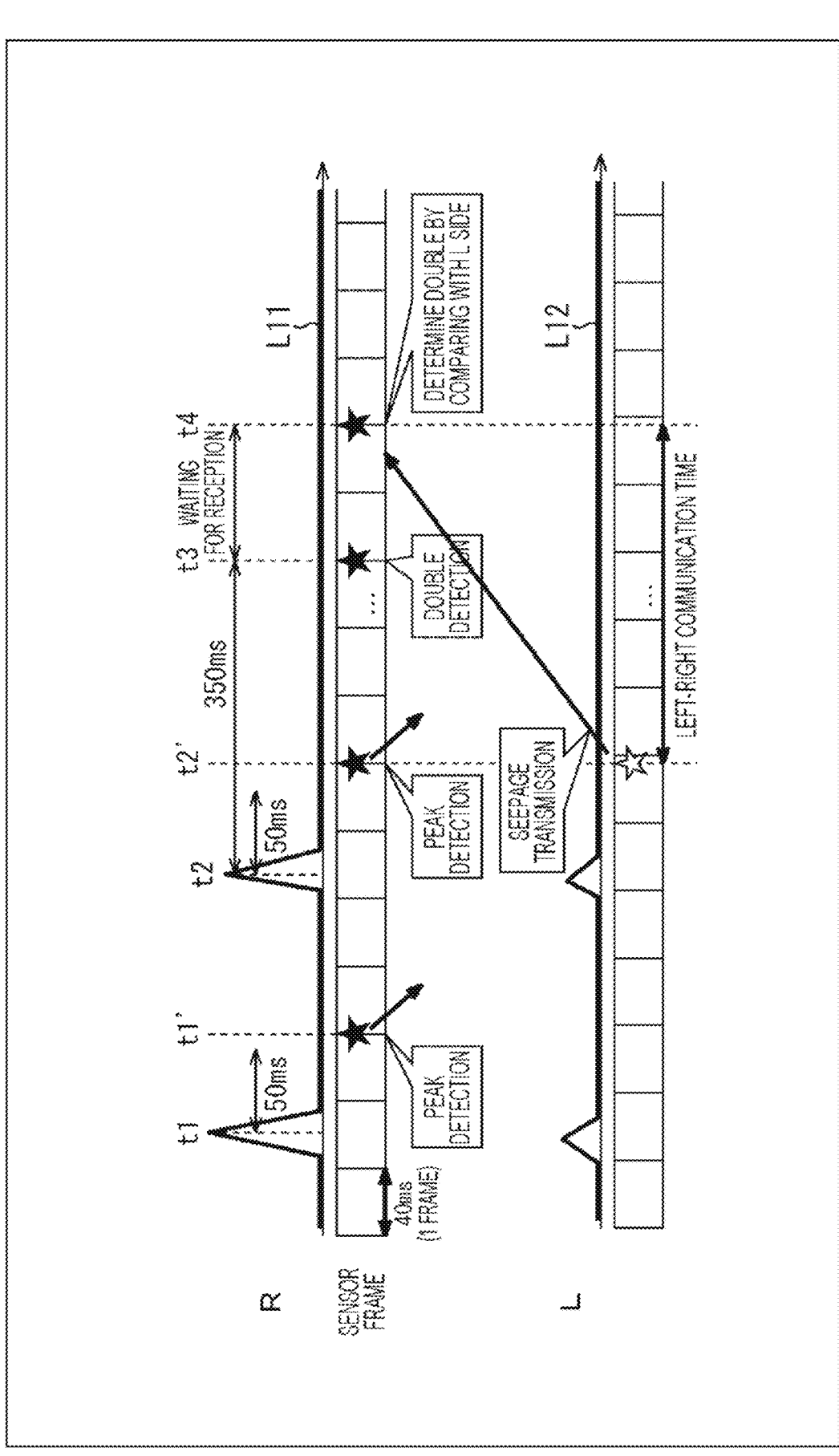
FIG. 15 is a diagram for explaining timing of wireless communication and detection of a tap event.
Figure 16:
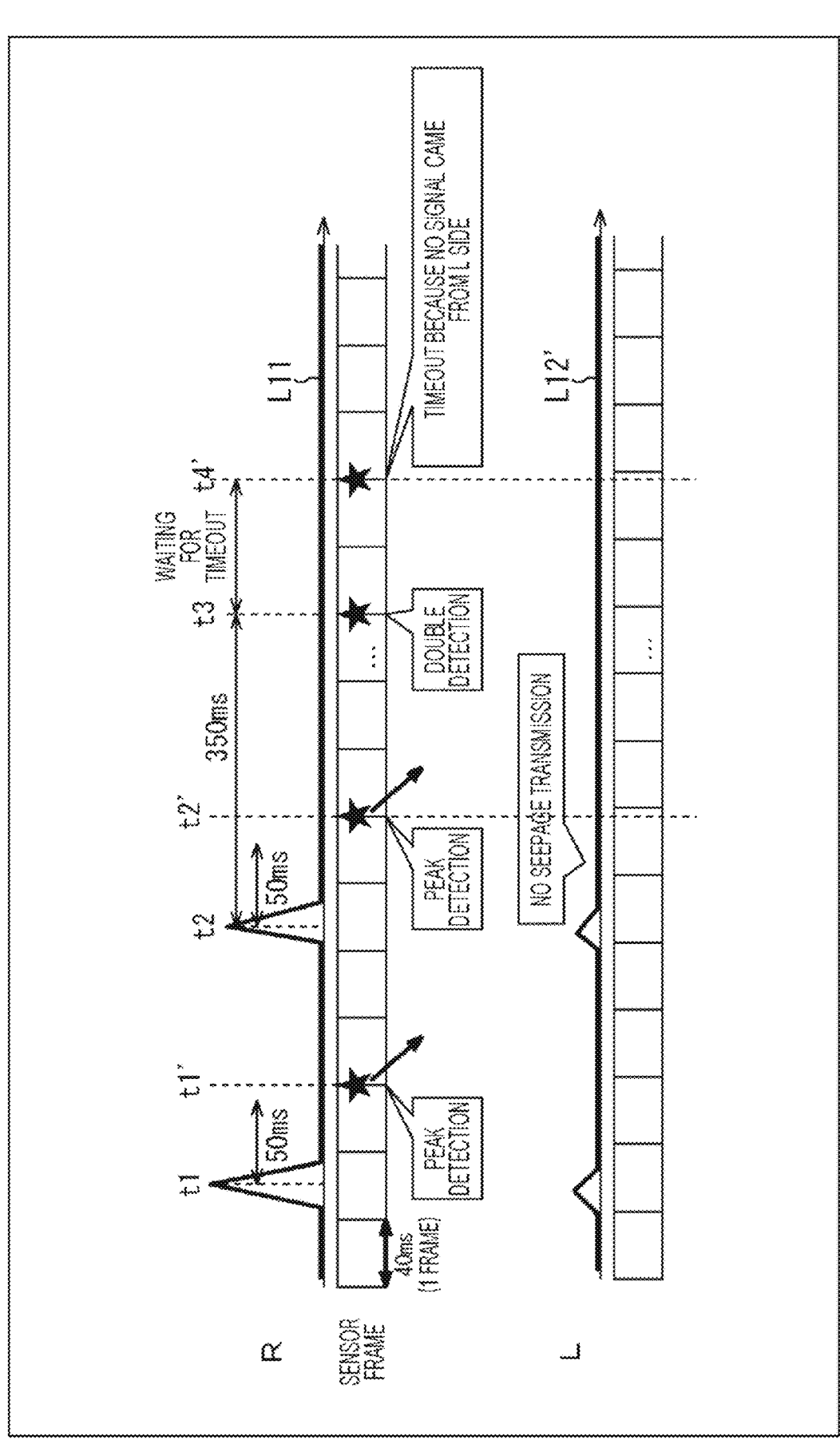
FIG. 16 is a diagram for explaining timing of wireless communication and detection of a tap event.
Figure 17:
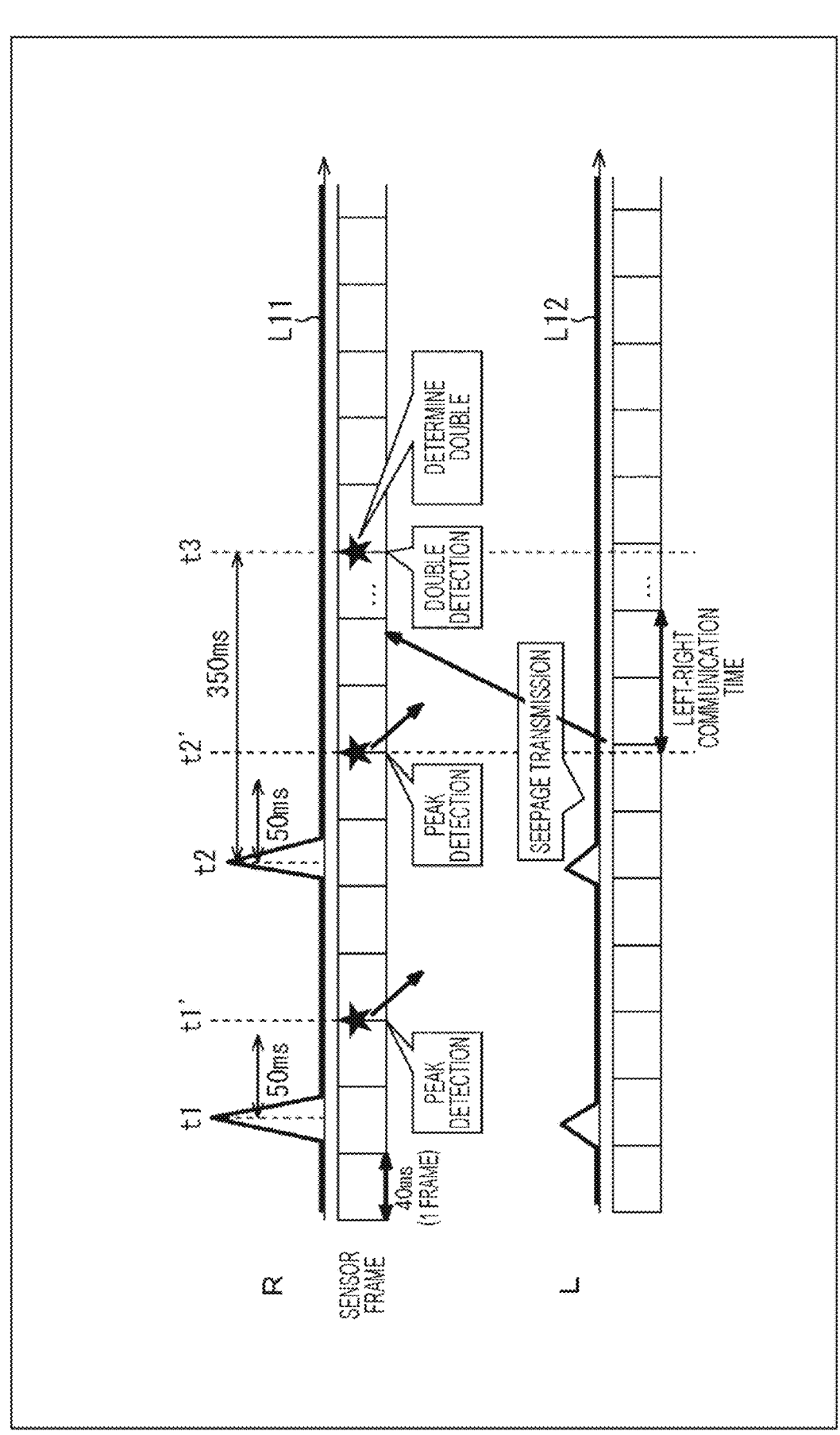
FIG. 17 is a diagram for explaining timing of wireless communication and detection of a tap event.

Note that portions corresponding to each other in FIGS. 15 to 17 are denoted by the same reference signs, and the description thereof will be appropriately omitted.

Each example illustrated in FIGS. 15 to 17 is an example in which a double tap operation is performed in the terminal 11 on the right ear side (R side) and detection of the double tap operation is determined.

Specifically, for example, in the example illustrated in FIG. 15, comparison with the peak intensity value received from the partner terminal is performed, and the double tap operation is determined.

In FIG. 15, a polygonal line L11 represents a time waveform of acceleration detected by the terminal 11 on the R side (right ear side), more specifically, the above-described norm value (evaluation function), and a polygonal line L12 represents a time waveform of acceleration detected by the terminal 11 on the L side (left ear side). Furthermore, here, the time for one frame of the signal indicating the norm value is 40 ms.

In this example, in the R-side terminal 11, a peak corresponding to the first tap in the double tap operation occurs (appears) at time t1, the peak is detected at time t1', and the intensity value of the detected peak is transmitted to the L-side terminal 11.

Similarly, in the R-side terminal 11, a peak corresponding to the second tap in the double tap operation occurs at time t2, the peak is detected at time t2', and the intensity value of the detected peak is transmitted to the L-side terminal 11.

At this time, the L-side terminal 11 also detects a peak at time t2', and the intensity value of the peak is transmitted to the R-side terminal 11.

Furthermore, in the R-side terminal 11, the peak corresponding to the third tap is not detected after the time t2', and there is no possibility that the triple tap operation is detected at the time t3 at which 350 ms, which is the specified time, has elapsed from the time t2. Therefore, in the terminal 11 on the R side, the double tap operation is detected at the time t3.

Then, thereafter, in order to perform comparison with the peak intensity value detected by the L-side terminal 11 (partner terminal), reception of the peak intensity value from the L-side terminal 11 is waited, and when the peak intensity value from the L-side terminal 11 is received at time t4, the peak intensity value is compared.

That is, the R-side terminal 11 receives the peak intensity value at time t4 and compares the peak intensity values, and as a result, the detection result of the double tap operation is determined.

In this example, the communication time between the R-side terminal and the L-side terminal 11 is a time from time t2' to time t4. Furthermore, the time from time t2' to time t3 is 300 ms.

The 300 ms is obtained by subtracting 50 ms from the time t2 of the second peak to the time t2' at which the peak is detected (detection of the peak is determined) from 350 ms from the time t2 of the second peak to the time t3 at which the double tap operation or the triple tap operation is detected.

In this example, since the communication time between the R-side terminal and the L-side terminal 11 is longer than 300 ms, after the double tap operation is detected at time t3, the detection result of the double tap operation is determined at time t4 after waiting for the reception waiting time from time t3 to time t4.

The reception waiting time at this time may be only a time obtained by subtracting 300 ms from the communication time between the R-side and L-side terminals 11. This is because the terminal 11 immediately transmits the peak intensity value to the partner terminal at the timing when the peak is detected.

In a case where the peak intensity value is transmitted after the tap event, that is, the double tap operation is detected, the detection of the double tap operation is determined at the time when the communication time between the R-side terminal and the L-side terminal 11 has elapsed from the time t3 at which the double tap operation is detected.

Therefore, in this example, the detection of the double tap operation is determined when 300 ms elapses from the time t4.

On the other hand, in the terminal 11, since the peak intensity value has already been transmitted before the double tap operation is detected, it is possible to determine the detection result of the double tap operation at the time t4. That is, for example, the R-side terminal 11 can determine the detection result of the tap event at the time point when the time for reliably receiving the peak intensity value from the L side has elapsed after the peak is detected. Therefore, it is possible to recognize the tap operation (determine the detection of the tap operation) in a shorter time.

Moreover, in the terminal 11, the peak intensity values are exchanged between the R-side terminal 11 and the L-side terminal 11, and the detection of the tap event is determined using the same peak intensity value in the R-side terminal 11 and the L-side terminal 11, so that the tap event can be detected without causing inconsistency. In other words, a tap event (tap operation) can be detected with high accuracy.

In the example illustrated in FIG. 16, the double tap operation is determined as the timeout period elapses.

In FIG. 16, a polygonal line L11 represents a norm value (evaluation function) of the acceleration detected by the terminal 11 on the R side (right ear side), and a polygonal line L12' represents a norm value of the acceleration detected by the terminal 11 on the L side (left ear side).

In this example, similarly to the case in FIG. 15, the first peak appears at time t1 in the terminal 11 on the R side, and the peak intensity value is transmitted to the terminal 11 on the L side at time t1'.

Furthermore, the second peak appears at time t2 in the terminal 11 on the R side, and the peak intensity value is transmitted to the terminal 11 on the L side at time t2'. However, since no peak is detected in the terminal 11 on the L side, the peak intensity value is not transmitted to the R side.

Moreover, in the terminal 11 on the R side, the peak corresponding to the third tap is not detected after time t2', and the double tap operation is detected at time t3 when 350 ms, which is the specified time, has elapsed from time t2.

Thereafter, in order to compare the peak intensity value with the peak intensity value detected by the L-side terminal 11 (partner terminal), reception waiting or timeout waiting is performed.

However, in this example, for example, since the peak intensity value has not been transmitted from the L-side terminal 11 from the time t2' at which the peak is detected last to the time t4' at which the timeout period elapses, a timeout occurs at the time t4', and the detection result of the double tap operation is determined.

Here, the timeout period is, for example, a communication time required between the R-side terminal and the L-side terminal 11 in the example of FIG. 15. Note that the timing to start counting the timeout period may be the time when the peak is detected last, the time of the peak detected last, or the like.

In this example, the time from the time t3 to the time t4' is the timeout waiting time, but since the detection result of the tap event can be determined at the time when the timeout period has elapsed, it is possible to recognize the tap operation (determine the detection of the tap operation) with high accuracy in a shorter time, similarly to the example of FIG. 15.

In the example illustrated in FIG. 17, the double tap operation is determined by comparison with the peak intensity value received from the partner terminal without waiting for reception.

In the example of FIG. 17, in the R-side terminal 11 and the L-side terminal 11, the same processing as in the case of FIG. 15 is performed until time t2'.

That is, in the R-side terminal 11, the first peak appearing at time t1 is detected at time t1', and the intensity value of the peak is transmitted to the L-side terminal 11.

Similarly, in the R-side terminal 11, the second peak appearing at time t2 is detected at time t2', and the intensity value of the peak is transmitted to the L-side terminal 11. Furthermore, also in the terminal 11 on the L side, the peak appearing at time t2 is detected at time t2', and the intensity value of the peak is transmitted to the terminal 11 on the R side.

In this example, since the communication time between the terminal 11 on the R side and the terminal 11 on the L side is shorter than 300 ms, the peak intensity value transmitted from the terminal on the L side at time t2' is received by the terminal 11 on the R side at a time before time t3.

Therefore, in the R-side terminal 11, 350 ms that is the specified time has elapsed from the time t2, and at the time t3 when the double tap operation is detected, the intensity value of the peak already detected in the R-side terminal 11 can be compared with the intensity value of the peak received from the L-side terminal 11. Therefore, it is possible to immediately compare the intensity values without waiting for reception or waiting for timeout at the time t3 and to determine the detection result of the double tap operation.

Even in such an example of FIG. 17, it is possible to recognize the tap operation (determine the detection of the tap operation) with high accuracy in a shorter time.

According to the terminal 11 to which the present technology is applied as described above, the left and right terminals 11 exchange the peak intensity values obtained by the first peak detection process with each other, and compare the intensity ratio obtained from the peak intensity values obtained by the terminals 11 with the minimum tap magnification, whereby the tap operation can be detected with high accuracy without causing inconsistency.

Figure 18:
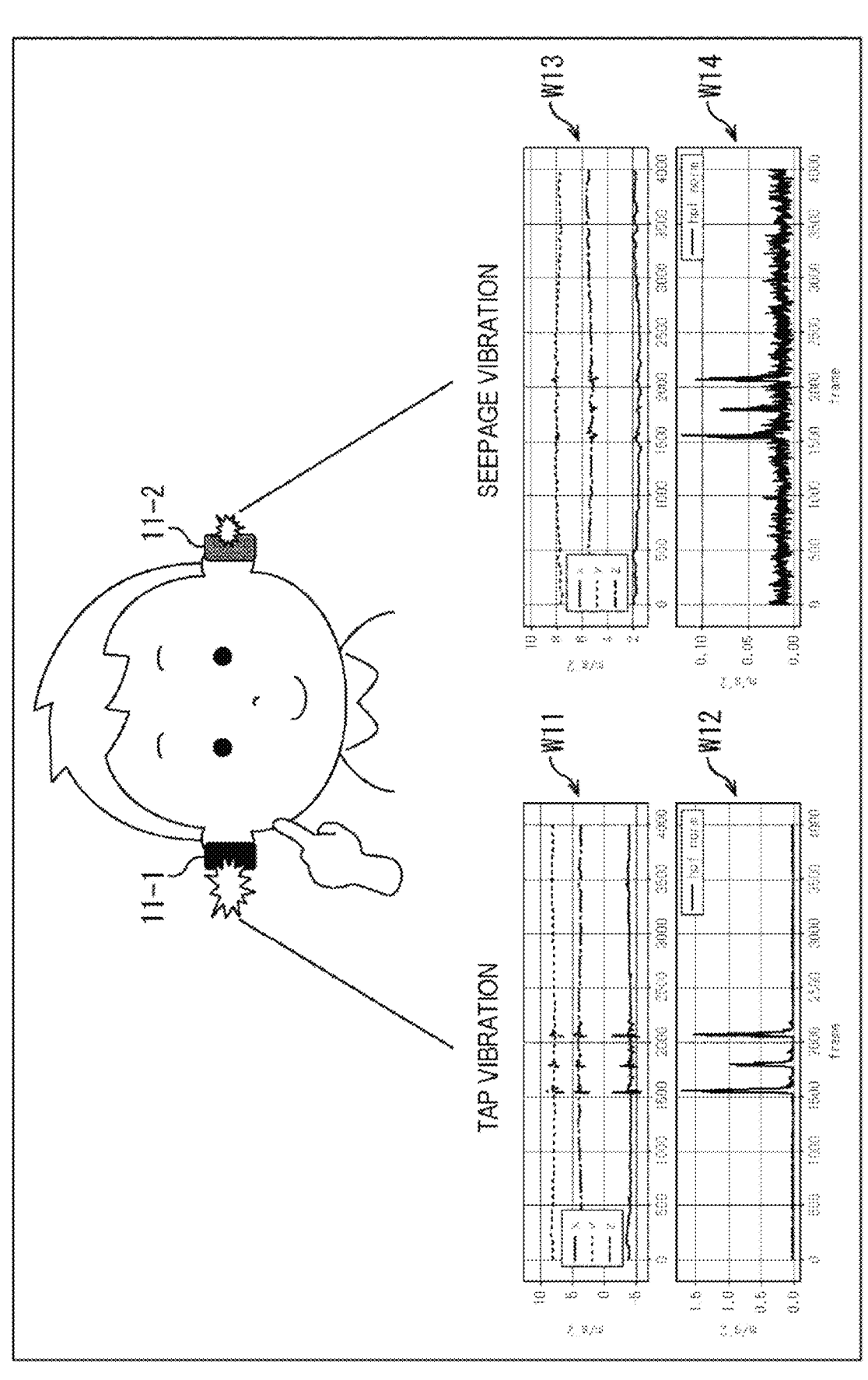
FIG. 18 is a diagram for explaining suppression of erroneous detection by comparison of intensity values.

For example, as illustrated in FIG. 18, when the user taps around the right ear side, a sensor output signal as indicated by an arrow W11 is observed in the terminal 11-1 worn on the right ear. Note that, in the portions indicated by the arrows W11 to W14 in FIG. 18, the horizontal axis represents time (frame), and the vertical axis represents acceleration.

In the terminal 11-1, a norm value (evaluation function) indicated by an arrow W11 is obtained from the sensor output signal indicated by an arrow W12. In this example, there are three peaks having a size of about 1.0 to 1.5, and it can be seen that the triple tap operation has been performed by the user.

On the other hand, in the terminal 11-2 worn on the left ear, a sensor output signal as indicated by an arrow W13 is observed. In this sensor output signal, vibration generated by tapping around the right ear of the user is transmitted to the left ear side.

In the terminal 11-2, a norm value (evaluation function) indicated by the arrow W13 is obtained from the sensor output signal indicated by an arrow W14. In this example, there are 3 peaks having a size of about 0.1, but it can be seen that these peaks are smaller than the peak on the terminal 11-1 side.

Therefore, the terminal 11-1 detects the triple tap operation because the intensity ratio exceeds the minimum tap magnification, but the terminal 11-2 rejects the detection result of the tap event without the intensity ratio exceeding the minimum tap magnification.

As described above, in the terminal 11, the peak intensity values obtained in the left and right terminals 11 are compared, and the tap event with the larger peak intensity value is adopted, so that occurrence of erroneous detection of the tap event can be suppressed.

On the other hand, for example, noise such as vibration of chewing at a meal having a high frequency of occurrence or vibration during walking is transmitted to the left and right terminals 11 at substantially the same time with the same magnitude. Therefore, since the intensity ratio in each of the left and right terminals 11 does not exceed the minimum tap magnification, it is possible to distinguish from the actual tap operation.

Figure 19:
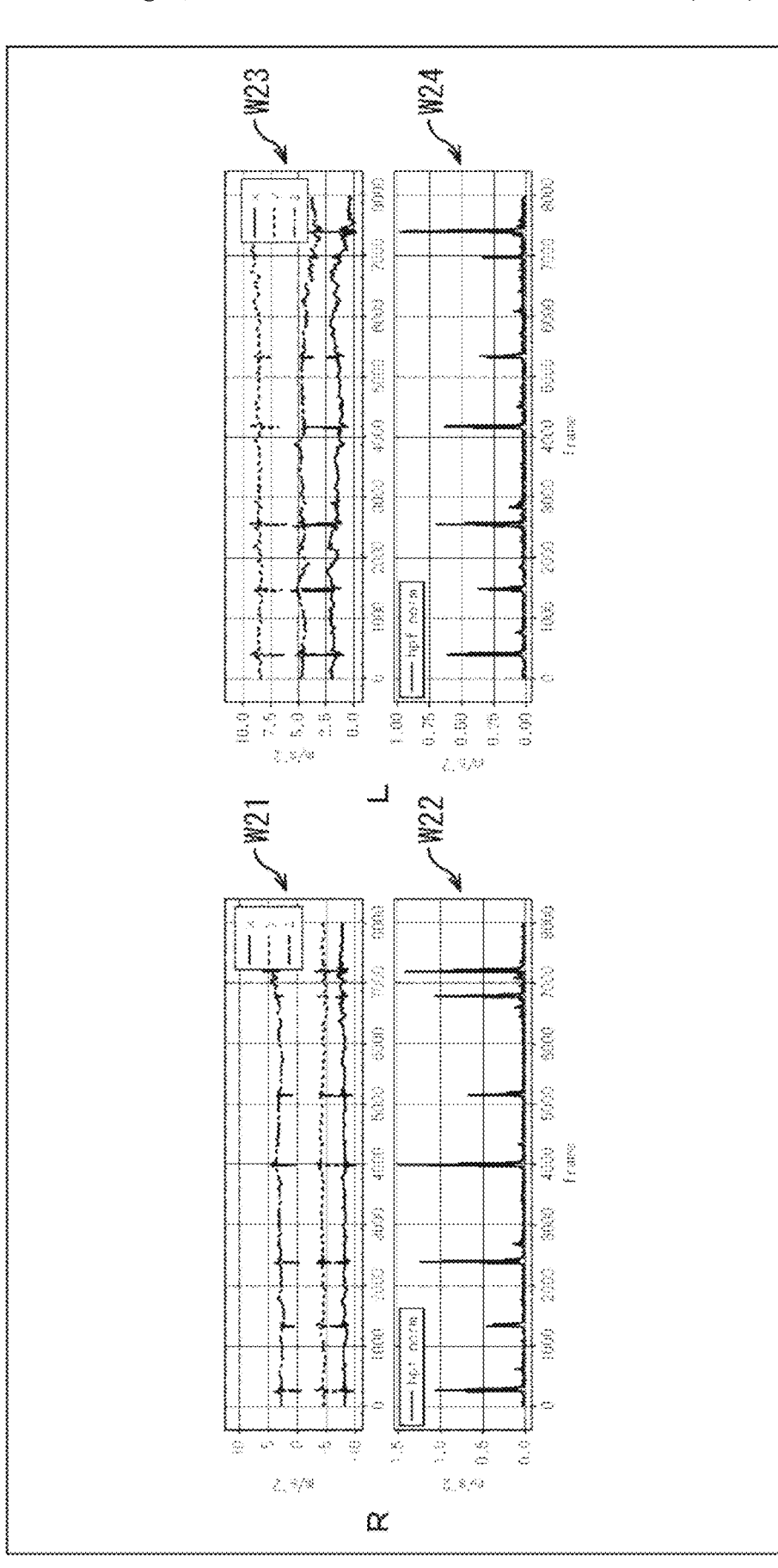
FIG. 19 is a diagram for explaining suppression of erroneous detection by comparison of intensity values.

Specifically, for example, in a case where the user has had a meal, the sensor output signal illustrated in FIG. 19 is observed. Note that in FIG. 19, the horizontal axis represents time (frame), and the vertical axis represents acceleration.

For example, during a meal of the user, in the terminal 11-1 worn on the right ear, a sensor output signal as indicated by an arrow W21 is observed, and a norm value (evaluation function) indicated by an arrow W22 is obtained from these sensor output signals. In this example, a plurality of peaks having a size of about 1.0 to 1.5 are observed.

Similarly, in the terminal 11-2 worn on the left ear, a sensor output signal as indicated by an arrow W23 is observed, and a norm value indicated by an arrow W24 is obtained from these sensor output signals. Also in the portion indicated by W24, a plurality of peaks having a size of about 0.6 to 1.0 are observed.

Therefore, in such a case, since the intensity ratio does not exceed the minimum tap magnification in both the terminal 11-1 and the terminal 11-2, the detection result of the tap event is rejected. That is, a tap event is not detected in each of the left and right terminals 11, and erroneous detection does not occur.

Furthermore, since the terminal 11 exchanges the peak intensity values with each other, it is possible to reduce the time for communication and recognize the tap event in a shorter time.

Figure 20:
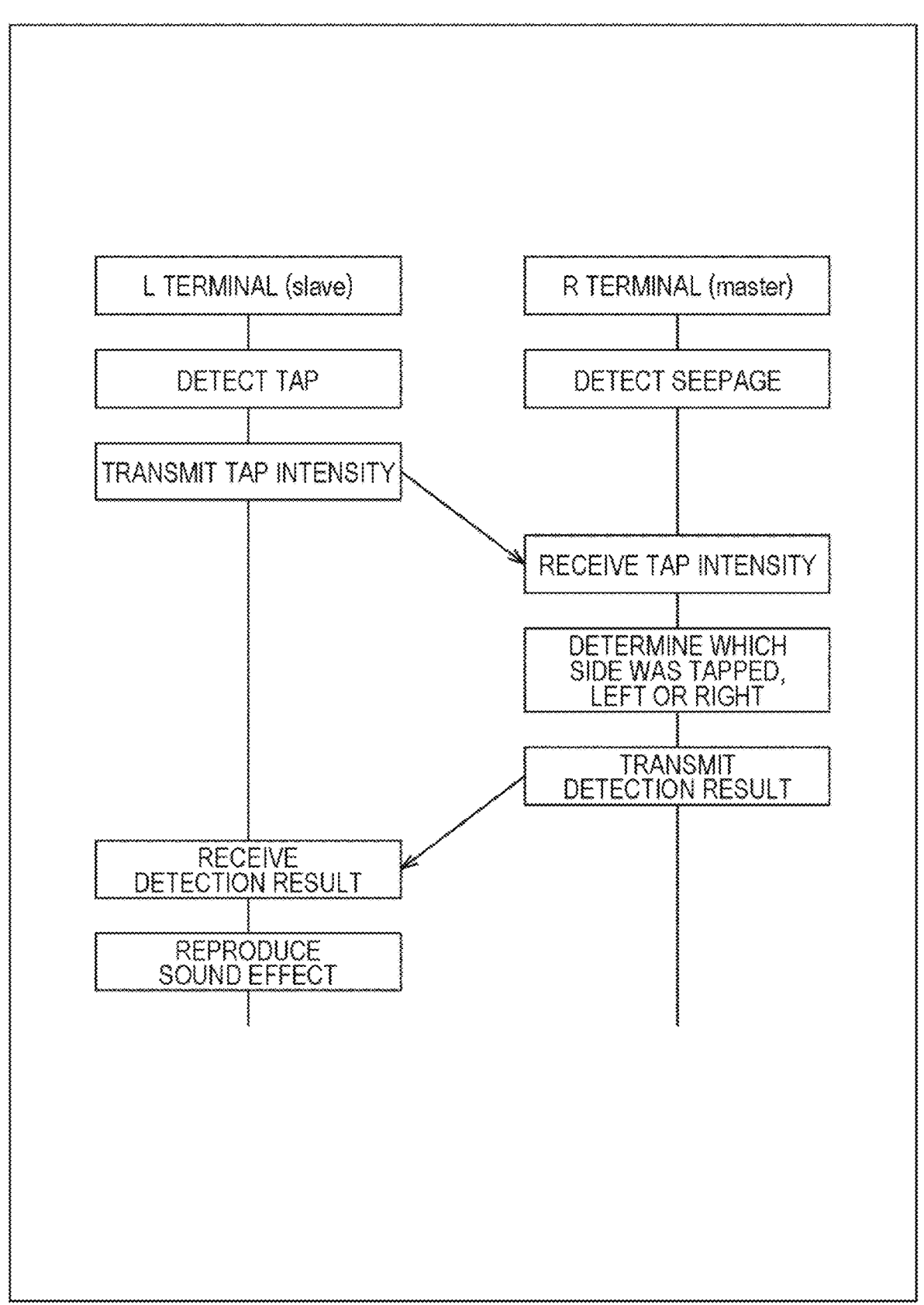
FIG. 20 is a diagram for explaining a process in a general headphone.

For example, in a case where the tap function is to be realized on the basis of a general master-slave method, communication is performed as illustrated in FIG. 20, and a tap event is detected (recognized).

That is, in FIG. 20, the terminal on the left side (L side) is a slave, and the terminal on the right side (R side) is a master.

In this example, the tap intensity (peak intensity value) detected by the terminal on the L side is always transmitted to the terminal on the R side regardless of which one of the left and right ear peripheries the user performs the tap operation on. That is, the peak intensity value is always collected only in the master-side terminal. Note that this example is an example in which the user performs a tap operation around the L-side terminal.

When the tap event is detected in the R-side terminal, the detection result is transmitted to the L-side terminal, and the sound effect is reproduced in response to the tap operation by the user in the L-side terminal.

As described above, in a general headphone, two communications occur at different timings, that is, transmission of the peak intensity value from the slave-side terminal to the master-side terminal, and transmission of the detection result from the master-side terminal to the slave-side terminal. Therefore, it is necessary to wait for twice the communication time required between the terminals until the sound effect is reproduced after the user performs the tap operation, that is, until there is a reaction to the tap operation.

Figure 21:
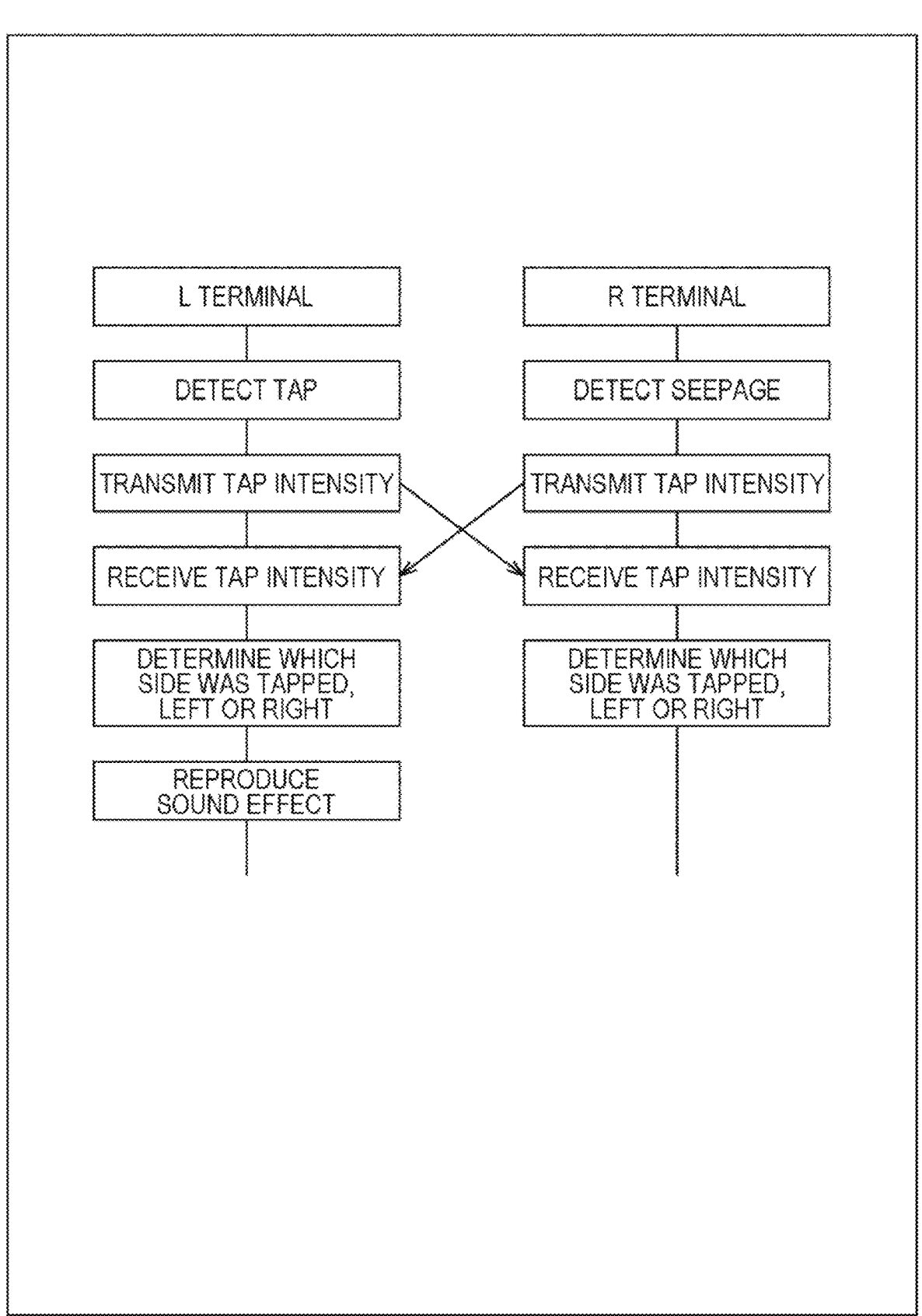
FIG. 21 is a diagram for explaining a process in the terminal according to the present technology.

On the other hand, in the terminal 11 to which the present technology is applied, for example, as illustrated in FIG. 21, the peak intensity values are exchanged between the left and right terminals 11, and the peak intensity values are compared in the respective terminals 11.

Therefore, a total of two communications are required, but since the two communications are performed at substantially the same timing, the overhead of the communication may be one. Therefore, the time from when the user performs the tap operation to when the sound effect is reproduced can be made shorter than in the example illustrated in FIG. 20. In other words, the tap event can be recognized in a shorter time.

Note that, when a peak is not detected in one terminal 11, the transmission of the peak intensity value from the terminal 11 to the partner terminal is not performed, but since the partner terminal is only required to wait for the above-described timeout period, it does not take time to determine the tap event.

Furthermore, for example, a case where the user performs a double tap operation on the periphery of the left ear will be considered.

Figure 22:
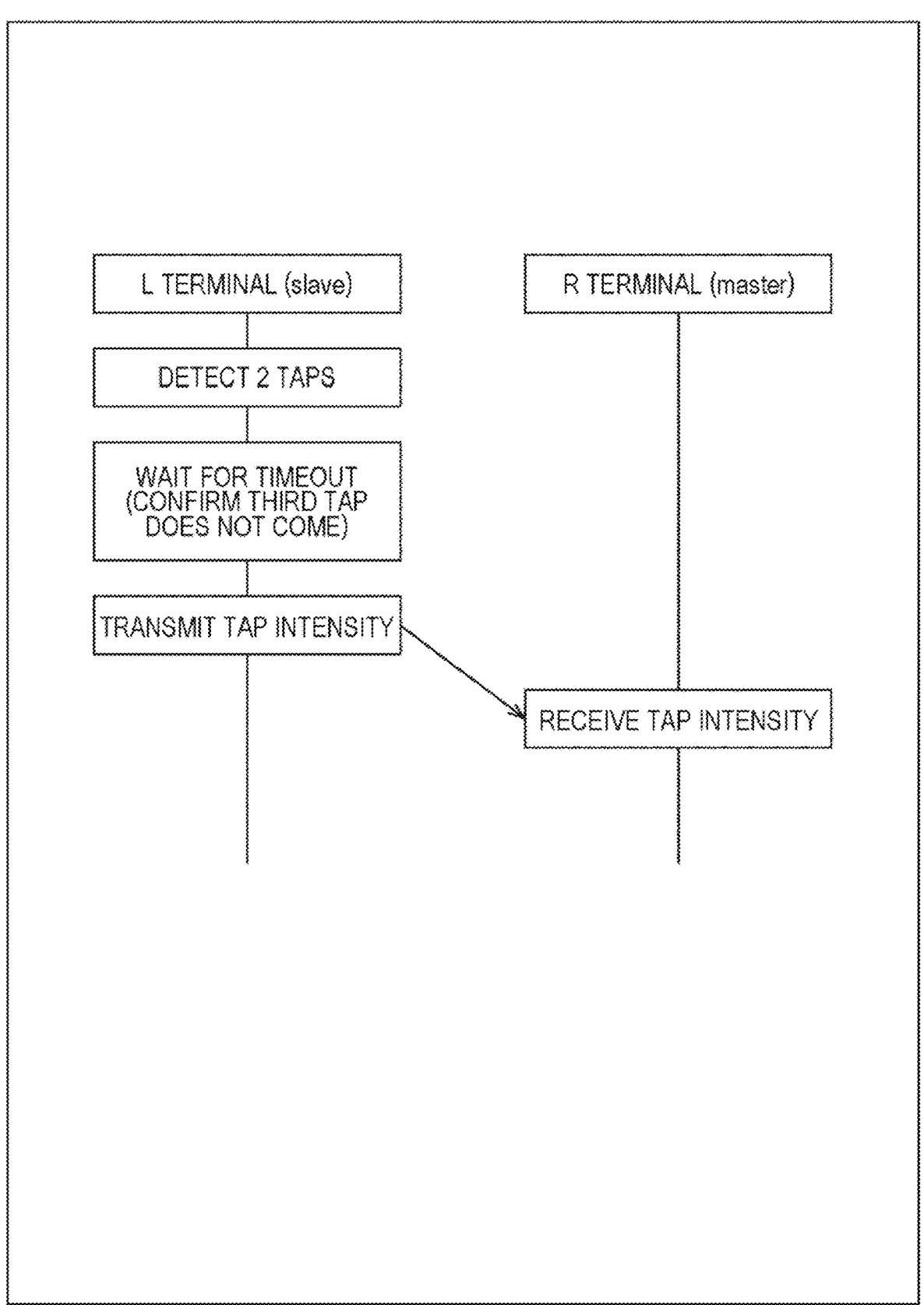
FIG. 22 is a diagram for explaining a process in a general headphone.

At this time, for example, it is assumed that a master-side terminal and a slave-side terminal are provided like a general headphone. Furthermore, as illustrated in FIG. 22, when a tap operation is detected in the terminal on the L side (left side) which is the slave side, the tap intensity (peak intensity value) at that time is transmitted to the terminal on the R side (right side) which is the master side.

In this case, since the peak intensity value is transmitted from the L-side terminal to the R-side terminal after the double tap operation is detected in the L-side terminal, it takes time to determine the detection of the double tap operation (tap event).

In particular, since it is necessary to confirm that there is no third tap in order to detect the double tap operation, it takes time to start transmission of the peak intensity value to the R-side terminal. Then, the time from when the user performs the tap operation until there is a reaction to the tap operation, such as reproduction of a sound effect or reflection of an operation to reproduce music, becomes long.

On the other hand, in the terminal 11 to which the present technology is applied, the peak intensity value is transmitted to the partner terminal every time one tap (peak) is detected.

Figure 23:
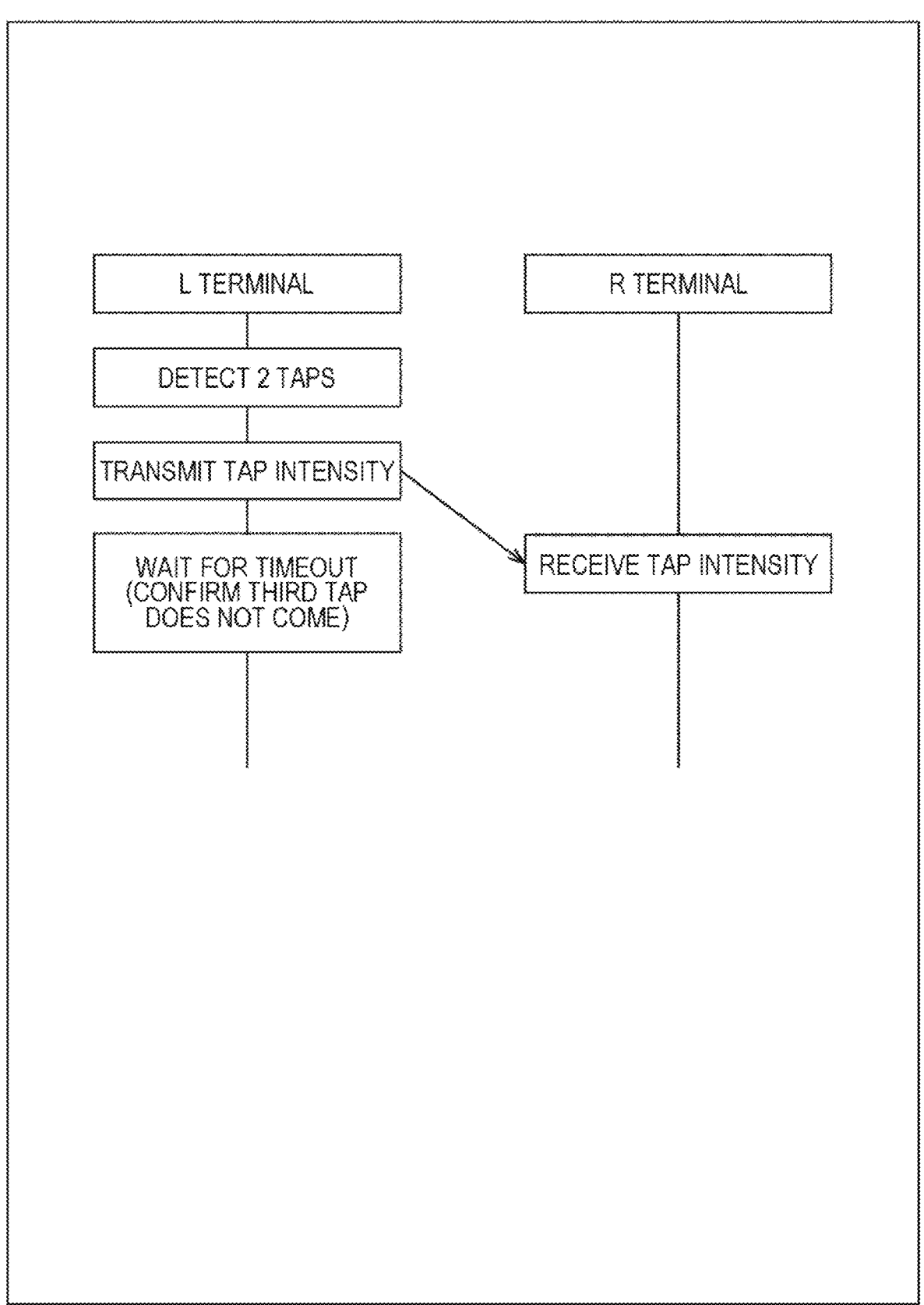
FIG. 23 is a diagram for explaining a process in the terminal according to the present technology.

Therefore, for example, as illustrated in FIG. 23, when the second tap (peak) is detected in the terminal 11 on the L side (left side), the peak intensity value (tap intensity) is immediately transmitted to the terminal 11 on the R side at the time point when the tap is detected.

In this case, the peak intensity value is transmitted to the partner terminal without waiting for detection of the double tap operation, that is, before the above-described specified time elapses and it is confirmed that there is no third tap (peak). Therefore, it is possible to reduce the overhead of waiting for a double tap operation to be detected, and it is possible to detect (recognize) a tap event in a shorter time.

In addition, in the terminal 11 of the present technology, low power consumption can be realized by providing a plurality of processors such as the low-power CPU 51 and the DSP 52.

Specifically, in the terminal 11, the first peak detection process of recognizing (detecting) only one tap such as a peak corresponding to the tap operation or a peak corresponding to noise similar to the tap operation is performed by the low-power CPU 51 having low power consumption.

Since the first peak detection process has a high execution frequency but a small processing amount (low processing load), the first peak detection process can be performed at a sufficient processing speed even by the low-power CPU 51 having low processing capability (performance).

Therefore, in the terminal 11, the first peak detection process having a high execution frequency is executed by the low-power CPU 51 having low power consumption, thereby achieving low power consumption.

On the other hand, the second and subsequent peak detection processes, which are processes of actually detecting a tap operation, have a lower frequency of occurrence but a larger amount of processing (higher processing load) than the first peak detection process. Therefore, a processor having a high processing capability (performance) to some extent is required to execute the second and subsequent peak detection processes.

Therefore, in the terminal 11, at the normal time, the DSP 52 having high processing capability (calculation capability) but high power consumption is set to the sleep state, and the DSP 52 is activated only when a peak is detected in the first peak detection process to execute the second and subsequent peak detection process.

In this way, since the DSP 52 is activated only when the second and subsequent peak detection processes having a low execution frequency are executed, the power consumption of the entire terminal 11 can be further reduced.

For example, in the terminal 11, only the detection of the peak corresponding to one tap is performed in the power-saving low-power CPU 51, and when the peak is detected, the DSP 52 with higher performance is activated. Then, the DSP 52 detects a peak corresponding to the second or third tap to detect a double tap operation or a triple tap operation.

In this case, the low-power CPU 51 may activate the DSP 52 between the first tap and the second tap.

Meanwhile, in a case where the user performs one tap on the face or the like, a total of two peaks of a peak (signal) when the user's finger comes into contact with the face or the like and a peak when the user's finger moves away from the face or the like may occur in the terminal 11.

As described above, when two peaks occur with respect to one tap of the user, for example, there is a risk of occurrence of erroneous detection such as detection of a triple tap operation in the terminal 11 although a double tap operation is actually performed.

Therefore, in the control unit 43, a peak that does not satisfy the predetermined peak condition may not be a peak corresponding to the tap. As a result, occurrence of erroneous detection can be suppressed.

For example, the process for suppressing the occurrence of erroneous detection on the basis of the peak condition may be performed by the DSP 52 in step S41 of the event detection process described with reference to FIG. 14, may be performed by the low-power CPU 51 in step S11 of the peak detection process described with reference to FIG. 12, or may be performed in both of them.

Here, a specific example of the peak condition will be described with reference to FIG. 24. In particular, here, an example in which the DSP 52 detects the tap operation on the basis of the peak condition will be described.

Figure 24:
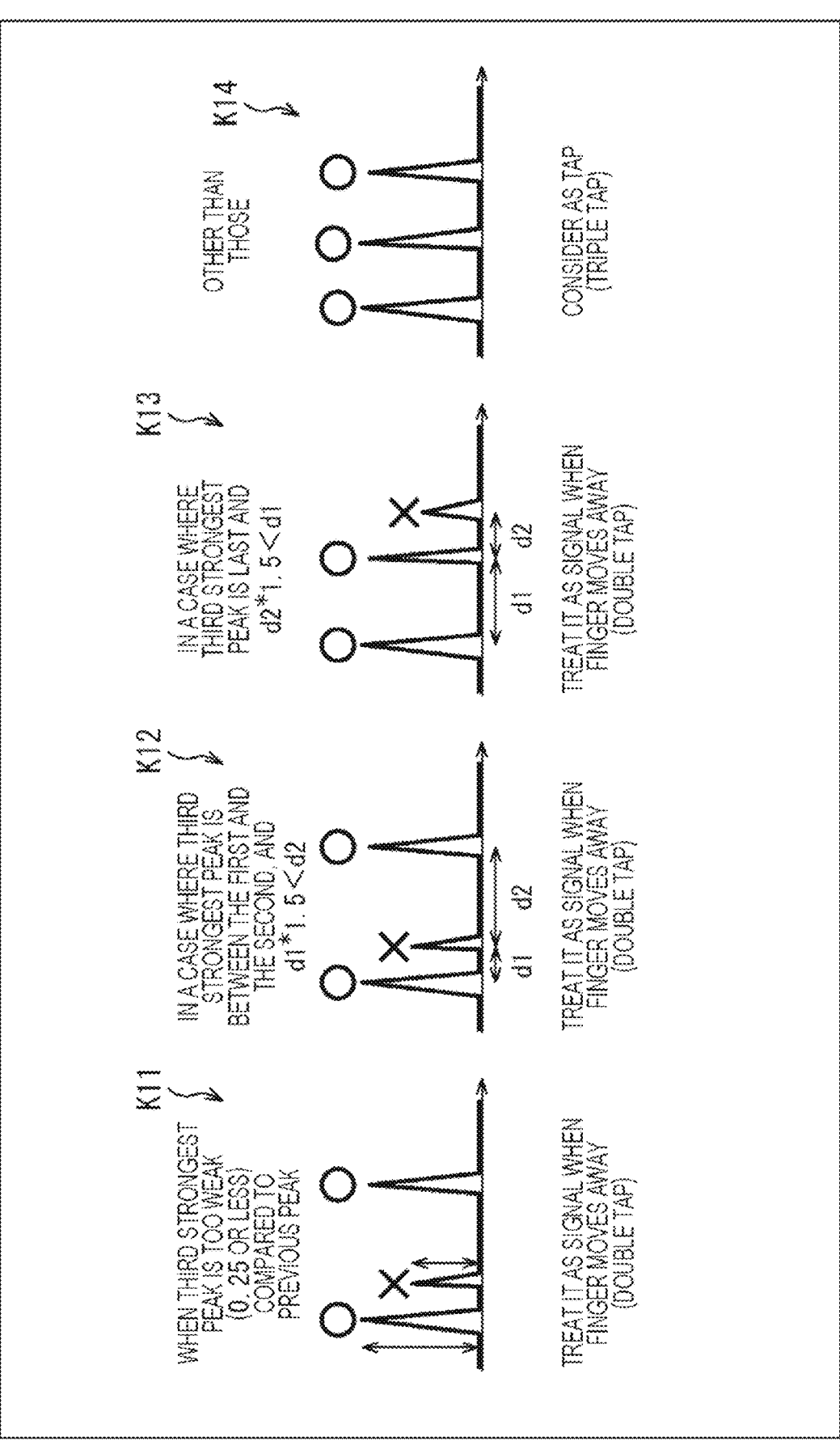
FIG. 24 is a diagram for explaining a specific example of a peak condition.

Basically, the DSP 52 adds (adopts) peaks in descending order of the intensity value, but it is assumed that the peak condition is not satisfied in the cases indicated by arrows K11 to K13 in FIG. 24. Note that in FIG. 24, the horizontal direction indicates time, and each polygonal line indicates a time waveform of acceleration, more specifically, the above-described norm value (evaluation function).

For example, in the example indicated by the arrow K11, three peaks are detected. However, in a case where a peak having the third largest intensity value among the three peaks is too small as compared with a peak immediately before the peak, the peak having the third largest intensity value is a peak when the finger moves away, that is, is not a peak corresponding to a tap.

Specifically, for example, in a case where a condition that the ratio of the intensity values obtained by dividing the intensity value of the peak having the third largest intensity value by the intensity value of the peak immediately before the peak is less than or equal to a predetermined threshold such as 0.25 (Hereinafter, also referred to as a condition C1) is satisfied, the peak having the third largest intensity value is not regarded as a peak corresponding to the tap.

In this example, among the three peaks arranged in the time direction, the second peak at the center is a peak having the third largest intensity value, but since this peak satisfies the condition C1, this peak is not a peak corresponding to the tap.

Therefore, in this example, the first peak and the third peak arranged in the time direction are peaks corresponding to taps, and as a result, a double tap operation is detected.

In the example indicated by the arrow K12, three peaks are detected. However, in a case where the peak having the third largest intensity value is between the peaks having the first and second largest intensity values and is too close to the peak detected first, the peak having the third largest intensity value is a peak when the finger moves away, that is, is not a peak corresponding to a tap.

Specifically, the time interval from the first peak arranged in the time direction to the third peak having the largest intensity value, that is, a distance in the time direction is d1, and a time interval from the third peak arranged in the time direction to the peak having the third largest intensity value is d2.

At this time, in a case where the condition that the peak having the third largest intensity value is between the peaks having the first and second largest intensity values and the inequality d1×1.5<d2 is satisfied (Hereinafter, also referred to as a condition C2) is satisfied, the peak having the third largest intensity value is not the peak corresponding to the tap.

In this example, among the three peaks arranged in the time direction, the second peak at the center is a peak having the third largest intensity value, and since this peak satisfies the condition C2, this peak is not a peak corresponding to the tap.

Therefore, in this example, the first peak and the third peak arranged in the time direction are peaks corresponding to taps, and as a result, a double tap operation is detected.

In the example indicated by the arrow K13, three peaks are detected, but in a case where the peak having the third largest intensity value is temporally behind the peaks having the first and second largest intensity values and is too close to the peak immediately before being arranged in the time direction, that is, the second peak, the peak having the third largest intensity value is a peak when the finger moves away, that is, is not a peak corresponding to a tap.

Specifically, the time interval from the first peak to the second peak arranged in the time direction, that is, the distance in the time direction is d1, and the time interval from the second peak to the third peak arranged in the time direction is d2.

At this time, in a case where the condition that the peak having the third largest intensity value is the last peak arranged in the time direction, that is, the peak having the third largest intensity value is temporally later than the peaks having the first and second largest intensity values and the inequality $d2 \times 1.5 < d1$ is satisfied (Hereinafter, also referred to as a condition C3) is satisfied, the peak having the third largest intensity value is not a peak corresponding to the tap.

In this example, among the three peaks arranged in the time direction, the third peak at the end is a peak having the third largest intensity value, and since this peak satisfies the condition C3, it is determined that this peak is not a peak corresponding to the tap.

Therefore, in this example, the first peak and the second peak arranged in the time direction are peaks corresponding to taps, and as a result, a double tap operation is detected.

Moreover, for example, as indicated by an arrow K14, in a case where the peak having the third largest intensity value does not satisfy any of the conditions C1 to C3 described above, the peak having the third largest intensity value is assumed to be a peak corresponding to a tap. In other words, a condition that none of the conditions C1 to C3 is satisfied is set as the peak condition.

Therefore, in this example, all three peaks arranged in the time direction are set as peaks corresponding to taps, and as a result, a triple tap operation is detected.

As described above, in a case where the predetermined peak does not satisfy the peak condition defined by the positional relationship or the relationship of the intensity values of the plurality of consecutive peaks including the predetermined peak, the DSP 52 detects the tap operation assuming that the predetermined peak is not a peak corresponding to the tap. Note that the low-power CPU 51 may record the intensity value or the like related to the peak in step S43 of FIG. 14 on the basis of the determination result of whether or not the peak condition is satisfied by the DSP 52.

As described above, the occurrence of erroneous detection can be suppressed by specifying whether or not the peak corresponds to the tap on the basis of the peak condition. That is, the tap event can be detected with higher accuracy.

Second Embodiment

<Continuous Hit Operation>

As described above, by detecting the tap operation by the user in the terminal 11, it is possible to perform control according to the operation of the user.

In this case, as the control according to the user's operation, for example, sound volume control and the like can be performed in addition to reproduction, stop, and track feed of music, but the sound volume control is particularly important in headphones.

Since the volume is a continuous value, it is necessary to set not only the presence or absence of a command for instructing volume control but also an amount (volume) desired by the user by a tap operation.

In a device provided with a mechanism dedicated to general operation, for example, volume control is performed by operating a slider or a volume-control knob.

Furthermore, for example, in a device capable of operating a touch panel, volume control can be realized by operating a graphical user interface (GUI) component such as a slider displayed on a display unit.

However, the terminal 11 that detects a tap operation on the basis of a sensor output signal of the IMU 41 including an acceleration sensor or the like recognizes a tap operation by the user as an event, and thus, it is difficult to input a control amount (control amount) by one tap.

Therefore, by applying, to the terminal 11, a method of causing the user to continuously perform tapping and input a control amount according to the duration of the tap operation, the terminal 11 may also be configured to easily perform intended volume control by a tap operation by the user.

Note that, in a second embodiment, a case where sound volume control is performed by a tap operation will be described as an example. However, the present technology is not limited to the sound volume control, and can be applied to any control as long as it is control in which a control value is continuously changed, that is, control is executed, and a control amount that is a change amount of the control value is designated.

Figure 25:
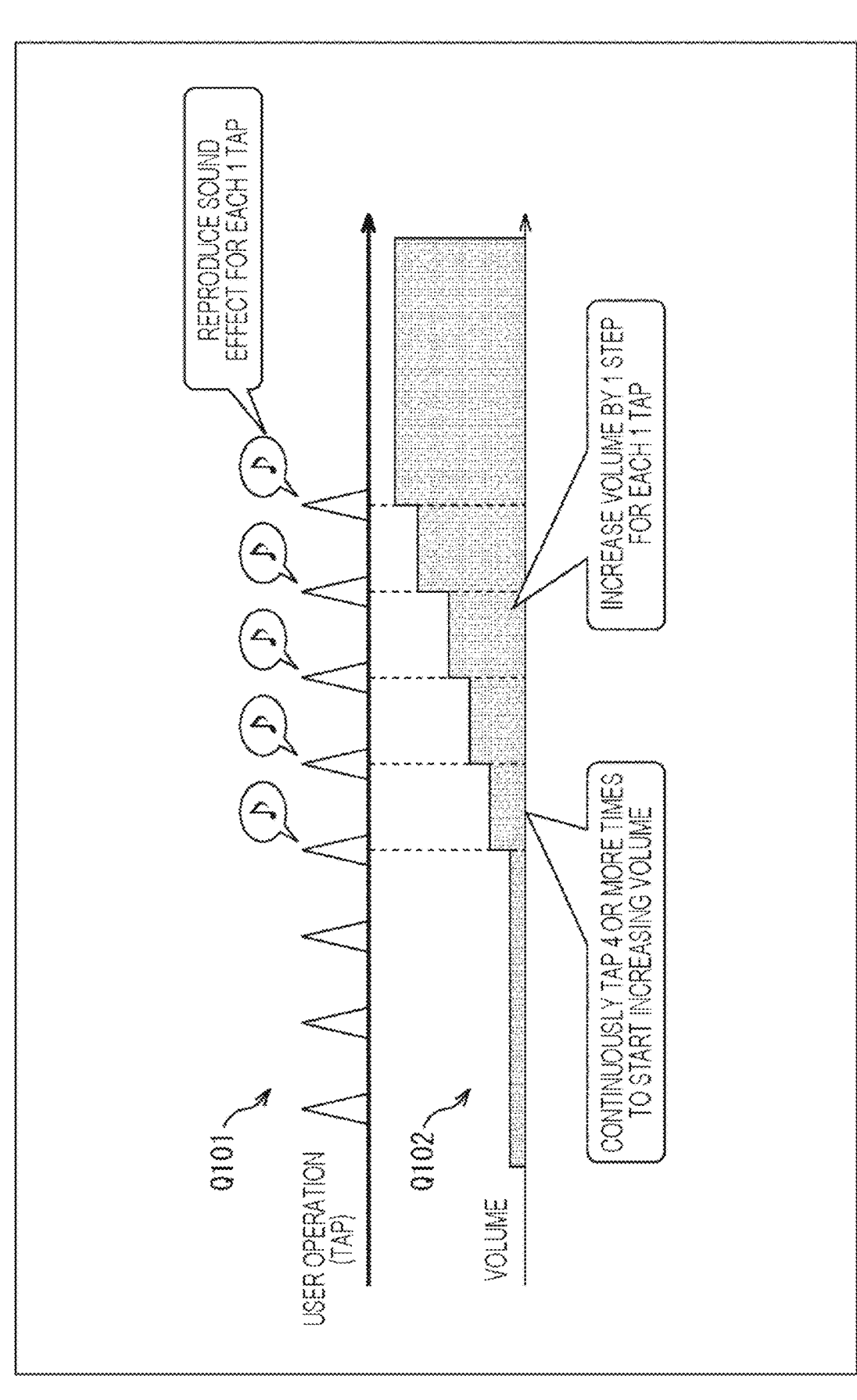
FIG. 25 is a diagram for explaining an example of volume control by a continuous hit operation.

For example, in a case where the volume of the sound reproduced by the terminal 11 is controlled by continuously tapping by the user, it is conceivable to perform control as illustrated in FIG. 25.

In FIG. 25, a horizontal direction indicates time, and a portion of an arrow Q101 indicates the above-described norm value (evaluation function) obtained from the sensor output signal. In particular, a portion where the norm value is convex upward represents a portion where the user performs a tap operation. Furthermore, a portion of an arrow Q102 indicates the volume of the sound output by the sound output unit 44 of the terminal 11. Moreover, musical note marks in FIG. 25 indicate the reproduction timing of the sound effect.

For example, in the following description, it is assumed that control (function) other than volume control such as reproduction of a next song and reproduction of a previous song is assigned to one, two, and three tap operations, that is, a single tap operation, a double tap operation, and a triple tap operation.

Furthermore, in a case where the user performs an operation of continuously tapping four times (four times) or more within a short period (Hereinafter, also referred to as a continuous hit operation), it is assumed that "continuous hits" are detected as a tap event, and volume control is assigned to the continuous hit operation by the user.

At this time, for example, it is possible to perform control to increase (increase) the volume when the continuous hits are detected in the terminal 11 on the R side (right ear side), and perform control to decrease (decrease) the volume when the continuous hits are detected in the terminal 11 on the L side (left ear side).

For example, as indicated by an arrow Q101 in FIG. 25, when the user continuously performs four taps, a sound effect indicating that continuous hits have been detected is reproduced as a tap event, and volume control is started.

Furthermore, in this example, while the continuous hit operation is continuously performed, reproduction of one sound effect and control for one step of the volume, that is, control for increasing the volume by one step are performed for one tap by the user.

However, if volume control is to be realized by combining detection of a single tap, it is not easy to perform a tap operation so as to obtain a volume desired by the user.

That is, for example, in a case where continuous hits on a physical button are detected, it is easy to detect one press (operation) on the button and to realize volume control according to the number of times of continuous hits on the basis of a detection result of each operation.

On the other hand, in a case where a tap operation by the user is detected on the basis of a sensor output signal of the IMU 41, particularly, in a case where a tap around the ear is detected, it is not easy to implement control to change the volume for one step for one tap on the basis of a detection result of each tap. This is because, for example, the following events PH1 to PH4 occur.

Event PH1: It takes time to reproduce sound effect.

Event PH2: It also takes time to determine the tap operation since it takes time to perform left-right communication. Event PH3: The number of taps may not be accurately detected.

Event PH4: Continuous hits stop halfway due to erroneous detection.

Hereinafter, these events PH1 to PH4 will be described.

(Event PH1)

It takes time to reproduce the sound effect.

Figure 26:
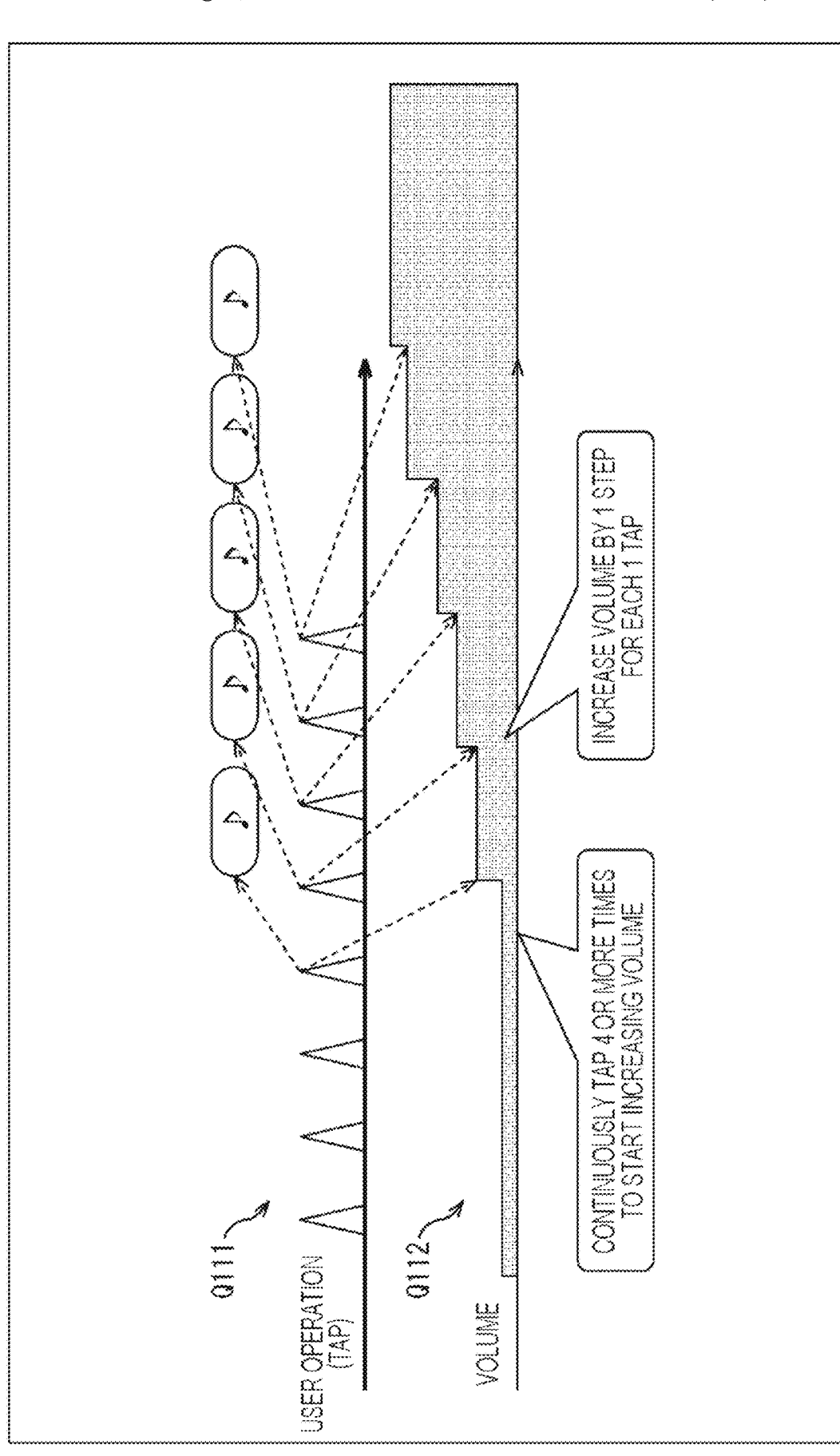
FIG. 26 is a diagram for explaining volume control and reproduction of sound effects by a continuous hit operation.

For example, as illustrated in FIG. 26, it is assumed that the sound effect is reproduced once for one tap in a case where the continuous hit operation is continuously performed.

In FIG. 26, a horizontal direction indicates time, a portion of an arrow Q111 indicates the above-described norm value (evaluation function) obtained from the sensor output signal, that is, a tap operation by the user, and a portion of an arrow Q112 indicates volume of sound reproduced by the terminal 11. Furthermore, in FIG. 26, a mark of a musical note connected to a portion representing the tap operation by an arrow indicates the reproduction timing of the sound effect corresponding to the tap.

As can be seen from the example of FIG. 26, it takes time from the tap operation by the user to the reproduction of the sound effect that is the feedback for the tap operation.

Therefore, when the user continuously hits, that is, taps at short time intervals such as 100 ms, for example, one sound effect cannot be reproduced for one tap, or the sound effect is reproduced significantly later than the tap. Furthermore, when the volume control is performed together with the reproduction of the sound effect, the timing of executing the volume control corresponding to the tap of the user is also delayed. In particular, the longer the time during which the continuous hit operation is performed, the greater the delay in the sound effect reproduction timing with respect to the tap timing.

As a result, the user cannot obtain appropriate feedback for the tap operation, and it becomes difficult to control the volume by the amount (control amount) intended by the user.

(Event PH2)

Since the left-right communication takes time, it also takes time to determine the tap operation.

Figure 27:
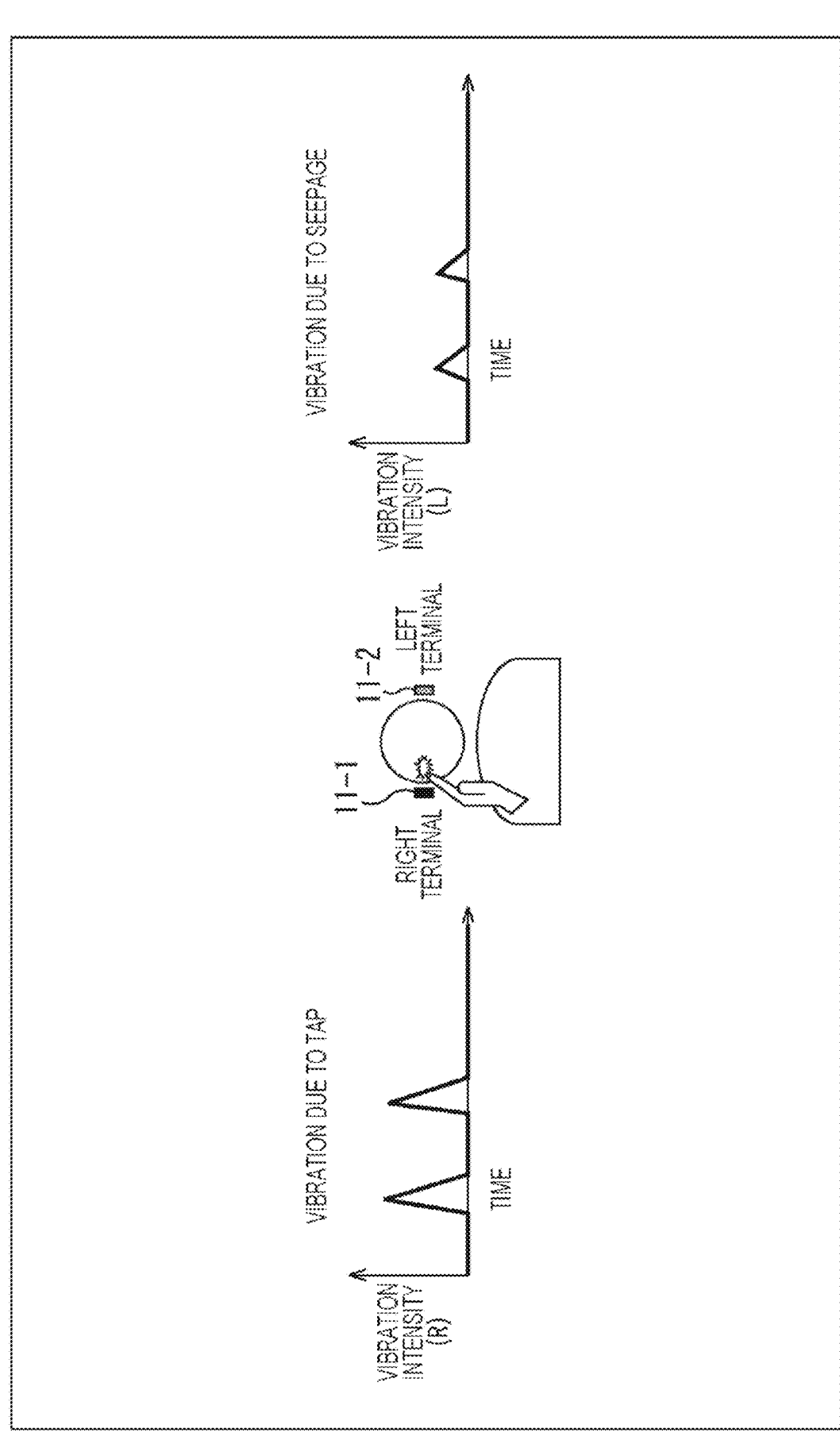
FIG. 27 is a diagram for explaining left-right communication and determination of a tap operation.

For example, as illustrated in FIG. 27, when the user wears the terminal 11 on each of the left and right ears and performs a tap operation on the periphery of the right ear, the terminal 11-1 on the right ear side detects a relatively large vibration intensity as illustrated on the left side in the drawing. On the other hand, in the terminal 11-2 on the left ear side, as illustrated on the right side in the figure, a vibration intensity (vibration due to seepage) smaller than that on the right ear side is detected.

As described above, in the tap around the ear, so-called seepage occurs in which vibration is transmitted to the left ear side even if the right ear side is tapped. Therefore, in the terminal 11, communication is performed between the left and right terminals 11 in order to prevent such erroneous detection of the signal of the seepage.

However, since this communication takes a relatively long time such as 300 ms, it takes time to determine the tap operation of the user. In this case, since the reproduction of the sound effect as the feedback is also delayed, it may not be possible to know which tap the sound effect being reproduced is the feedback to, or the sound effect may be tapped more times than necessary and the volume may change too much as intended by the user.

(Event PH3)

The number of taps may not be accurately detected.

In a case where the user performs a continuous hit operation, in the terminal 11, peaks are detected by vibration when the user's finger touches the face and vibration when the user's finger moves away, and it may be difficult to discriminate the accurate number of taps performed by the user.

In such a case, more taps than the number of times the user actually taps may be detected. That is, erroneous detection may occur. Then, the volume control as intended by the user is not performed.

(Event PH4)

Continuous hits stop halfway due to erroneous detection.

For example, in the detection of the continuous hit operation, it is possible to improve the tap detection accuracy by using the similarity of the intensities of the taps twice or three times or using the fact that the intervals between the taps are substantially equal.

However, in a case where the user performs a continuous hit operation, the tap operation is not repeated once, and as the continuous hits are continued, the intensity of the tap may be weakened, a shift may occur in the tapping (hitting) position, the tap operation may not be recognized, or the time interval between taps may gradually increase.

Then, the terminal 11 erroneously detects that the user has stopped the continuous hit operation, and as a result, the volume control desired by the user may not be performed.

Figure 28:
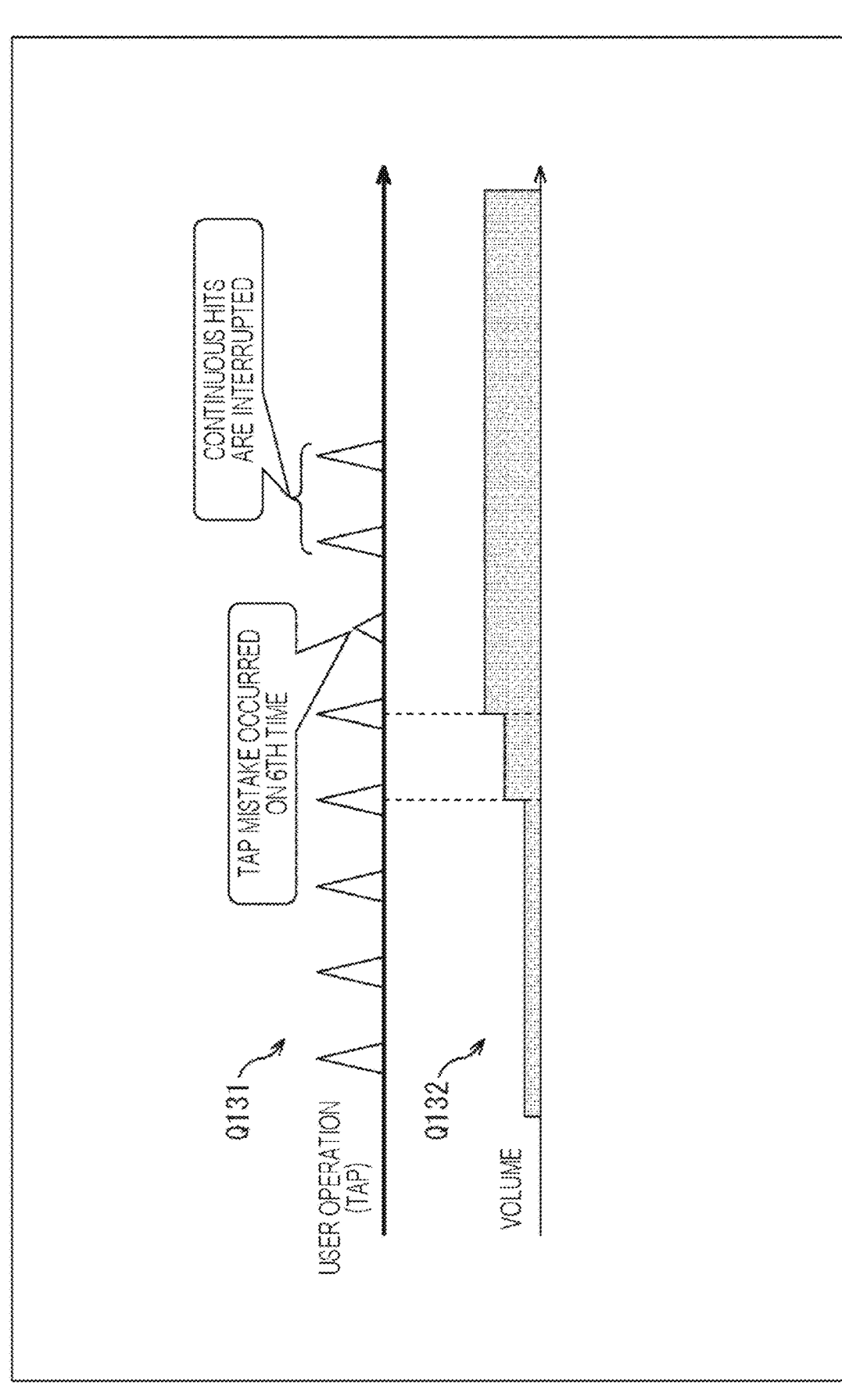
FIG. 28 is a diagram for explaining termination of a continuous hit operation due to a tap mistake.

Specifically, for example, it is assumed that a continuous hit operation is performed by the user as illustrated in FIG. 28.

Note that, in FIG. 28, a horizontal direction indicates time, a portion of an arrow Q131 indicates the above-described norm value obtained from the sensor output signal, that is, a tap operation by the user, and a portion of an arrow Q132 indicates the volume of the sound reproduced by the terminal 11.

In this example, continuous hits are detected as a tap event when the user performs the fourth tap, and thereafter, control is performed such that the volume increases by one step with respect to the tap operation.

However, when the user performs the sixth tap, a tap mistake occurs and a sufficient intensity value cannot be obtained, and the terminal 11 erroneously detects that the sixth tap is not recognized as the tap operation and the continuous hit operation ends.

Therefore, the user performs the seventh and eighth taps with the recognition that the continuous hit operation is continuously performed, but since the terminal 11 side recognizes that the continuous hit operation has already ended, the continuous hits are interrupted, and the volume control corresponding to the sixth and subsequent taps is not executed.

As described above, when the volume control for one step is performed for one tap, it is difficult to realize the function assigned to the continuous hit operation.

Therefore, in the present technology, by performing control CT1 and control CT2 described below, it is possible to perform intended sound volume control for the continuous hit operation by the user.

(Control CT1)

A first sound effect is reproduced at a timing when continuous hits are determined, and thereafter, every time a tap is detected for a certain period of time, reproduction (sounding) of one sound effect and volume control for one step are performed.

(Control CT2)

It is assumed that continuous hits are continuously performed even when tapping is performed at relatively long intervals after continuous hits are detected.

Figure 29:
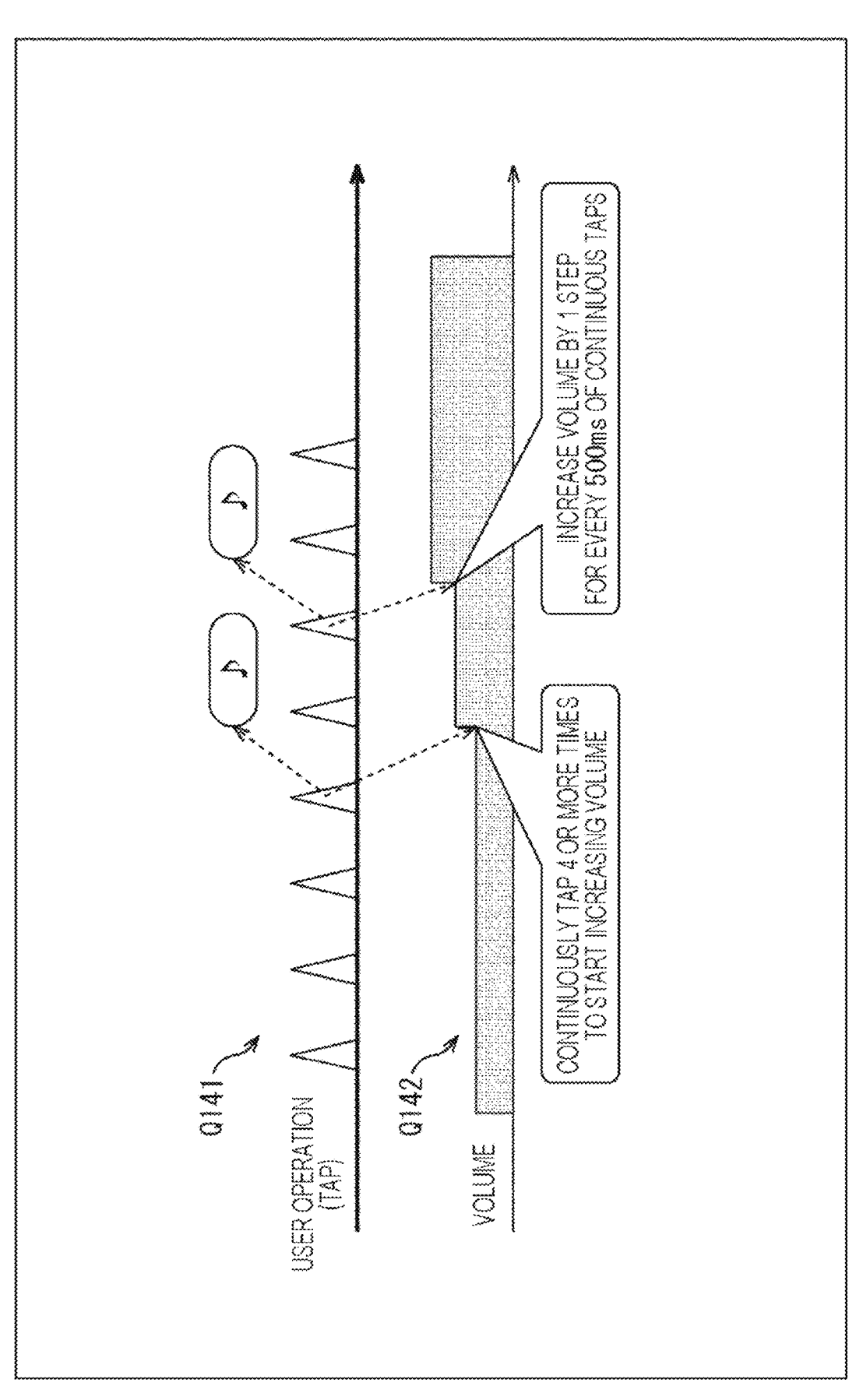
FIG. 29 is a diagram for explaining volume control by a continuous hit operation.

In the control CT1, for example, as illustrated in FIG. 29, when the user continuously performs a tap operation four times in a short period, continuous hits are detected as a tap event, and the tap event "continuous hits" are determined by comparing peak intensity values.

In FIG. 29, a horizontal direction indicates time, a portion of an arrow Q141 indicates the above-described norm value obtained from the sensor output signal, that is, a tap operation by the user, and a portion of an arrow Q142 indicates volume of sound reproduced by the terminal 11. Furthermore, note marks in FIG. 29 indicate the reproduction timing of the sound effect.

In this example, continuous hits are detected as a tap event at the timing when the user continuously taps four times, and then the detected tap event "continuous hits" are determined.

When the tap event "continuous hits" are determined, the first sound effect is reproduced and the volume control is started at the determination timing, and the volume is increased by one step.

Furthermore, after the continuous hits are determined and it is recognized that the continuous hit operation by the user is started, when the tap operation by the user is detected once or more for a predetermined constant time such as 500 ms, for example, it is determined that the continuous hit continuation is detected as the tap event.

In this example, two taps are performed within a predetermined fixed time, and continuous hit continuation is detected as a tap event by detection of these taps.

Moreover, when the continuous hit continuation as the tap event is determined, it is recognized by the user that the continuous hit operation is continuously performed, and one sound effect is reproduced at the timing when the continuous hit continuation is determined, and control is performed to increase the volume by one step.

After the continuous hit continuation is determined, in the similar way, each time the continuous hit continuation is detected and determined as a tap event, reproduction of one sound effect and volume control for one step are performed.

By performing the control CT1 of the present technology as described above, it is possible to suppress the occurrence of the events PH1 to PH3 described above.

For example, in the control CT1, the reproduction of the sound effect and the sound volume control for one step are not performed for each tap of the continuous hits, but the reproduction of the sound effect and the sound volume control for one step are performed for each determination of the continuous hit continuation, that is, for each predetermined constant time (constant period). Therefore, it is possible to suppress occurrence of delay in reproduction of a sound effect and execution of volume control. That is, the occurrence of the event PH1 can be suppressed.

Furthermore, in the control CT1, an operation of performing one or more taps within a certain period of time is detected as a tap event "continuous hit continuation". Therefore, as compared with a case where each tap operation at the time of the continuous hit operation is individually detected and determined, even if communication is performed between the left and right terminals 11 to transmit and receive the peak intensity value, the delay time until the tap event is determined can be further shortened. That is, the occurrence of the event PH2 can be suppressed.

Moreover, in the control CT1, since an operation of performing one or more taps within a certain period of time is detected as a tap event "continuous hit continuation", it is not necessary to accurately detect individual taps performed within the certain period of time. That is, in the control CT1, it is only necessary to detect that one or more taps have been performed within a certain period of time, and it is not necessary to detect an accurate number of taps.

Therefore, according to the control CT1, it is not necessary to consider the event PH3, and it is possible to suppress the occurrence of erroneous detection and perform control as intended by the user. In particular, by listening to the sound effect, the user can easily understand how many steps the volume has changed by his/her continuous hit operation, and can reliably perform the operation as intended.

Furthermore, in the control CT2, once continuous hits are detected (determined) as a tap event, a tap at a relatively long interval is also regarded as a tap of a continuous hit operation.

That is, the user needs to perform tapping at relatively short time intervals in order to recognize continuous hits as a tap event. However, when the continuous hits are recognized as a tap event, the continuous hit continuation is recognized as a tap event even when tapping is performed at relatively long time intervals thereafter.

In other words, in the control CT2, the condition under which the tap event "continuous hits" are detected, that is, the continuous hit condition until the start of continuous hits, and the condition under which the tap event "continuous hit continuation" is detected, that is, the continuous hit condition after recognition of the continuous hits are made different from each other.

For example, to prevent erroneous detection until the start of continuous hits, that is, at the time of detection of a tap event "continuous hits", some rule filters are applied after a plurality of vibrations (peak values of acceleration) such as a tap are detected. Then, it is determined that the continuous hits are detected only in a case where the continuous hit passes through the rule filter.

The rule filter relates to, for example, an interval between taps and an intensity of the taps, and in a case where a plurality of taps detected within a predetermined time satisfies a condition such as the tap interval and the tap intensity set as the rule filter, it is determined that the taps have passed the rule filter.

When passing through the rule filter, the system shifts to a state of being continuously hit. That is, it is assumed that continuous hits are determined as a tap event and a continuous hit operation is performed.

In the terminal 11, the user is notified that the system (terminal 11) has recognized the continuous hits, that is, that the continuous hits have been determined as a tap event by reproduction of the sound effect for the first time. In this case, the sound effect may be different for each function assigned to a tap operation such as volume control (volume operation) or reproduction stop. As a result, the user can grasp which function has been executed by listening to the reproduced sound effect.

Furthermore, in the state of continuous hits, that is, after the continuous hits are determined as a tap event, the contents of the filter to be applied after vibration (peak value of acceleration) such as a tap is detected are changed. That is, a filter different from the above-described rule filter is used to detect the tap event "continuous hit continuation". As a result, even in a case where the user fails to tap after starting a continuous hit or in a case where an interval between taps is increased, it is recognized that the continuous hit operation is continuously performed, and the user can achieve a desired operation such as volume control.

Figure 30:
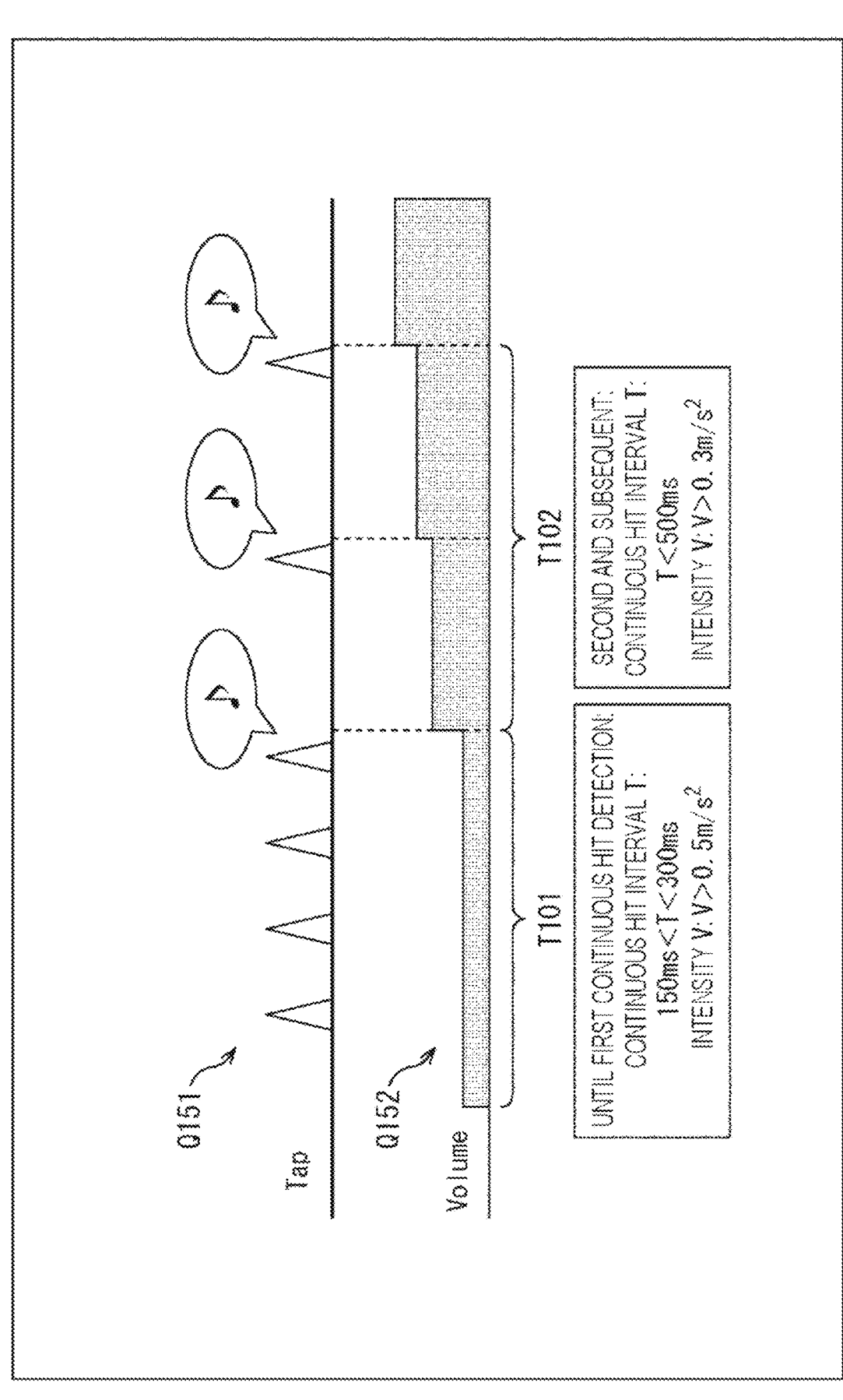
FIG. 30 is a diagram for explaining conditions at the time of detecting continuous hits and continuous hit continuation.

With reference to FIG. 30, a specific example of a condition for detection of continuous hits and continuous hit continuation as tap events will be described.

In FIG. 30, a horizontal direction indicates time, a portion of an arrow Q151 indicates the above-described norm value obtained from the sensor output signal, that is, a tap operation by the user, and a portion of an arrow Q152 indicates volume of sound reproduced by the terminal 11.

In this example, a period T101 indicates a period before continuous hits are detected as a tap event, and a period T102 following the period T101 indicates a period after continuous hits are detected as a tap event and the continuous hits are determined. That is, here, the timing at which the continuous hits are determined as the tap event is the end time of the period T101 and the start time of the period T102.

In the period T101 before the continuous hits are detected, a continuous hit interval T and an intensity V are determined as conditions for detecting the tap event "continuous hits". That is, the continuous hit interval T and the intensity V are the above-described rule filters.

The continuous hit interval T is a time interval between a predetermined tap and the next tap, and the intensity V is the intensity of the tap, that is, the intensity value (norm value) of the peak detected from the sensor output signal.

In particular, in the period T101 in which continuous hits are not yet detected (not determined), the continuous hit interval T is 150 ms<T<300 ms, and intensity V is V>0.5 m/s$^2$.

In the period T101, four taps arranged consecutively are detected, and in a case where the intensity value of each of the four taps is greater than the intensity V, that is, 0.5 m/s$^2$, and the time interval between two taps adjacent to each other is the continuous hit interval T, that is, greater than 150 ms and less than 300 ms, it is assumed that the tap event "consecutive hits" are detected.

On the other hand, in the period T102 after the continuous hits are determined as the tap event, the continuous hit interval T and the intensity V are determined as conditions for detecting the tap event "continuous hit continuation", but the continuous hit interval T and the intensity V are different from those at the time of detecting the continuous hits.

In the period T102 in which the continuous hit continuation is detected after the continuous hits are determined, the continuous hit interval T is T<500 ms, and intensity V is V>0.3 m/s$^2$.

In the period T102, the next tap is detected during the continuous hit interval T<500 ms from the detection of the previous tap, more specifically, the previous tap event "continuous hits" or "continuous hit continuation", and in a case where the intensity value of the tap is the intensity V, that is, larger than 0.3 m/s$^2$, it is determined that the tap event "continuous hit continuation" is detected.

According to the control CT2 as described above, the occurrence of the event PH4 described above can be suppressed. In other words, it is possible to suppress the occurrence of the failure of the continuous hit operation by the user.

This is because, for example, even in a case where a tap mistake occurs in the sixth tap in the example illustrated in FIG. 28, if the seventh tap with the intensity V can be detected during the continuous hit interval T from the fifth tap, continuous hit continuation is detected as a tap event.

Note that, in a case where a tap operation by the user is detected one or more times during a certain period of time by the control CT1, it is also related to the control CT2 that continuous hit continuation is detected as a tap event, and it can be said that the occurrence of the event PH4 is also suppressed by the control CT1.

By performing the control CT1 and the control CT2 as described above, it is possible to perform intended control for the continuous hit operation by the user. That is, the user can easily execute the intended control by the continuous hit operation.

As described above, an operation in which the user continuously performs tapping a predetermined number of times or more, such as four times or more, is a continuous hit operation. On the other hand, in the detection of the tap event, consecutive taps of a predetermined number of times (four times) are detected as "continuous hits", and one or more taps within a predetermined time after the start of continuous hits are detected as "continuous hit continuation".

Therefore, in a case where the user performs a continuous hit operation as a tap operation, from the viewpoint of a tap event, it can be said that the user performs a continuous hit start operation of continuously tapping a predetermined number of times (four times) and a continuous hit continuation operation of continuously tapping one or more times within a predetermined time. In other words, it can be said that the continuous hit operation includes a continuous hit start operation and one or a plurality of subsequent continuous hit continuation operations.

In this case, it can be said that the control CT1 is a control that reproduces the sound effect once and executes the function assigned to the continuous hit operation by changing the control value (volume) by one step when the continuous hit start operation is determined, and thereafter, reproduces the sound effect once and executes the function assigned to the continuous hit operation by changing the control value by one step every time the continuous hit continuation operation is determined.

Furthermore, the control CT2 can be said to be a control that detects the continuous hit start operation and the continuous hit continuation operation under different detection conditions (continuous hit conditions).

Specifically, as described with reference to FIG. 30, the continuous hit interval T as the detection condition of the continuous hit continuation operation, that is, the time interval between the taps at which the continuous hit continuation operation is detected is longer than the continuous hit interval T as the detection condition of the continuous hit start operation.

Furthermore, the intensity V as the detection condition of the continuous hit continuation operation, that is, the intensity of the tap on which the continuous hit continuation operation is detected is made lower than the intensity V as the detection condition of the continuous hit start operation.

Note that, in the following, an example in which the control CT1 and the control CT2 are basically performed in a state where the terminal 11 is worn on each of the left and right ears of the user will be described.

However, for example, even in a case where the terminal 11 is worn only on one ear of the user, by performing the control CT1 and the control CT2 on the terminal 11, it is possible to realize intended control for the continuous hit operation by the user. That is, communication (comparison of peak intensity values) between the left and right terminals 11 may not be performed.

Furthermore, in a case where intended control for the continuous hit operation is realized by the control CT1 and the control CT2, it is not limited to an example in which the tap of the user is detected by acceleration using the IMU 41 as in the terminal 11, and the tap of the user may be detected by an arbitrary sensor such as an electrostatic sensor, a button such as a tact switch, or the like.

In other words, the operation detection unit that detects the tap operation of the user is not limited to the IMU 41, and may be an electrostatic sensor, a button, or the like. Furthermore, depending on the operation detection unit, the part to be tapped is not limited to the periphery of the user's ear, and may be the terminal 11 (operation detection unit) itself.

For example, even in a case where an electrostatic sensor or a button is used as the operation detection unit, the occurrence of the event PH1 or the event PH4 can be suppressed by the control CT1 and the control CT2, and the intended control can be realized for the continuous hit operation by the user. In this case, if the electrostatic sensor or the button is used, the left-right communication is unnecessary, and thus the event PH2 does not need to be considered, and the event PH3 does not occur.

<Description of Detection Process>

In a case where the control CT1 and the control CT2 are performed in a state where the terminals 11 are worn on the left and right ears of the user, the peak detection process described with reference to FIG. 12 and the event detection process described with reference to FIG. 14 are performed in each terminal 11.

Figure 31:
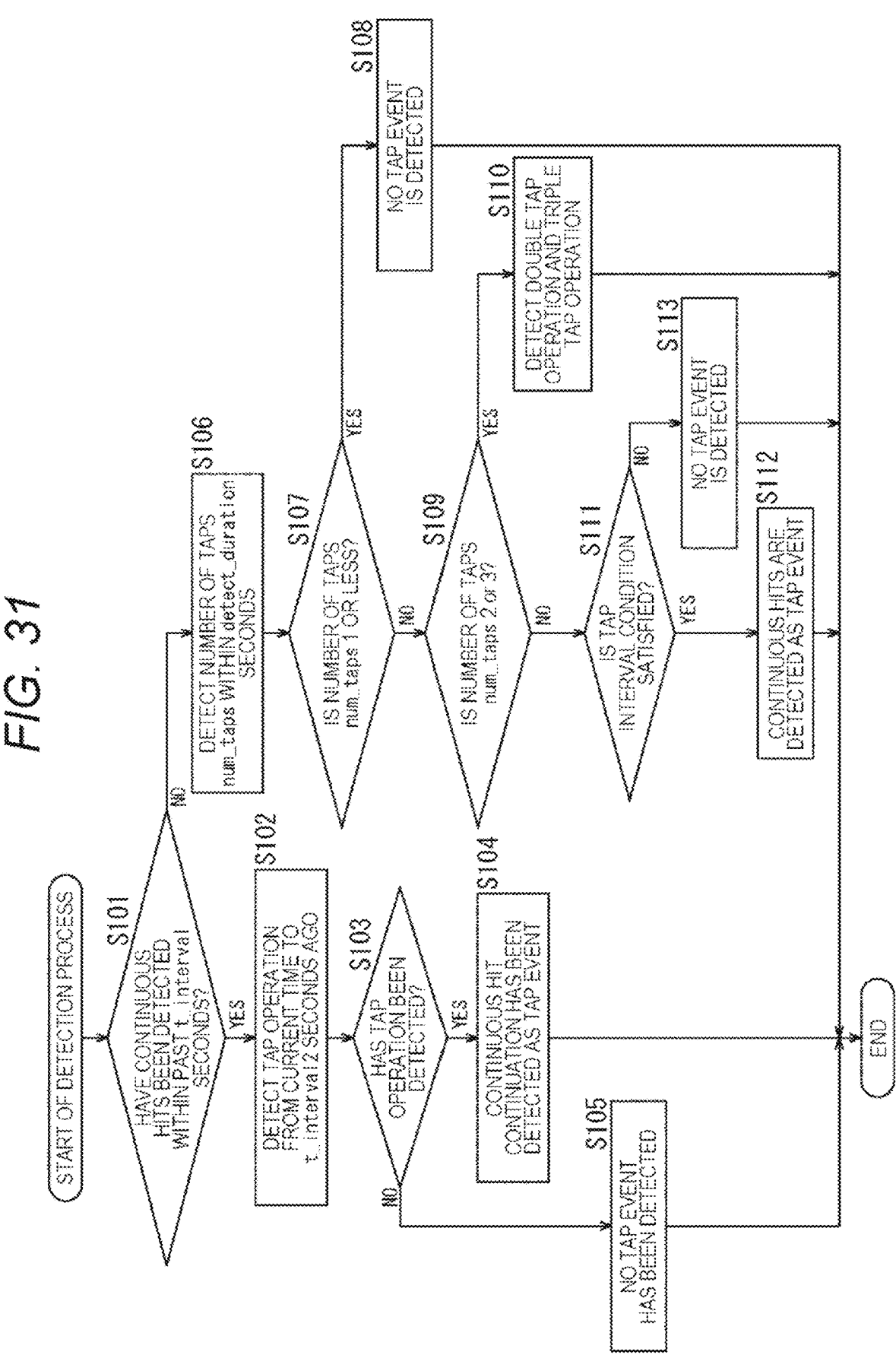
FIG. 31 is a flowchart illustrating a detection process.

However, a detection process illustrated in FIG. 31 is executed as the process corresponding to step S41 of the event detection process described with reference to FIG. 14.

In particular, in the detection process, each time a sensor output signal is supplied from the IMU 41 to the DSP 52 via the low-power CPU 51, a double tap operation, a triple tap operation, continuous hits, continuous hit continuation, and no tap event are detected as tap events. "No tap event" as a tap event indicates that no tap event has been detected.

Furthermore, when the detection process is executed, the sensor output signal of the IMU 41 is accumulated in advance in a ring buffer (not illustrated) provided in the control unit 43 for a certain period of time. For example, the ring buffer holds (accumulates) the sensor output signal for a time longer than the time required for tapping the number of times regarded as continuous hits, such as one second, and the processing is performed on the basis of the sensor output signal.

Hereinafter, a detection process by the terminal 11 will be described with reference to a flowchart of FIG. 31. Note that, also in a case where the operation detection unit that detects the tap operation of the user is an electrostatic sensor, a button, or the like, processing similar to the detection process of FIG. 31 is performed.

In step S101, the DSP 52 determines whether or not continuous hits (continuous hit operation) have been detected within the past t_interval seconds on the basis of the detection result of the tap event so far.

For example, the DSP 52 determines whether or not continuous hits have been detected during a period from the current time to a time t_interval seconds before, on the basis of the number of taps, a detection result of a tap event, and the like recorded as a result of the processing of step S43 in the event detection process of FIG. 14 performed so far.

For example, t_interval seconds is set to 600 ms or the like, and in a case where "continuous hits" or "continuous hit continuation" is detected as the tap event during the past t_interval seconds, it is determined that the continuous hits are detected.

In a case where it is determined in step S101 that the continuous hits have been detected, in step S102, the DSP 52 detects the tap operation from the current time to t_interval2 seconds before on the basis of the sensor output signal. Here, for example, a peak satisfying the continuous hit interval $T<500$ ms and the intensity $V>0.3$ m/s$^2$ described with reference to FIG. 30 is detected as a tap by the user.

In a case where it is determined in step S101 that the continuous hits have been detected, it is considered that the user is in the middle of performing the continuous hit operation. Therefore, when the tap operation is detected even once within a predetermined t_interval2 seconds (continuous hit interval T) such as 500 ms, the continuous hit operation by the user is continuously performed.

In step S103, the DSP 52 determines whether or not a tap operation has been detected as a result of the processing in step S102.

In a case where it is determined in step S103 that the tap operation has been detected, the DSP 52 determines in step S104 that continuous hit continuation has been detected as a tap event. That is, the continuous hit continuation is issued as the tap event, and the issued tap event "continuous hit continuation" is supplied to the low-power CPU 51.

When a tap event is detected, the detection process ends, and then the process proceeds to step S42 in FIG. 14. In this case, in step S43, the number of taps, the intensity value, and the like are recorded together with the detected tap event "continuous hit continuation".

Furthermore, when the continuous hit continuation is detected as the tap event and the continuous hit continuation is determined in step S51 of FIG. 14 as a result of comparison of the intensity values or the like, the control unit 43 controls the communication module 42 as necessary to transmit an event detection notification indicating that the "continuous hit continuation" is detected to the reproduction control device connected to the terminal 11.

Moreover, the control unit 43 controls the sound output unit 44 in response to the detection (determination) of the tap event "continuous hit continuation", causes the sound effect related to the volume control to be reproduced once, and changes the volume of the sound such as music to be reproduced by the sound output unit 44 by one step. That is, the control unit 43 changes the volume, which is the control value, by one step to perform volume control.

On the other hand, in a case where it is determined in step S103 that the tap operation has not been detected, the DSP 52 determines in step S105 that the continuous hit operation performed by the user has been stopped, that is, no tap event has been detected. In other words, "no tap event" is issued as the tap event, and is supplied to the low-power CPU 51.

When the processing of step S105 is performed, the detection process ends, and thereafter, the process proceeds to step S42 of FIG. 14. In this case, it is determined in step S42 that no tap event has been detected.

Furthermore, in a case where it is determined in step S101 that continuous hits have not been detected, thereafter, the process proceeds to step S106.

That is, in a case where it is determined that continuous hits have not been detected, it is considered that the continuous hit operation by the user has not been started yet. Therefore, hereinafter, processing of detecting a double tap operation, a triple tap operation, or continuous hits which is a tap event other than the continuous hit continuation is performed.

In step S106, on the basis of the sensor output signal, the DSP 52 detects the number of taps num_taps, which is the number of tap operations during a period from the current time to detect_duration seconds before, which is a predetermined specified time. For example, the specified time detect_duration is 1000 ms longer than the above-described t_interval or t_interval2.

After the number of taps num_taps is obtained, a tap event is detected by a conditional branch according to the number of taps num_taps.

In step S107, the DSP 52 determines whether or not the number of taps num_taps is 1 or less.

In a case where it is determined in step S107 that the number of taps num_taps is 1 or less, the DSP 52 issues a tap event "no tap event" and supplies the tap event "no tap event" to the low-power CPU 51 on the assumption that no tap event is detected in step S108.

Here, since the single tap operation is not detected as a tap event, in a case where the number of taps num_taps is 1 or 0, no tap event is set.

When the processing of step S108 is performed, the detection process ends, and thereafter, the process proceeds to step S42 of FIG. 14.

On the other hand, in a case where it is determined in step S107 that the number of taps num_taps is not 1 or less, that is, 2 or more, the DSP 52 determines in step S109 whether or not the number of taps num_taps is 2 or 3.

In a case where it is determined in step S109 that the number of taps num_taps is 2 or 3, the DSP 52 detects a double tap operation and a triple tap operation on the basis of the sensor output signal in step S110.

For example, as described with reference to FIG. 6, the DSP 52 detects a double tap operation or a triple tap operation on the basis of a positional relationship between a plurality of peaks or a relationship between intensity values, that is, the above-described peak condition, and also performs discrimination by the DNN discriminator.

When a double tap operation or a triple tap operation is detected as a tap event, the DSP 52 supplies the detection result to the low-power CPU 51.

Note that, in a case where neither a double tap operation nor a triple tap operation is finally detected according to a discrimination result by the DNN discriminator or the like, the detection result of the tap event is "no tap event".

When the processing of step S110 is performed, the detection process ends, and thereafter, the process proceeds to step S42 of FIG. 14.

Furthermore, in a case where it is determined in step S109 that the number of taps num_taps is not 2 or 3, that is, 4 or more, the DSP 52 determines in step S111 whether or not the tap detected within the specified time detect_duration satisfies the tap interval condition.

Here, the tap interval condition is a condition for detecting a tap event "continuous hits", and is a condition determined by, for example, 150 ms$<$T$<$the continuous hit interval T satisfying 300 ms and the intensity V$>$0.5 m/s$^2$ described with reference to FIG. 30.

Even in a case where four or more taps, more specifically, a tap operation or a tap-like event are detected within the specified time detect_duration, there is a high possibility that these taps are not operations intentionally performed by the user when the intervals between the taps are uneven, the intervals between the taps are too wide, or the intervals between the taps are too narrow. Therefore, in the detection of the tap event "continuous hits", a tap interval condition such as a tap time interval (positional relationship) and an intensity value is determined, and continuous hits are detected only in a case where the tap interval condition is satisfied.

In a case where it is determined in step S111 that the tap interval condition is satisfied, the DSP 52 determines in step S112 that continuous hits are detected as a tap event. That is, the continuous hits are issued as a tap event, and are supplied to the low-power CPU 51.

When a tap event is detected, the detection process ends, and thereafter, the process proceeds to step S42 in FIG. 14. In this case, in step S43, the number of taps, the intensity value, and the like are also recorded together with the detected tap event "continuous hits".

Furthermore, when continuous hits are detected as the tap event and the continuous hit is determined in step S51 of FIG. 14 as a result of comparison of the intensity values or the like, the control unit 43 controls the communication module 42 as necessary to transmit an event detection notification indicating that "continuous hits" are detected to the reproduction control device connected to the terminal 11.

Furthermore, the control unit 43 controls the sound output unit 44 in response to the detection (determination) of the tap event "continuous hits", causes the sound effect related to the volume control to be reproduced once, and changes the volume of the sound such as music to be reproduced by the sound output unit 44 by one step.

On the other hand, in a case where it is determined in step S111 that the tap interval condition is not satisfied, the DSP 52 issues a tap event "no tap event" indicating that no tap event is detected in step S113 and supplies the tap event to the low-power CPU 51.

When the process of step S113 is performed, the detection process ends, and thereafter, the process proceeds to step S42 of FIG. 14. In this case, it is determined in step S42 that no tap event has been detected.

As described above, the terminal 11 detects the tap event on the basis of the sensor output signal. In this way, in the terminal 11, the operation by the user such as the continuous hit operation can be reliably detected, and the control as intended by the user can be performed.

<Function Assignment to Continuous Hit Operation>

Meanwhile, it is also possible to assign another control other than the volume control to the above-described continuous hit operation, that is, the tap events "continuous hits" and "continuous hit continuation". Note that hereinafter, the function assigned to the continuous hit operation is also referred to as a continuous hit function.

For example, the continuous hit function may be fast-forward or fast-reverse playback.

Specifically, for example, when the user continuously taps around the right ear, fast-forwarding while playing music is performed, and when the user continuously taps around the left ear, fast-reversing while playing music is performed.

In this case, while the user continuously performs the continuous hit operation, the fast forward or the fast reverse of the music is continuously executed, and when the user stops the continuous hit operation, the music can be reproduced at a normal reproduction speed thereafter.

Fast-forward and fast-reverse are not controls for continuously changing control values. However, even in a case where such a fast-forward or fast-reverse function is set as the continuous hit function, the occurrence of the event PH4 (stop of the continuous hit function due to erroneous detection) can be suppressed by the above-described control CT2, and intended control can be performed for the continuous hit operation by the user.

Furthermore, for example, it is also conceivable to use the continuous hit function as the noise canceling function.

In such a case, for example, when the user continuously taps around the right ear, the noise canceling level may be raised (the external-sound capturing level may be lowered), and when the user continuously taps around the left ear, the external-sound capturing level may be raised (the noise canceling level may be lowered).

In addition, the terminal 11 is not limited to headphones, and may be hearing aid equipment such as a hearing aid or a sound collector, a headset for business use, or the like.

For example, in a case where the terminal 11 functions as hearing aid equipment, the configuration of the hearing aid equipment is further provided with a sound collection unit including a microphone or the like that collects ambient sounds in addition to the configuration illustrated in FIG. 4. Furthermore, in this case, an electrostatic sensor, a button, or the like may be provided as the operation detection unit instead of the IMU 41.

In the hearing aid equipment, according to the user's operation detected by the control unit 43 on the basis of the sensor output signal from the operation detection unit, the sound (audio data) collected by the sound collection unit is amplified by the control unit 43, and the amplified sound is supplied to the sound output unit 44 and reproduced.

At this time, the amplification level of the voice may be increased when the user continuously taps the terminal 11 (hearing aid equipment) around the right ear or on the right ear side, and the amplification level of the voice may be decreased when the user continuously taps the terminal 11 around the left ear or on the left ear side.

In particular, in such a case, the control CT1 and the control CT2 described above are performed, the sound effect is reproduced once each time the tap event "continuous hit continuation" is detected (determined), and the volume control of the collected external sound is performed such that the amplification level increases or decreases step by step.

Furthermore, for example, in a case where the terminal 11 functions as a headset for business use, the configuration of the headset further includes a sound collection unit including a microphone or the like that collects surrounding sound, particularly user's voice, in addition to the configuration illustrated in FIG. 4.

In this case, instead of the IMU 41, an electrostatic sensor, a button, or the like may be provided as the operation detection unit. In addition, the terminals 11 worn on the left and right ears may be connected by wire, a part of the configuration of the control unit 43 and the like may be shared between the left and right, or the terminal 11 may be worn only on one ear.

In the headset for business use, for example, in a case where attention, assistance (support) of another user, or the like is necessary in business, the user can issue an alert to the headset (terminal 11) worn by another user by performing a continuous hit operation. That is, the alert can be notified to another user. Specifically, for example, the communication module 42 transmits a notification of an alert to another headset under the control of the control unit 43.

In such a case, for example, an alert may be issued (notified) when the user continuously taps the terminal 11 around the right ear or on the right ear side, and the alert may be withdrawn when the user continuously taps the terminal 11 around the left ear or on the left ear side.

At this time, the level of the alert may be changed by the amount of taps in the continuous hit operation, that is, for example, the number of times continuous hit continuation is detected as a tap event.

Moreover, it is also possible to enable the user to make settings regarding the continuous hit function (function executed by the continuous hit operation), such as what function the user assigns as the continuous hit function.

In such a case, the reproduction control device connected (paired) to the terminal 11 in a wired or wireless manner may be allowed to make settings related to the continuous hit function and the like.

Specifically, for example, in a case where the reproduction control device is a smartphone or the like, a setting screen for performing setting related to a continuous hit function or the like can be displayed on the display unit of the smartphone as a screen of a dedicated application program.

The user selects the terminal 11 to be set by operating the smartphone, and selects a function to be assigned to each operation such as a double tap operation, a triple tap operation, or a continuous hit operation on the setting screen from among several predetermined candidates (functions).

Furthermore, at the time of assigning the function, the user may set a change width by the continuous hits, that is, a changeable range of the control value controlled by the continuous hit operation.

For example, in a case where the continuous hit function is the volume control, the volume as the control value is changed by the continuous hit operation. At this time, it is conceivable to enable the user to set, on the setting screen, the range of the volume that can be changed by the continuous hit operation, that is, the maximum value (upper limit value) and the minimum value (lower limit value) of the volume.

By doing so, for example, if the user who does not set the maximum sound volume "10" that can be set by the operation of the sound volume control sets a lower value such as "5" as the maximum value of the sound volume in advance, it is possible to prevent the sound volume from being changed to a value larger than "5" at the time of the actual continuous hit operation.

Furthermore, in a case where the terminal 11 is hearing aid equipment, a user of the hearing aid equipment, an operator who adjusts or sets the hearing aid equipment at a store or the like, or the like may set an amplification level of a sound reproduced by the hearing aid equipment, more specifically, a range of the amplification level.

Moreover, the intensity of a necessary tap or the time interval between taps may be adjusted by adjusting the ease of reaction to continuous hits when the user performs a continuous hit operation. In this case, the setting may be performed while the user actually experiences the continuous hit operation on the test screen.

A specific example of the setting related to the continuous hit function as described above is illustrated in FIG. 32.

Figure 32:
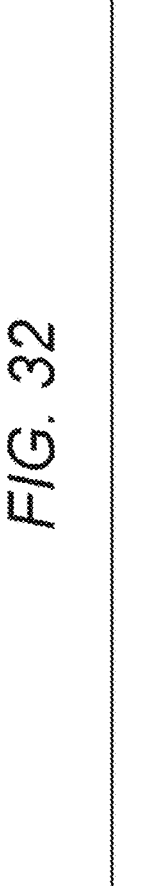
FIG. 32 is a diagram for explaining an example of a setting screen.

For example, a portion indicated by an arrow Q161 in FIG. 32 illustrates an example in which the user can select (set) a function to be assigned to the continuous hit operation on the setting screen.

In this example, on the setting screen, "volume adjustment", "external sound amplification", and "alert notification" are presented as candidates for the function (continuous hit function) assigned to the continuous hit operation on the right ear side.

Furthermore, a radio button for selecting (specifying) each candidate as a function of assigning each candidate to a continuous hit operation is displayed on the left side of the drawing, and here, "volume adjustment" is selected as the continuous hit function.

The portion indicated by an arrow Q162 shows an example in which the amplification level of the voice in the hearing aid equipment as the terminal 11 can be adjusted for each individual.

That is, in the portion indicated by the arrow Q162, a slider bar for designating the range of the amplification level, that is, the maximum value and the minimum value of the amplification level is displayed on the setting screen. The user can set the maximum value and the minimum value by moving a knob (slider) on the slider bar left and right.

Note that, also in a case of specifying a range in which the control value can be changed at the time of execution of the function assigned to the tap operation, a setting screen similar to that indicated by the arrow Q162 may be displayed so that the setting can be performed. In such a case, for example, a slider bar for designating a controllable range of the volume, that is, the above-described maximum value and minimum value is displayed on the setting screen. The user can set the maximum value and the minimum value by moving a knob (slider) on the slider bar left and right.

A portion indicated by an arrow Q163 illustrates an example in which a condition regarding detection of a tap operation (tap event) can be designated.

That is, in the portion indicated by the arrow Q163, a slider bar for performing setting regarding the speed of continuous hits in the continuous hit operation is displayed on the setting screen.

By moving a knob (slider) on the slider bar of the setting screen to the left and right, the user can set (designate) a time interval of taps necessary for recognition as a tap of a continuous hit operation, that is, a speed of continuous hits. With this setting, for example, the continuous hit interval T described with reference to FIG. 30 can be set.

<Configuration Example of Information Processing Apparatus>

Figure 33:
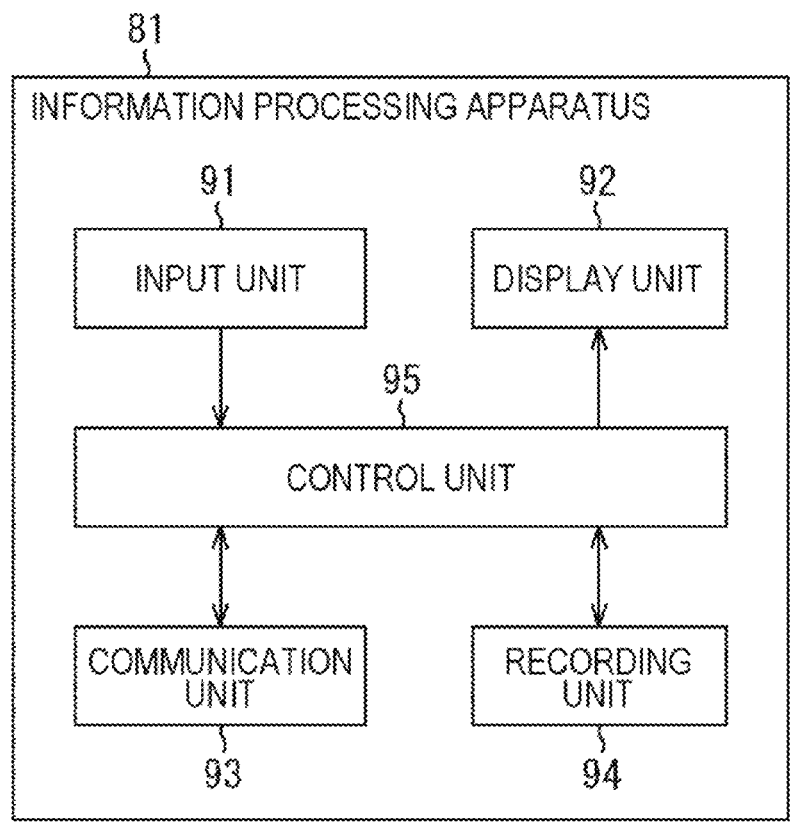
FIG. 33 is a diagram illustrating a configuration example of an information processing apparatus.

As described above, in a case where the setting related to the continuous hit function can be performed, the information processing apparatus to be set by the user is configured as illustrated in FIG. 33, for example.

An information processing apparatus 81 illustrated in FIG. 33 includes, for example, a smartphone, a personal computer, a tablet, a portable player, or the like, and is connected to the terminal 11 in a wired or wireless manner.

In this case, the information processing apparatus 81 and one or two terminals 11 constitute an information processing system.

Note that, in the following description, a case where the information processing apparatus 81 is a smartphone that functions as a reproduction control device, and the terminal 11 is a headphone that receives audio data from the information processing apparatus 81 and reproduces music or the like will be described as an example.

The information processing apparatus 81 includes an input unit 91, a display unit 92, a communication unit 93, a recording unit 94, and a control unit 95.

The input unit 91 includes, for example, a touch panel, a button, or the like superimposed on the display unit 92, and supplies a signal corresponding to a user's operation to the control unit 95. The display unit 92 includes a display, and displays various images such as a setting screen under the control of the control unit 95.

The communication unit 93 communicates with the terminal 11. For example, the communication unit 93 transmits setting information indicating a setting result regarding the continuous hit function supplied from the control unit 95 to the terminal 11, or receives an event detection notification transmitted from the terminal 11 and supplies the event detection notification to the control unit 95.

The recording unit 94 includes a memory and records various data. For example, the recording unit 94 records the data supplied from the control unit 95 and supplies the recorded data to the control unit 95.

The control unit 95 controls the entire operation of the information processing apparatus 81. For example, the control unit 95 generates setting information on the basis of a signal corresponding to a user's operation supplied from the input unit 91, or supplies the generated setting information to the communication unit 93 to transmit the setting information to the terminal 11.

<Description of Setting Process and Setting Recording Process>

Figure 34:
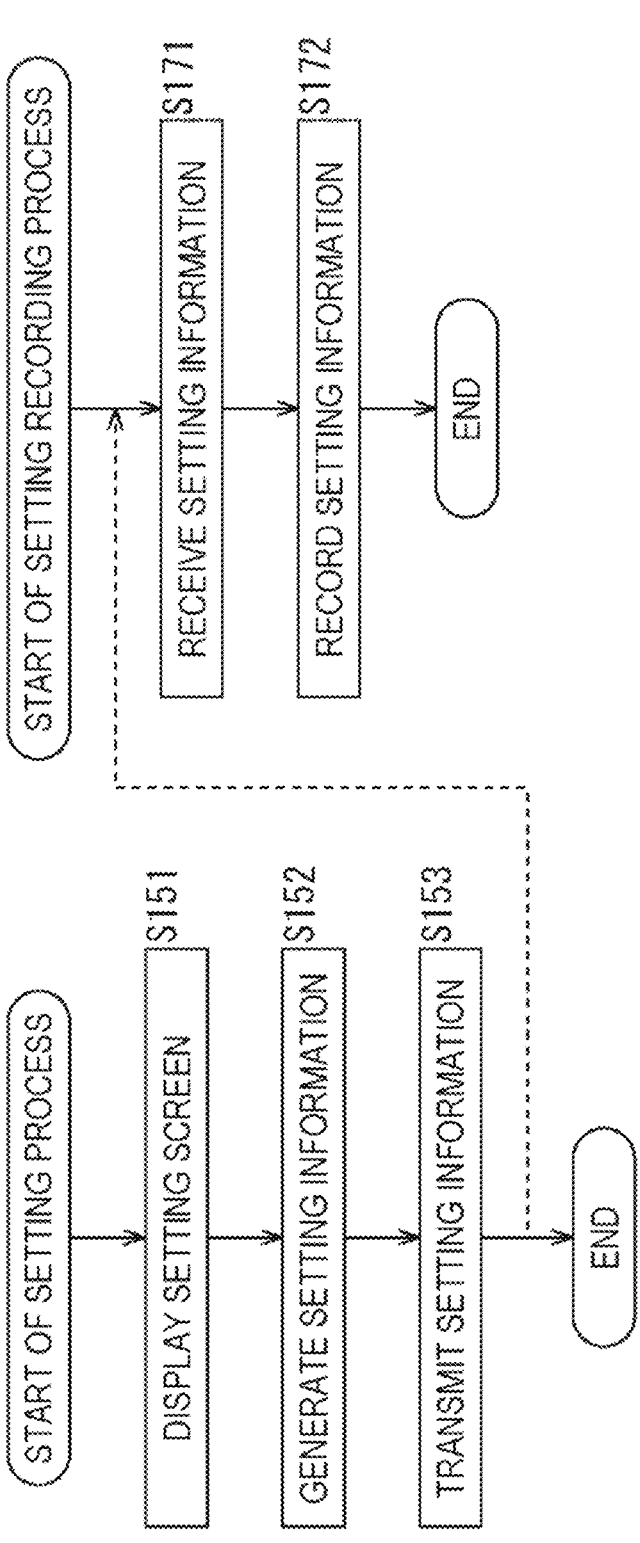
FIG. 34 is a flowchart illustrating a setting process and a setting recording process.

Next, an operation of the information processing system including the terminal 11 and the information processing apparatus 81 will be described. That is, a setting process performed by the information processing apparatus 81 and a setting recording process performed by the terminal 11 will be described below with reference to the flowchart of FIG. 34.

For example, when the control unit 95 of the information processing apparatus 81 starts a dedicated application program recorded in the recording unit 94 and then the user instructs to display the setting screen, the setting process is started.

In step S151, the control unit 95 supplies the image data for displaying the setting screen to the display unit 92, and causes the display unit 92 to display the setting screen for performing the setting related to the continuous hit function. As a result, for example, the setting screen illustrated in FIG. 32 is displayed.

When the setting screen is displayed on the display unit 92, the user operates the input unit 91 to perform setting related to the continuous hit function or the like, such as selecting a function to be assigned to the continuous hit operation. That is, the user operates the setting screen. Then, a signal corresponding to the user's operation is supplied from the input unit 91 to the control unit 95.

In step S152, the control unit 95 generates setting information indicating a result of setting by the user on the basis of a signal supplied from the input unit 91 according to the operation of the user.

For example, in the example indicated by the arrow Q161 in FIG. 32, setting information indicating that the volume adjustment function, that is, the volume control is assigned to the continuous hit operation on the right ear side is generated.

In addition, for example, the setting information may be any information as long as the information indicates the setting result related to the continuous hit function or the like performed by the user, such as information indicating the maximum value and the minimum value of the controllable range of the volume, or information indicating the speed of continuous hits, that is, the continuous hit interval T.

The control unit 95 supplies the generated setting information to the communication unit 93 and instructs transmission to the terminal 11. At this time, the control unit 95 may supply the setting information to the recording unit 94 to record the setting information as necessary.

In step S153, the communication unit 93 transmits the setting information supplied from the control unit 95 to the terminal 11, and the setting process ends.

Furthermore, when the setting information is transmitted from the information processing apparatus 81, the setting recording process is started in the terminal 11.

In step S171, the communication module 42 receives the setting information transmitted from the information processing apparatus 81 and supplies the setting information to the control unit 43.

In step S172, the control unit 43 supplies the setting information supplied from the communication module 42 to a memory (not illustrated) to record. When the setting information is recorded in this manner, the setting recording process ends.

As described above, the information processing apparatus 81 generates and transmits the setting information to the terminal 11, and the terminal 11 receives and records the setting information. As a result, the user can use the terminal 11 and the like with desired settings regarding the continuous hit operation.

By doing so, in the terminal 11, the operation according to the setting information is performed thereafter. That is, the control unit 43 detects a tap event such as "continuous hits" or "continuous hit continuation" on the basis of the setting information, and executes a function assigned to a tap operation such as a continuous hit operation on the basis of the setting information.

Specifically, for example, in a case where the volume control is assigned to the continuous hit operation according to the setting information, when the continuous hits are detected as the tap event and the detection result is determined, the control unit 43 of the terminal 11 controls the sound output unit 44 to reproduce a sound effect determined for the volume control.

At the same time, when supplying the audio data received from the information processing apparatus 81 by the communication module 42 to the sound output unit 44 to reproduce the sound based on the audio data, the control unit 43 performs volume control according to the determined tap event "continuous hits". That is, the control unit 43 reproduces the sound based on the audio data at a volume according to the continuous hit operation by the user.

In a case where the volume control is assigned to the continuous hit operation according to the setting information, even when the continuous hit continuation is determined as a tap event, reproduction of a sound effect and volume control according to the user's continuous hit operation are performed similarly to the case of the tap event "continuous hits".

Furthermore, for example, in a case where the maximum value and the minimum value of the sound volume are designated by the setting information, when performing the sound volume control according to the determined tap event, the control unit 43 changes the sound volume within a range where the sound volume of the sound (music) to be reproduced is the minimum value or more and the maximum value or less indicated by the setting information.

Moreover, for example, in a case where the continuous hit interval T (speed of continuous hits) is designated by the setting information, the control unit 43 performs the processing on the basis of the continuous hit interval T indicated by the setting information in step S102 or step S111 of the detection process described with reference to FIG. 31.

Note that, for example, in a case where a setting that requires processing on the information processing apparatus 81 side is made by the user, the information processing apparatus 81 performs processing according to the setting information.

In this case, when a tap event is detected on the terminal 11 side and the detection result is determined, the communication module 42 of the terminal 11 transmits an event detection notification indicating the detected tap event to the information processing apparatus 81.

Then, the communication unit 93 of the information processing apparatus 81 receives the event detection notification from the terminal 11 and supplies the event detection notification to the control unit 95. The control unit 95 executes processing corresponding to the event detection notification supplied from the communication unit 93 in accordance with the setting information recorded in the recording unit 94. That is, the processing of realizing the function indicated by the setting information assigned to the tap event indicated by the event detection notification is executed by the control unit 95.

In addition, for example, instead of setting on the setting screen, setting may be performed by an operation on the terminal 11 such as a tap operation by the user. In such a case, the control unit 95 of the information processing apparatus 81 generates the setting information in accordance with the event detection notification received from the terminal 11.

Moreover, for example, the detection result of the tap event in the terminal 11 may be used for the operation of the external device, or the function to be executed may be different according to a region (part) where the tap operation is performed around the ear of the user wearing the terminal 11.

Figure 35:
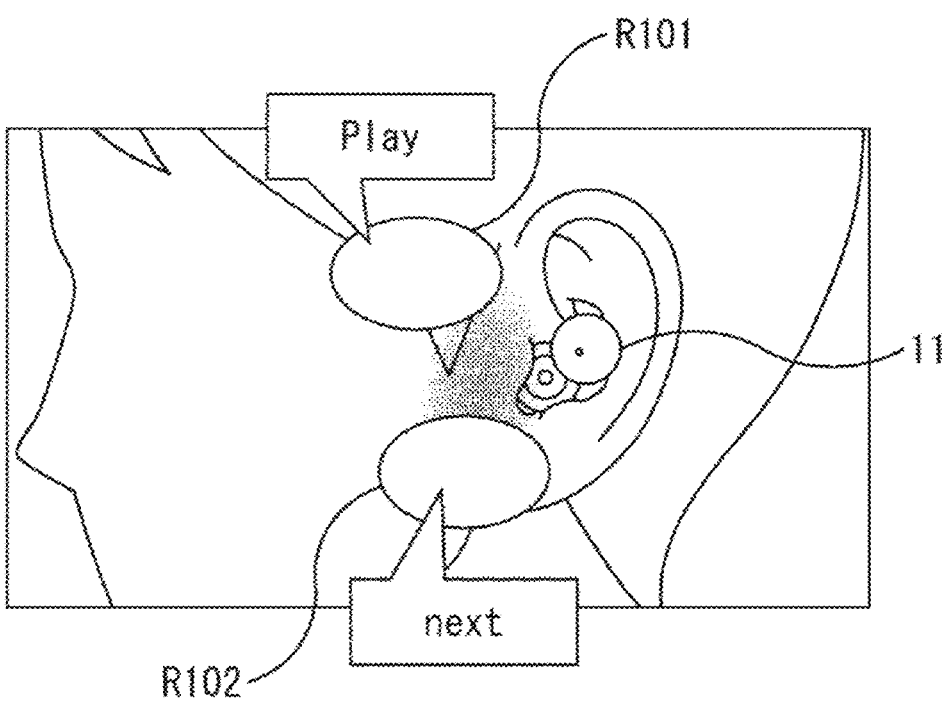
FIG. 35 is a diagram for explaining tap places and assigned functions.

For example, as illustrated in FIG. 35, it is assumed that the user wears the terminal 11 on the left ear.

In this case, for example, the function assigned to the tap operation may be different between a region R101 around the upper part of the user's left ear and a region R102 around the lower part of the user's left ear.

As a specific example, for example, the function of starting or stopping the playback of the music is assigned to the tap operation on the region R101, and the function of turning the music is assigned to the tap operation on the region R102.

In a case where different functions are assigned to each combination of a tap place and a tap operation in this manner, learning data may be acquired for each individual user to perform learning.

For example, the control unit 43 of the terminal 11 performs learning using various signals including a sensor output signal when a tap operation is performed on a target area by the user as learning data, so that it is possible to obtain a discriminator that uses the sensor output signal as an input and uses a detection result of the tap operation on the target area as an output. By using such a discriminator, it is possible to discriminate between a tap operation performed by the user and an area (tap portion) where the tap operation is performed.

Note that the area (tap portion) in which the user performs the tap operation is not limited to the area around the ear of the user, and may be another area of the face of the user such as the forehead and the chin. Even in such a case, the tap portion can be discriminated by a discriminator obtained by learning.

Third Embodiment

<User Authentication>

Meanwhile, there is a demand that only the user who owns the terminal 11 can use the terminal 11, that is, another person other than the user cannot use the terminal 11. Therefore, it is conceivable that authentication (personal authentication) of the user is performed in the terminal 11, and the terminal 11 is enabled only in a case where the authentication is successful.

In this case, for example, as a method of realizing the personal authentication function in the terminal 11, a method of mounting an additional device such as a biometric authentication sensor on the terminal 11 and authenticating the user using the additional device can be considered.

However, if an additional device such as a biometric authentication sensor is additionally mounted on the terminal 11, the terminal 11 becomes larger accordingly. In particular, when the terminal 11 is a small earphone such as a true wireless stereo (TWS), if an additional device is mounted, the terminal 11 becomes conspicuous in size.

Furthermore, in the authentication using the biometric authentication sensor, the authentication accuracy may deteriorate depending on the state of the user. Specifically, for example, in a case where a fingerprint sensor is used as a biometric authentication sensor, authentication may not be correctly performed when a user's finger is wet.

Therefore, the personal authentication function may be realized using a sensor already mounted on the terminal 11, that is, an operation detection unit such as the IMU 41 that detects a tap operation of the user.

Figure 36:
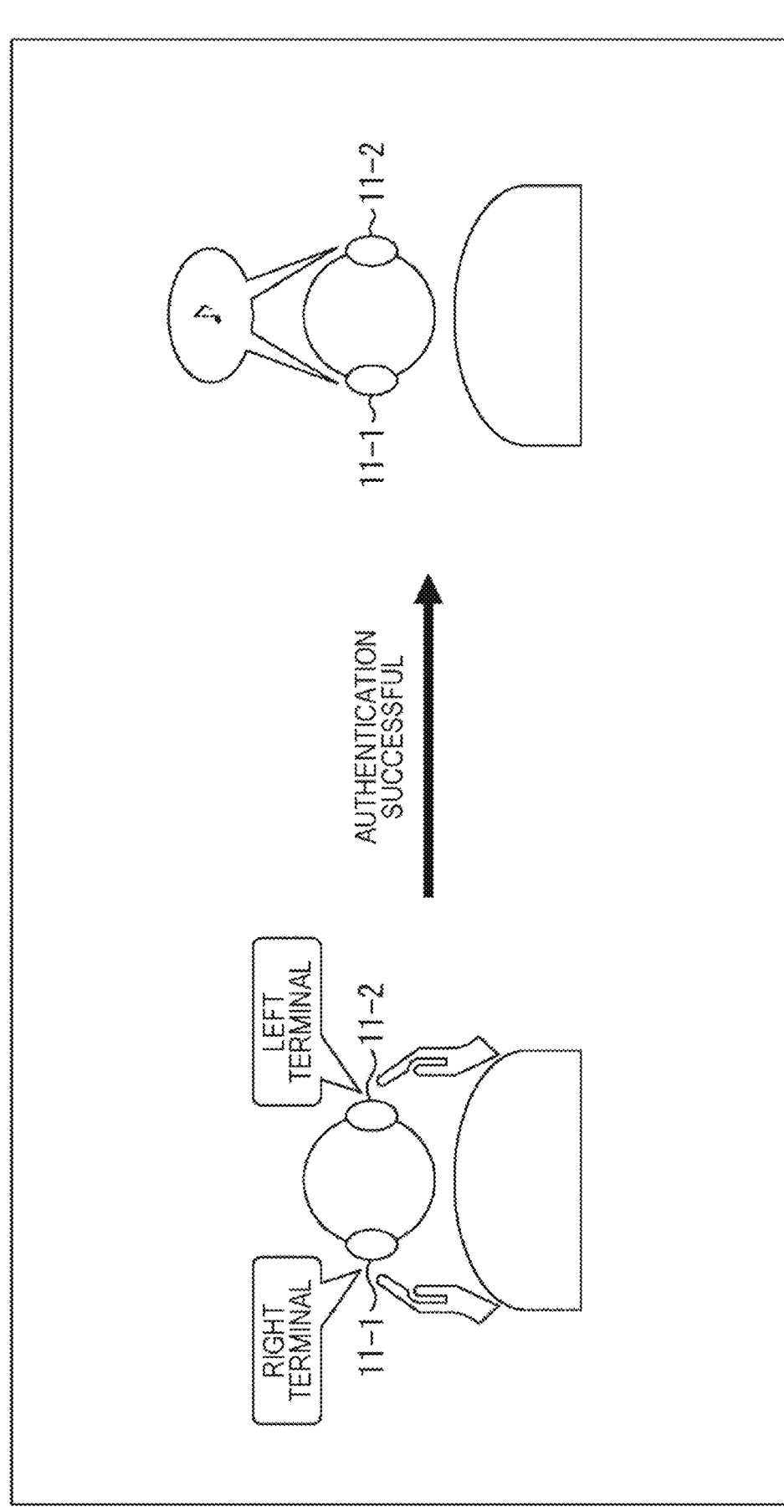
FIG. 36 is a diagram for explaining user authentication.

Specifically, for example, as illustrated in FIG. 36, by using a combination pattern of the number of taps in a tap operation on each of the left and right terminals 11 as a passcode (password), authentication (personal authentication) of the user may be enabled without increasing the size of the terminal 11.

At the start of use of the terminal 11, as illustrated on the left side in the figure, the user wears the terminal 11-1 and the terminal 11-2 on the left and right ears. Then, the user inputs the passcode by alternately performing tap operations on the terminals 11-1 and 11-2.

Then, the terminal 11 compares the passcode input by the tap operation of the user with a passcode registered in advance. Then, in a case where the passcodes match, the terminal 11 determines that the authentication of the user is successful, that is, the user is authenticated as a valid user as illustrated on the right side in the drawing, and makes the terminal 11 itself in an available state. That is, when the authentication is successful, the locked state of the terminal 11 is released and the terminal is brought into a usable state.

Figure 37:
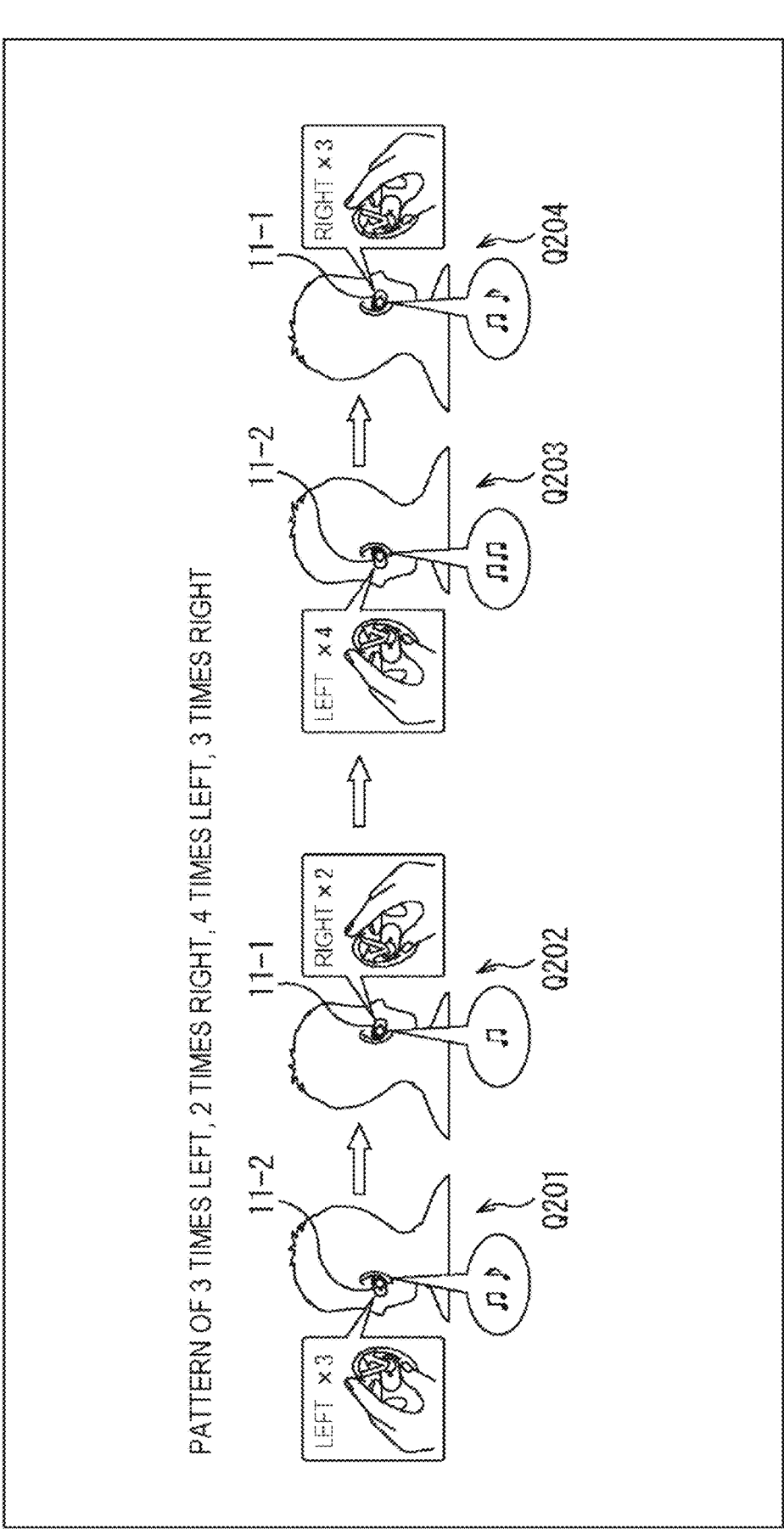
FIG. 37 is a diagram illustrating an example of a combination pattern of the number of taps.

Here, an example of a combination pattern of the number of taps in the left and right alternate tap operations used as the passcode is illustrated in FIG. 37.

FIG. 37 illustrates an example in which an operation of sequentially performing 3 taps on the left side, 2 taps on the right side, 4 taps on the left side, and 3 taps on the right side is performed as a passcode input operation.

Specifically, first, when the user wears the terminal 11 on the left and right ears, as indicated by an arrow Q201, the user continuously taps the terminal 11-2 worn on his/her left ear or a portion around the left ear of his/her head (face) three times.

Then, the terminal 11-2 reproduces a sound effect notifying that tapping has been performed 3 times. For example, a sound effect capable of notifying the number of taps by one reproduction such as a sound indicating that tapping has been performed three times may be reproduced, or the number of taps may be notified by reproducing the sound effect each time tapping is performed.

Note that, in the following description, it is assumed that a tap operation is directly performed on the terminal 11. Furthermore, hereinafter, a sound effect for notifying the user of the number of tap operations recognized on the terminal 11 side, in other words, a sound effect for causing the user to grasp the number of taps detected by the terminal 11 is also particularly referred to as a number-of-times notification sound effect.

When it can be confirmed that the tap operation of the intended number of times is recognized on the left ear side by the reproduction of the number-of-times notification sound effect, the user taps the terminal 11-1 worn on his/her right ear twice as indicated by an arrow Q202. Then, the user confirms that the tap operation of the intended number of times is also recognized on the right ear side by the reproduction of the number notification sound effect in the terminal 11-1.

Similarly, the user taps the terminal 11-2 on the left ear side 4 times as indicated by an arrow Q203, and confirms that the intended number of tap operations have been recognized by the number notification sound effect.

Moreover, the user taps the terminal 11-1 on the right ear side 3 times as indicated by an arrow Q204, and confirms that the tap operation of the intended number of times is recognized by the number notification sound effect.

When the tap operation with the predetermined pattern of left and right alternating is performed in this manner, the terminal 11 obtains information indicating the pattern of the number of taps on the left and right sides as a recognition result of the tap operation.

In this example, information of three times on the left side, two times on the right side, four times on the left side, and three times on the right side is obtained as information (Hereinafter, also referred to as number-of-times pattern information) indicating a pattern of the number of taps on the left and right sides. The number-of-times pattern information is a passcode input by the user.

Furthermore, hereinafter, an operation performed when the passcode is input, in which the user continuously taps on one ear side a predetermined number of times, that is, one or a plurality of times, is also referred to as a tap input operation.

Specifically, for example, three tap operations on the left side indicated by the arrow Q201 are one tap input operation, and similarly, two tap operations on the right side indicated by the arrow Q202 are one tap input operation.

Therefore, it can be said that the number-of-times pattern information is information indicating a combination of the numbers of taps in the tap input operation alternately performed on the left ear side and the right ear side.

Note that, although an example in which a plurality of tap input operations are performed alternately on the left and right sides is described here, a passcode may be input only by one tap input operation on the left or right side. Furthermore, the tap input operation may be continuously performed a plurality of times on one side, and then the tap input operation may be performed on another side, instead of the left-right alternate. Moreover, the number of tap input operations performed on the left ear side and the number of tap input operations performed on the right ear side may be different from each other. Therefore, for example, when the tap operation on the left side indicated by the arrow Q203 ends, the input of the passcode by the user may end.

On the other hand, in the terminal 11, a passcode for authentication of an individual user registered in advance is also recorded. Hereinafter, information indicating a passcode for authentication of a user registered in advance is also referred to as authentication information.

The terminal 11 compares the number-of-times pattern information obtained by the tap operation by the user with the authentication information recorded (registered) in advance, and determines that the authentication of the user is successful in a case where the number-of-times pattern information matches the authentication information.

When the authentication of the user is successful, the terminal 11 appropriately reproduces a sound effect indicating that the authentication is successful, and notifies the user that the authentication is successful. By notifying the user of the authentication result by such a sound effect, the user can easily know the authentication result.

Furthermore, the terminal 11 releases the locked state of the terminal 11 itself and makes it available. As a result, the terminal 11 receives an operation other than the operation for authentication from the user, a command from a smartphone or the like connected wirelessly, and the like, and appropriately plays music or the like.

As described above, by using the sensor that is mounted on the terminal 11 and detects the tap operation, the personal authentication function can be realized without increasing the size of the terminal 11.

Furthermore, the user can easily perform authentication only by performing an existing operation called a tap operation on the terminal 11. That is, authentication can be performed by an existing simple operation without requiring a device other than the terminal 11.

In particular, since the passcode input operation at the time of authentication is a simple and easy-to-understand operation in which tapping is performed a predetermined number of times on each of the left and right sides, the user can reliably perform the operation.

<Configuration Example of Terminal>

Figure 38:
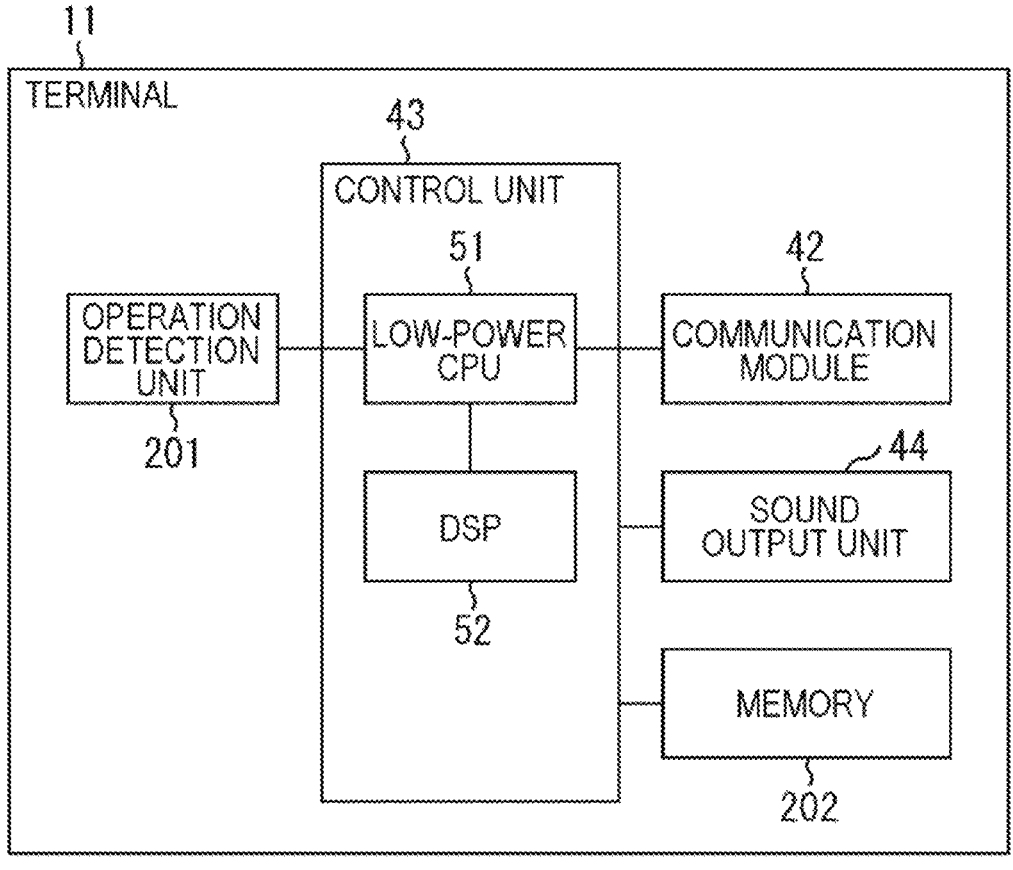
FIG. 38 is a diagram illustrating a configuration example of a terminal.

In a case where the terminal 11 has a personal authentication function, the terminal 11 can have a configuration illustrated in FIG. 38, for example. Note that, in FIG. 38, portions corresponding to those in FIG. 4 are denoted by the same reference signs, and the description thereof will be omitted as appropriate.

The terminal 11 illustrated in FIG. 38 includes an operation detection unit 201, a communication module 42, a control unit 43, a sound output unit 44, and a memory 202. Furthermore, the control unit 43 includes a low-power CPU 51 and a DSP 52.

The operation detection unit 201 includes, for example, an IMU having an acceleration sensor or the like, an acceleration sensor, a gyro sensor, a geomagnetic sensor, an electrostatic sensor, a button, and the like, and supplies a sensor output signal corresponding to an operation by the user to the control unit 43.

For example, in a case where the operation detection unit 201 includes an IMU, the operation detection unit 201 measures (detects) the acceleration generated in the terminal 11, and supplies a measurement result to the low-power CPU 51 of the control unit 43 as a sensor output signal.

In this case, the operation detection unit 201 includes the IMU 41 illustrated in FIG. 4, and the control unit 43 detects a tap operation on a portion around the ear on which the terminal 11 is worn in the user's head on the basis of the sensor output signal by processing similar to the case of the terminal 11 having the configuration illustrated in FIG. 4.

Furthermore, for example, in a case where the operation detection unit 201 includes an electrostatic sensor, the operation detection unit 201 detects contact with the terminal 11, that is, a tap on the terminal 11, and supplies a detection result to the low-power CPU 51 of the control unit 43 as a sensor output signal. That is, the operation detection unit 201 outputs a sensor output signal according to an operation on the terminal 11 by the user. In this case, the control unit 43 detects a direct tap operation on the terminal 11 on the basis of the sensor output signal.

Note that the target of the tap operation by the user may be a portion around the ear of the user's head or the terminal 11, but the following description will be continued on the assumption that the user directly taps the terminal 11 and the control unit 43 detects the tap operation on the terminal 11 by the user.

The memory 202 is a non-volatile recording unit, records various kinds of data such as the above-described authentication information and audio data for reproducing a sound effect, and supplies the recorded data to the control unit 43 as necessary.

For example, in a case where the terminal 11 has the configuration illustrated in FIG. 38, the headphones including the terminal 11-1 and the terminal 11-2 may be left and right separate headphones such as an inner ear type and a canal type, or may be integrated headphones in which the terminal 11-1 and the terminal 11-2 are physically connected. In addition, the terminal 11 may be a device other than headphones that is used by being worn on the user's ear, such as hearing aid equipment such as a hearing aid and a sound collector, or a headset.

Furthermore, various notifications from the terminal 11 to the user, such as notification of the number of taps and notification of an authentication result, are not limited to notification by sound such as a sound effect, and may be performed by any other method.

For example, as a method of various notifications to the user, a notification by vibration by a motor or the like, a notification by light by lighting of a lamp or the like, a notification by display of an image or the like in an information processing apparatus such as a smartphone, a combination of these notifications, and the like can be considered. In the following description, it is basically assumed that the notification from the terminal 11 to the user is performed by reproducing a sound effect.

<Description of Recording Side Registration Process and Non-Recording Side Registration Process>

Next, the operation of the terminal 11 illustrated in FIG. 38 will be described.

In particular, here, a case where, when the terminal 11-1 and the terminal 11-2 configuring the headphone perform communication (Hereinafter, also referred to as left-right communication) to register the authentication information, the authentication information is recorded only in one terminal 11 will be described as an example.

Furthermore, hereinafter, the terminal 11 on the side where the authentication information is recorded is also referred to as a terminal 11 on the recording side, and the terminal 11 on the side where the authentication information is not recorded is also referred to as a terminal 11 on the non-recording side.

For example, in a case where the user registers authentication information, that is, a passcode, the user wears the terminal 11 on each of the left and right ears, and each terminal 11 and an information processing apparatus such as a smartphone are wirelessly connected.

Furthermore, the user operates the information processing apparatus to start a dedicated application program or the like, thereby causing the information processing apparatus to display a registration screen for registration of authentication information.

For example, the registration screen is provided with a passcode registration start button, and when the user presses the registration start button, the information processing apparatus transmits a registration start request to request registration start of the passcode to each of the left and right terminals 11.

The communication module 42 of each of the left and right terminals 11, that is, each of the terminals 11 on the recording side and the non-recording side receives the registration start request transmitted from the information processing apparatus and supplies the registration start request to the control unit 43.

Then, the control unit 43 appropriately controls the sound output unit 44 to cause the sound output unit 44 to output a voice or the like that urges the start of input of the passcode, and then starts processing for registration of the passcode. Specifically, as processing for registering a passcode, the terminal 11 on the recording side performs a recording side registration process, and the terminal 11 on the non-recording side performs a non-recording side registration process.

Hereinafter, the recording side registration process by the terminal 11 on the recording side and the non-recording side registration process by the terminal 11 on the non-recording side will be described with reference to the flowchart of FIG. 39.

When the recording side registration process is started in the terminal 11 on the recording side, in step S201, the control unit 43 of the terminal 11 on the recording side detects a tap input operation on the own terminal side and holds tap number information indicating the detection result.

For example, after pressing a registration start button on the registration screen, the user appropriately starts to input a passcode, for example, by following reproduced sound. That is, the user performs an operation of tapping the terminal 11 on the recording side a desired number of times as a tap input operation.

Then, the low-power CPU 51 of the control unit 43 detects a tap input operation by the user on the basis of the sensor output signal supplied from the operation detection unit 201. The control unit 43 generates and holds tap number information indicating the number of taps performed by the tap input operation detected by the low-power CPU 51.

Note that, although an example in which the input of the passcode is started from the recording side will be described here, the input of the passcode, that is, the tap input operation may be started from either the recording side or the non-recording side. For example, from which side the passcode is input may be determined in advance or may be selected by the user.

When generating the tap number information according to the tap input operation of the user, the control unit 43 appropriately controls the sound output unit 44 to cause the sound output unit 44 to output a number notification sound effect indicating that tapping has been performed by the number of taps indicated by the tap number information.

Furthermore, the control unit 43 supplies an input start notification instructing the start of a tap input operation on the terminal 11 on the non-recording side, that is, the start of acceptance of the tap input operation, to the communication module 42, and instructs transmission to the terminal 11 on the non-recording side.

In step S202, the communication module 42 transmits the input start notification supplied from the control unit 43 to the terminal 11 on the non-recording side by wireless communication (left-right communication).

Then, the non-recording-side terminal 11 performs the processing of step S231 of the non-recording side registration process.

That is, in step S231, the communication module 42 of the terminal 11 on the non-recording side receives the input start notification transmitted from the terminal 11 on the recording side and supplies the input start notification to the control unit 43.

In response to the input start notification supplied from the communication module 42, the control unit 43 starts receiving a tap input operation in the terminal 11 on the non-recording side. That is, the control unit 43 causes the low-power CPU 51 to start detecting the tap input operation. At this time, the control unit 43 may appropriately control the sound output unit 44 to cause the sound output unit 44 to output a tap input operation on the non-recording side, that is, a sound effect such as a sound prompting input of a passcode.

The user performs an operation of tapping the non-recording-side terminal 11 a desired number of times as a tap input operation, for example, according to a sound or the like reproduced as necessary.

In step S232, the control unit 43 detects a tap input operation on the non-recording side by the user and holds tap number information indicating the detection result.

For example, the low-power CPU 51 of the control unit 43 detects a tap input operation by the user on the basis of the sensor output signal supplied from the operation detection unit 201, and the control unit 43 generates tap number information indicating the number of taps in the tap input operation indicated by the detection result.

After generating the tap number information, the control unit 43 appropriately controls the sound output unit 44 to cause the sound output unit 44 to output the number notification sound effect and notifies the user of the number of taps.

Furthermore, the control unit 43 supplies the generated tap number information to the communication module 42 and instructs transmission to the terminal 11 on the recording side.

In step S233, the communication module 42 transmits the tap number information indicating the number of taps in the tap input operation detected on the own terminal side supplied from the control unit 43 to the terminal 11 on the recording side by left-right communication.

In step S234, the control unit 43 determines whether or not to end the processing on the non-recording side.

For example, the control unit 43 determines to end the processing in a case where the registration end notification indicating that the registration of the passcode is ended transmitted from the information processing apparatus such as a smartphone or the terminal 11 on the recording side is received by the communication module 42 and the registration end notification is supplied from the communication module 42.

Furthermore, for example, in a case where the input start notification has not been transmitted from the terminal 11 on the recording side for a predetermined time or more after transmitting the tap number information to the terminal 11 on the recording side, it may be determined to end the processing. In addition, for example, in a case where an operation indicating that the input of the passcode has ended is detected, a case where a tap input operation has been performed a prescribed number of times, or the like, it may be determined to end the processing.

In a case where it is determined in step S234 that the processing is not yet ended, thereafter, the processing returns to step S231, and the above-described processing is repeatedly performed.

That is, the tap input operation to be newly performed is detected, and the tap number information indicating the detection result is transmitted to the recording side.

On the other hand, in a case where it is determined in step S234 that the processing is to be ended, the control unit 43 controls the sound output unit 44 as necessary to output the sound effect indicating that the registration is completed from the sound output unit 44, and the non-recording side registration process is ended.

Furthermore, when the tap number information is transmitted from the non-recording side to the recording side in step S233, the terminal 11 on the recording side performs the processing of step S203.

In step S203, the communication module 42 of the terminal 11 on the recording side receives the tap number information in the tap input operation on a non-recording side, that is, another terminal side, transmitted from the terminal 11 on the non-recording side by the processing in step S233, and supplies the tap number information to the control unit 43.

In step S204, the control unit 43 holds the tap number information of the tap input operation on the another terminal side received in step S203.

In step S205, the control unit 43 determines whether or not to end the process on the recording side.

For example, the control unit 43 determines to end the processing in a case where the registration end notification indicating that the registration of the passcode is ended transmitted from the information processing apparatus such as the smartphone is received by the communication module 42 and the registration end notification is supplied from the communication module 42.

In addition, for example, in a case where a tap input operation has not been detected on the recording side for a predetermined time or more, in a case where an operation indicating that the input of the passcode has ended has been detected, in a case where a tap input operation has been performed a prescribed number of times, or the like, it may be determined to end the processing.

In a case where it is determined in step S205 that the processing is not yet ended, thereafter, the processing returns to step S201, and the above-described processing is repeatedly performed.

That is, the tap input operation newly performed on the recording side is detected, and the tap number information of the tap input operation detected on the non-recording side is received.

On the other hand, in a case where it is determined in step S205 that the process is to be ended, the process then proceeds to step S206. In this case, the control unit 43 appropriately supplies the registration end notification to the communication module 42 to transmit the registration end notification to the terminal 11 on the non-recording side.

In step S206, the control unit 43 generates, as the authentication information, information that is input at the time of registration of the authentication information (passcode) and includes the stored tap number information in each tap input operation on the recording side and the non-recording side, and supplies the authentication information to the memory 202 to record the authentication information. In this case, the information including the tap number information held in steps S201 and S204 is the authentication information.

The authentication information is information indicating a passcode input by the user at the time of registration, and the authentication information indicates the order and the number of taps (tap input operation) performed on each of the right and left sides.

In other words, the authentication information is information indicating a combination of the number of taps in the tap input operation alternately performed on the left ear side and the right ear side as the input of the passcode for authentication, that is, a combination of the tap number information.

When the control unit 43 registers the authentication information by recording the authentication information in the memory 202, the control unit controls the sound output unit 44 as necessary to output the sound effect indicating that the registration is completed from the sound output unit 44, and the recording side registration process ends. In this case, for example, the sound effect indicating that the registration is completed is reproduced on the recording side and the non-recording side at the same time or only on one of the recording side and the non-recording side.

Furthermore, the control unit 43 may appropriately transmit a registration completion notification indicating that the registration is completed, including the registered authentication information, to an information processing apparatus such as a smartphone by wireless communication. In this case, the information processing apparatus can display a message indicating that the registration is completed and the registered authentication information (passcode) on the registration screen on the basis of the received registration completion notification.

Note that, in a case where the registration cannot be completed at the time of input of the passcode for authentication by the user due to, for example, occurrence of a tap mistake by the user, a sound effect indicating that the registration has failed may be output from the sound output unit 44.

Furthermore, for example, since it is conceivable that the user makes a tap mistake while inputting the passcode, the passcode (authentication information) may be input again from the beginning according to the intention of the user.

In such a case, for example, a redo button (reset button) is only required to be provided on a registration screen for registration of a passcode displayed on the information processing apparatus.

In this case, when the user operates the redo button to request re-registration, a redo request for re-registration is transmitted from the information processing apparatus to the terminal 11.

Therefore, for example, in a case where a redo request from the information processing apparatus is received by the communication module 42 of the terminal 11 while the terminal 11 is performing the recording side registration process and the non-recording side registration process, the currently performed recording side registration process and non-recording side registration process are performed again.

That is, when a redo request is supplied from the communication module 42, the control unit 43 stops the currently performed recording side registration process and non-recording side registration process in the middle, and then newly starts the recording side registration process and the non-recording side registration process. As a result, the recording side registration process and the non-recording side registration process are performed again from the beginning.

As described above, the headphones, that is, the terminals 11 on the recording side and the non-recording side detect the tap input operation of the user, and generate and record the authentication information while appropriately performing left-right communication.

In this way, it is possible to realize the personal authentication function without increasing the size of the terminal 11 by using the operation detection unit 201 originally mounted on the terminal 11. In addition, authentication can be performed only by a simple and easy-to-understand operation of a combination of tap operations on the left and right sides.

Note that, in FIG. 39, an example in which the authentication information is recorded only in the terminal 11 on one side (recording side) of the left and right terminals 11 has been described. However, the present invention is not limited thereto, and the authentication information may be recorded in both the left and right terminals 11.

Even in such a case, processing similar to the recording side registration process and the non-recording side registration process described with reference to FIG. 39 is performed.

However, in step S202 of the recording side registration process, an input start notification including tap number information regarding the tap input operation detected on the own terminal side is transmitted.

Furthermore, in the non-recording side registration process, the tap number information of the tap input operation detected on the own terminal side and the tap number information on the another terminal side included in the input start notification are held, and after the processing of step S234, the authentication information is generated and recorded.

<Description of Recording Side Authentication Process and Non-Recording Side Authentication Process>

Furthermore, after the authentication information is recorded in the terminal 11 on the recording side, every time the user wears the terminal 11 on the ear and activates the terminal 11, a recording side authentication process and a non-recording side authentication process are performed. Note that the user may wear the terminal 11 on the ear after activating the terminal 11, or the terminal may be activated when the wearing of the terminal 11 is detected.

For example, the terminal 11 is provided with a wearing detection sensor (not illustrated), and when the user wears the terminal 11 on his/her ear, the wearing is detected by the wearing detection sensor, and the detection result is supplied to the control unit 43.

Then, the recording side authentication process is started in the terminal 11 on the recording side, and the non-recording side authentication process is started in the terminal 11 on the non-recording side.

Hereinafter, the recording side authentication process and the non-recording side authentication process performed by the terminals 11 on the recording side and the non-recording side will be described with reference to the flowchart of FIG. 40.

When the recording side authentication process is started in the terminal 11 on the recording side, processing of steps S261 to S264 is performed.

Note that the processing in steps S261 to S264 is similar to the processing in steps S201 to S204 in FIG. 39, and thus the description thereof will be omitted.

However, in step S261, at the start of the tap input operation, for example, the control unit 43 may control the sound output unit 44 to cause the sound output unit 44 to output a sound effect that prompts the user to input a passcode for authentication.

Furthermore, when the input start notification is transmitted in step S262, the non-recording side terminal 11 performs processing of steps S291 to S293 of the non-recording-side authentication process.

Note that the processing in steps S291 to S293 is similar to the processing in steps S231 to S233 in FIG. 39, and thus the description thereof will be omitted.

Furthermore, on the non-recording side, after the processing of step S293 is performed, in step S294, the control unit 43 determines whether or not the input of the passcode has ended.

For example, the control unit 43 determines that the input has ended in a case where an input start notification has not been transmitted from the terminal 11 on the recording side for a predetermined time or more after transmitting the tap number information to the terminal 11 on the recording side, in a case where an operation indicating that the input of the passcode has ended is detected, or the like.

In addition, a notification indicating that the input of the passcode is finished may be sent from the terminal 11 on the recording side to the terminal 11 on the non-recording side, or it may be determined that the input is finished in a case where a tap input operation is performed a prescribed number of times.

In a case where it is determined in step S294 that the input has not been completed yet, thereafter, the process returns to step S291, and the above-described processing is repeatedly performed.

On the other hand, in a case where it is determined in step S294 that the input has ended, thereafter, the process proceeds to step S295. That is, it enters a state of waiting for reception of an authentication result from the recording side.

Furthermore, in the terminal 11 on the recording side, the processing of step S264 is performed, and after the tap number information on the another terminal side is held, processing of step S265 is then performed.

In step S265, the control unit 43 determines whether or not the input of the passcode has ended.

For example, the control unit 43 determines that the input has ended in a case where the tap input operation has not been detected on the recording side for a predetermined time or more, in a case where an operation indicating that the input of the passcode has ended has been detected, in a case where the tap input operation has been performed a prescribed number of times, or the like.

In a case where it is determined in step S265 that the input has not been completed yet, thereafter, the process returns to step S261, and the above-described processing is repeatedly performed.

On the other hand, in a case where it is determined in step S265 that the input has ended, thereafter, the process proceeds to step S266. In this case, the recording side may notify the non-recording side that the input of the passcode has ended.

In step S266, the control unit 43 sets, as the number-of-times pattern information, information including the tap number information in each tap input operation on the recording side and the non-recording side input by the user and held by the processing in steps S261 and S264. Then, the control unit 43 performs authentication of the user on the basis of the number-of-times pattern information and authentication information recorded in advance.

That is, at the time of authentication of the user, the control unit 43 compares the number-of-times pattern information including the tap number information input by the left and right alternate tap input operations by the user with the authentication information recorded in the memory 202 in advance. Then, in a case where the number-of-times pattern information matches the authentication information, the control unit 43 determines that the authentication of the user is successful. That is, the user is authenticated as a valid user of the terminal 11.

On the other hand, in a case where the number-of-times pattern information does not match the authentication information, the control unit 43 determines that the authentication of the user has failed.

When authenticating the user, the control unit 43 supplies an authentication result notification indicating the authentication result to the communication module 42 and instructs transmission to the non-recording side.

In step S267, the communication module 42 transmits the authentication result notification supplied from the control unit 43 to the terminal 11 on the non-recording side by left-right communication.

In step S268, the control unit 43 performs processing according to the authentication result.

At this time, for example, the control unit 43 controls the sound output unit 44 according to the authentication result, and causes the sound output unit 44 to output (reproduce) a sound effect indicating that the authentication of the user has succeeded or a sound effect indicating that the authentication of the user has failed. Note that the sound effect indicating the authentication result may be a voice or a non-voice sound indicating the authentication result. By reproducing such a sound effect, it is possible to notify (present) the user of the authentication result in an easy-to-understand manner.

In a case where the authentication is successful, the control unit 43 releases the locked state of the terminal 11 to be in the usable state, and starts receiving an operation other than the operation related to the authentication from the information processing apparatus such as the user or the smartphone. Thereafter, for example, when audio data is transmitted from the information processing apparatus, the control unit 43 executes processing according to the user's operation, such as reproducing music or the like by the sound output unit 44 on the basis of the audio data.

On the other hand, in a case where the authentication fails, the control unit 43 keeps the state of the terminal 11 in the locked state and accepts only the operation related to the authentication.

When the processing of step S268 is performed, the recording side authentication process ends.

Furthermore, when the authentication result notification is transmitted to the non-recording side in step S267, processing in step S295 is performed on the non-recording side.

In step S295, the communication module 42 receives the authentication result notification transmitted from the terminal 11 on the recording side, and supplies the authentication result notification to the control unit 43.

In step S296, the control unit 43 performs processing according to the authentication result.

In step S296, processing similar to that in step S268 is performed. That is, the control unit 43 controls the sound output unit 44 to reproduce a sound effect according to the authentication result, and then, sets the state of the terminal 11 to the usable state or keeps the locked state according to the authentication result. In particular, the reproduction of the sound effect according to the authentication result is performed simultaneously with the reproduction of the sound effect on the recording side.

When the processing of step S296 is performed, the non-recording side authentication process ends.

Note that, for example, since it is conceivable that the user makes a tap mistake while inputting the passcode, the user may input the passcode again by his/her intention.

In such a case, for example, since the user interrupts the input of the passcode when a tap mistake or the like occurs, an authentication result indicating that the authentication has failed is obtained in step S266, and a sound effect to that effect is reproduced as appropriate.

Then, since the user inputs the passcode again from the beginning, the recording side authentication process and the non-recording side authentication process described above are performed from the beginning in the terminals 11 on the recording side and the non-recording side, and when the user inputs a correct passcode, an authentication result indicating that the authentication is successful is obtained.

As described above, the headphone, that is, the terminal 11 on the recording side and the non-recording side detects the left and right alternate tap input operations by the user, and compares the number-of-times pattern information obtained as the detection result with the authentication information to authenticate the user.

In this way, it is possible to realize the personal authentication function without increasing the size of the terminal 11 by a simple operation of a left-right alternate tap input operation using the operation detection unit 201 originally mounted on the terminal 11.

Note that, in FIG. 40, an example in which the authentication information is recorded only in the terminal 11 on one side (recording side) of the left and right terminals 11 has been described. However, the present invention is not limited thereto, and the authentication information may be recorded in both the left and right terminals 11.

Even in such a case, a process similar to the recording side authentication process and the non-recording side authentication process described with reference to FIG. 40 is performed.

However, in step S262 of the recording side authentication process, an input start notification including tap number information regarding the tap input operation detected on the own terminal side is transmitted.

Furthermore, in the non-recording side authentication process, the tap number information of the tap input operation detected on the own terminal side and the tap number information on the another terminal side included in the input start notification are held, and the number-of-times pattern information obtained from the held tap number information is generated. Then, instead of the processing of step S295, the obtained number-of-times pattern information is compared with authentication information registered in advance to authenticate the user. In this case, authentication is performed on both the recording side and the non-recording side, but the same authentication result is obtained on both sides.

In addition, here, an example in which a passcode registered in advance by a user is recorded in the memory 202 as authentication information has been described. However, the authentication information is not limited to that registered by the user, and may be recorded in the memory 202 in advance at the time of shipment of the terminal 11 that is a product, or the authentication information acquired from an external device after shipment may be recorded in the memory 202, for example.

First Modification of Third Embodiment

<Description of Registration Process>

Furthermore, although the case where the left and right terminals 11 are worn on the ears of the user and used has been described above, the terminal 11 may be worn on only one ear of the user and used. Even in such a case, the above-described registration of the passcode and authentication using the passcode can be performed only by one (one ear side) terminal 11.

Hereinafter, a case where only the terminal 11 on one side is used will be described.

Figure 41:
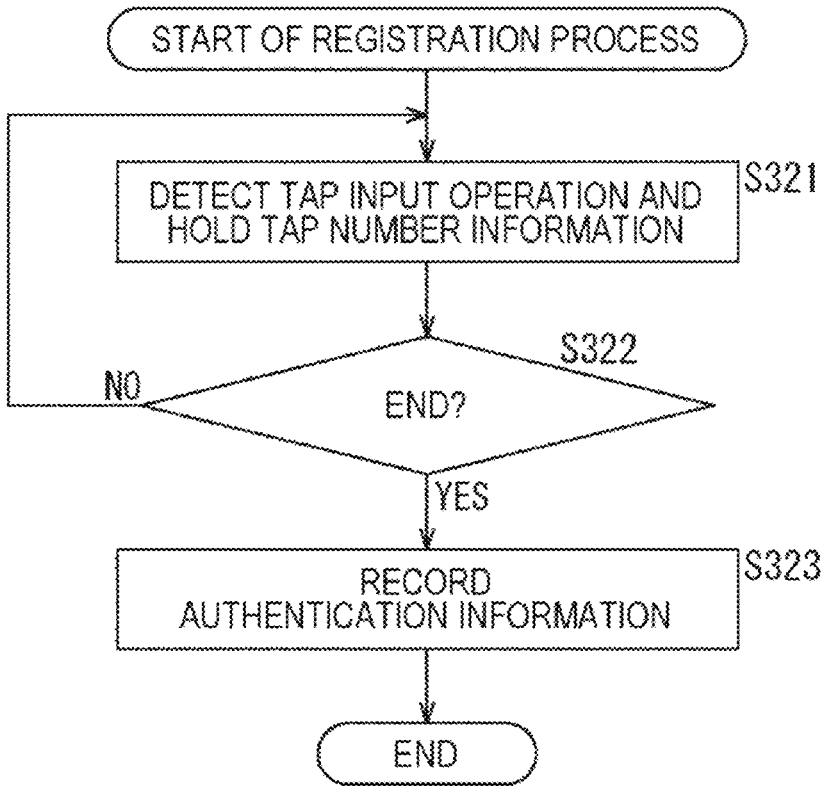
FIG. 41 is a flowchart illustrating a registration process.

In this case, in the terminal 11, a registration process illustrated in FIG. 41 is performed as a process corresponding to the process described with reference to FIG. 39. That is, the registration process by the terminal 11 will be described below with reference to the flowchart of FIG. 41.

Note that the registration process is started in response to a registration start request from the information processing apparatus, for example, similarly to the case of the example of FIG. 39, and at the start, a voice or the like prompting start of input of a passcode is appropriately output from the sound output unit 44.

In step S321, the control unit 43 detects the tap input operation and holds tap number information indicating the detection result. More specifically, a tap input operation is detected by the low-power CPU 51 on the basis of a sensor output signal supplied from the operation detection unit 201.

For example, in the case of inputting a passcode, the user performs an operation of continuously tapping a desired number of times, such as three times, as one tap input operation, and then starts the next tap input operation after a while.

Therefore, in a case where the next tap has not been detected for a predetermined time after the last tap by the user is detected by the low-power CPU 51, the control unit 43 determines that the tap input operation by the user has ended, and generates information indicating the number of taps detected until then as the tap number information.

Furthermore, in this case, the control unit 43 notifies the user that the next tap input operation can be started together with the number of taps performed by the tap input operation by controlling the sound output unit 44 to cause the sound output unit 44 to reproduce the number notification sound effect.

In step S322, the control unit 43 determines whether or not to end the process for registering the authentication information.

For example, the control unit 43 determines to end the process in a case where a registration end notification indicating that the registration of the passcode is ended is supplied from the communication module 42, which is transmitted from an information processing apparatus such as a smartphone, or in a case where a tap input operation has not been detected for a predetermined time or more.

In addition, for example, in a case where an operation indicating that the input of the passcode has ended is detected, or in a case where a tap input operation has been performed a prescribed number of times, it may be determined to end the process.

In a case where it is determined in step S322 that the process is not yet ended, thereafter, the process returns to step S321, and the above-described processing is repeatedly performed. That is, the next tap input operation is detected.

On the other hand, in a case where it is determined in step S322 that the process is ended, in step S323, the control unit 43 generates information including the tap number information in each tap input operation held by the processing in step S321 as authentication information, and supplies and records the authentication information to the memory 202. As a result, the authentication information is registered.

This authentication information is information indicating a combination of the number of taps (tap number information) in the tap input operation sequentially performed one or more times on one terminal 11.

When the authentication information is registered, the control unit 43 controls the sound output unit 44 as necessary to output a sound effect indicating that the registration is completed from the sound output unit 44, and the registration process ends.

Note that, also in this case, a registration completion notification including the registered authentication information may be appropriately transmitted to an information processing apparatus such as a smartphone.

Furthermore, also in a case where such registration process is performed, similarly to the case of the recording side registration process, the input of the passcode (registration of the authentication information) may be performed again in response to the operation on the redo button on the registration screen, that is, the redo request or the like.

In such a case, the registration process is stopped in the middle in response to a redo request or the like, and then the registration process is newly started. That is, the terminal 11 performs the registration process again from the beginning.

As described above, the terminal 11 detects one or a plurality of tap input operations of the user, and generates and records authentication information on the basis of the detection results.

In this way, it is possible to realize the personal authentication function without increasing the size of the terminal 11 by a simple operation of a tap input operation on one ear side using the operation detection unit 201 originally mounted on the terminal 11.

<Description of Authentication Process>

Figure 42:
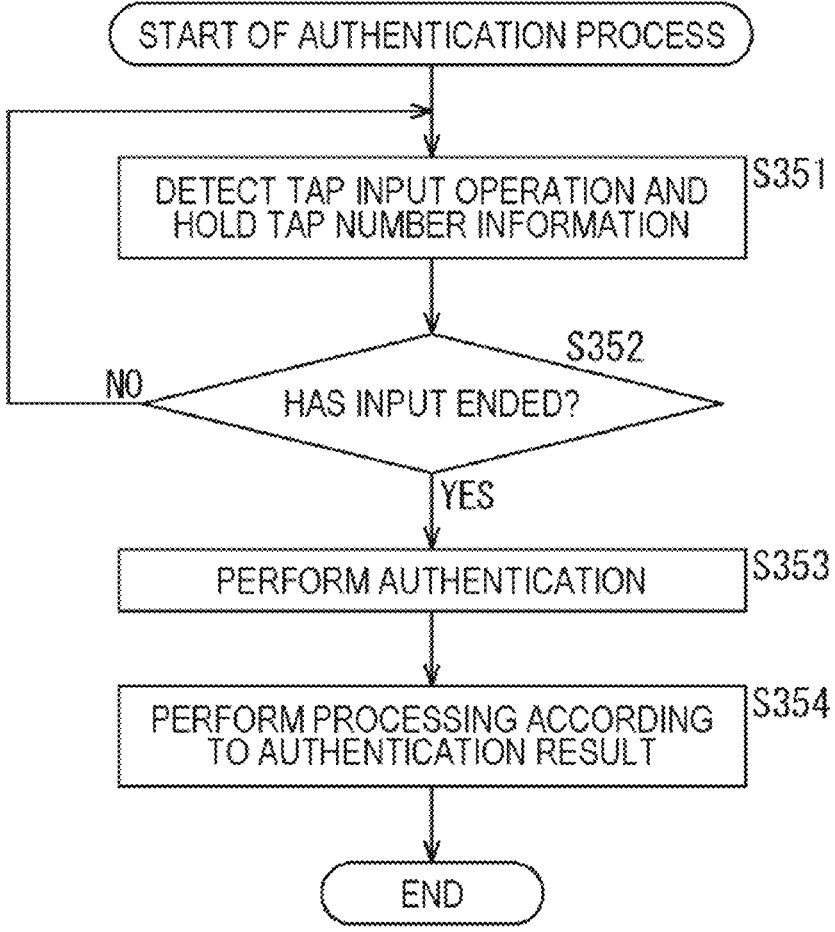
FIG. 42 is a flowchart for explaining an authentication process.

Next, an authentication process in a case where only the terminal 11 on one ear side is used will be described. That is, the authentication process performed by the terminal 11 will be described below with reference to the flowchart of FIG. 42. Similarly to the example illustrated in FIG. 40, this authentication process is also started when the user wears the terminal 11 on the ear.

When the authentication process is started, processing of step S351 is performed, and the tap input operation performed by the user is detected.

Note that the processing in step S351 is similar to the processing in step S321 in FIG. 41, and thus the description thereof will be omitted.

However, in step S351, at the start of the tap input operation, for example, the control unit 43 may control the sound output unit 44 to cause the sound output unit 44 to output a sound effect that prompts the user to input a passcode for authentication.

In step S352, the control unit 43 determines whether or not the input of the passcode has ended.

For example, in step S352, in a case where the tap input operation has not been detected for a predetermined time or more, in a case where the operation indicating that the input of the passcode has ended has been detected, in a case where the tap input operation has been performed a prescribed number of times, or the like, it is determined that the input has ended.

In a case where it is determined in step S352 that the input has not been completed yet, thereafter, the process returns to step S351, and the above-described processing is repeatedly performed.

On the other hand, in a case where it is determined in step S352 that the input has ended, processing of steps S353 and S354 is performed, and the authentication process ends.

Note that the processing in steps S353 and S354 is similar to the processing in steps S266 and S268 in FIG. 40, and thus the description thereof will be omitted.

As described above, the terminal 11 detects one or a plurality of tap input operations of the user on one ear side, and performs authentication of the user using authentication information registered in advance. In this way, authentication can be performed with a simple operation without increasing the size of the terminal 11.

Second Modification of Third Embodiment

<Configuration Example of Storage Case>

Incidentally, a storage case for storing the terminal 11 may be prepared in advance for left and right separate headphones including the terminal 11-1 and the terminal 11-2. Furthermore, some of such storage cases function as a charging case (charger) that supplies power to the terminal 11 to perform charging.

When a sensor is provided in such a storage case of the terminal 11, it is also possible to provide the storage case with the above-described personal authentication function of the user.

Figure 43:
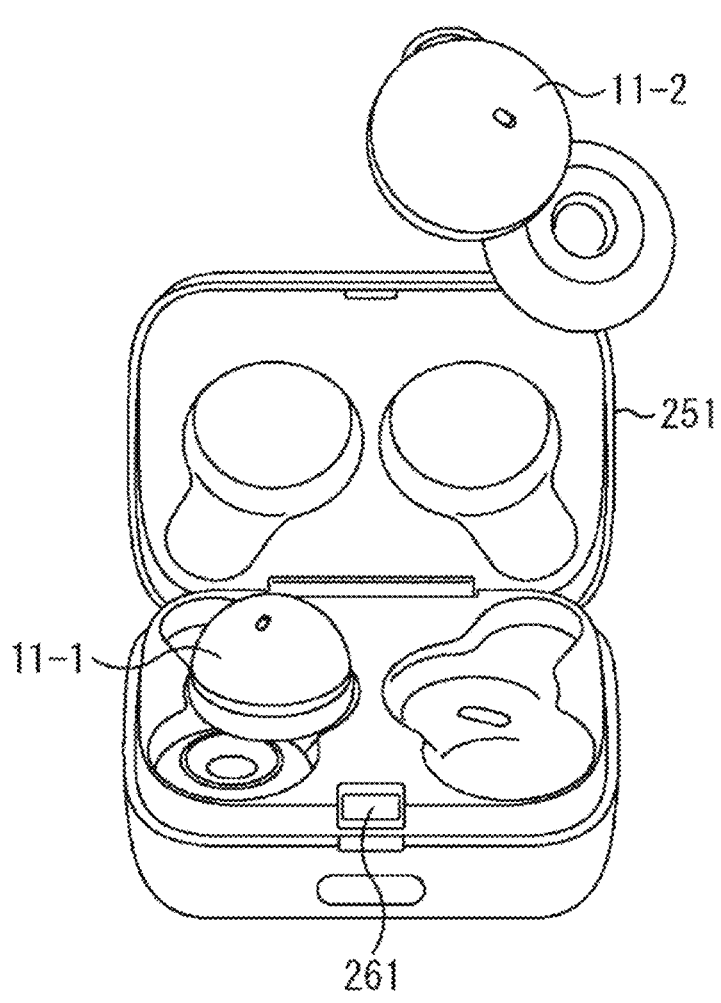
FIG. 43 is a diagram illustrating a configuration example of an external appearance of a storage case.

FIG. 43 illustrates a configuration example of an appearance of a storage case of the terminal 11.

In this example, in the storage case 251, the terminal 11-1 and the terminal 11-2 can be stored side by side.

Furthermore, the storage case 251 is also provided with an electronic lock mechanism 261 for preventing the lid from being opened, and when the lock is released by the electronic lock mechanism 261, the user can open the lid and take out the terminal 11 from the storage case 251.

Figure 44:
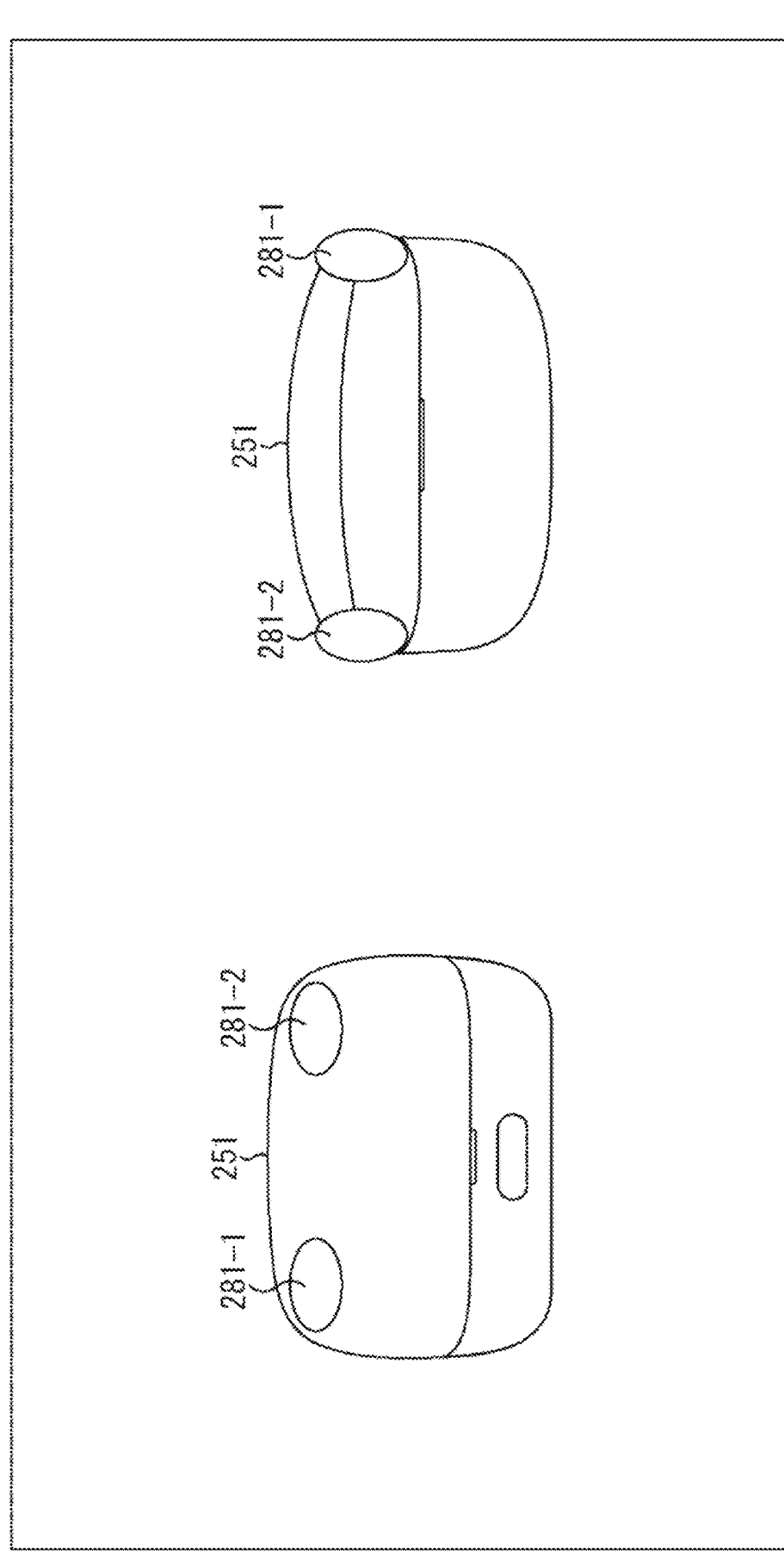
FIG. 44 is a diagram illustrating an example of an arrangement position of the operation detection unit in the storage case.

In a case where the storage case 251 has the personal authentication function, for example, as illustrated in FIG. 44, an operation detection unit 281-1 and an operation detection unit 281-2 are provided at different positions in the storage case 251.

The operation detection unit 281-1 and the operation detection unit 281-2 are provided to detect a tap, that is, a tap input operation by the user, and include sensors similar to the operation detection unit 201 of the terminal 11.

Specifically, the operation detection unit 281-1 and the operation detection unit 281-2 include, for example, an IMU having an acceleration sensor or the like, an acceleration sensor, a gyro sensor, a geomagnetic sensor, an electrostatic sensor, a button, and the like. Note that, hereinafter, the operation detection unit 281-1 and the operation detection unit 281-2 are also simply referred to as the operation detection unit 281 in a case where it is not particularly necessary to distinguish them.

The operation detection unit 281 is a sensor for detecting a tap of the user with respect to a position (portion) where the operation detection unit 281 itself is provided in the storage case 251, and outputs a sensor output signal corresponding to the tap of the user with respect to the portion (position) where the operation detection unit 281 is provided.

For example, in the example on the left side in the drawing, when the storage case 251 is viewed from the front, the operation detection unit 281-1 and the operation detection unit 281-2 are arranged at respective positions on the left side and the right side of the upper lid.

Furthermore, for example, in the example on the right side in the drawing, when the storage case 251 is viewed from the rear, the operation detection unit 281-1 and the operation detection unit 281-2 are arranged slightly behind the left and right side surfaces of the storage case 251.

Note that the arrangement position of the operation detection unit 281 in the storage case 251 may be any position as long as the operation detection unit is arranged at mutually different positions such as left and right positions as viewed from the user.

At the time of authentication of the user or at the time of registration of authentication information, the user alternately performs a tap input operation on the portions of the operation detection unit 281 provided on the left and right sides of the storage case 251 to input a passcode.

Figure 45:
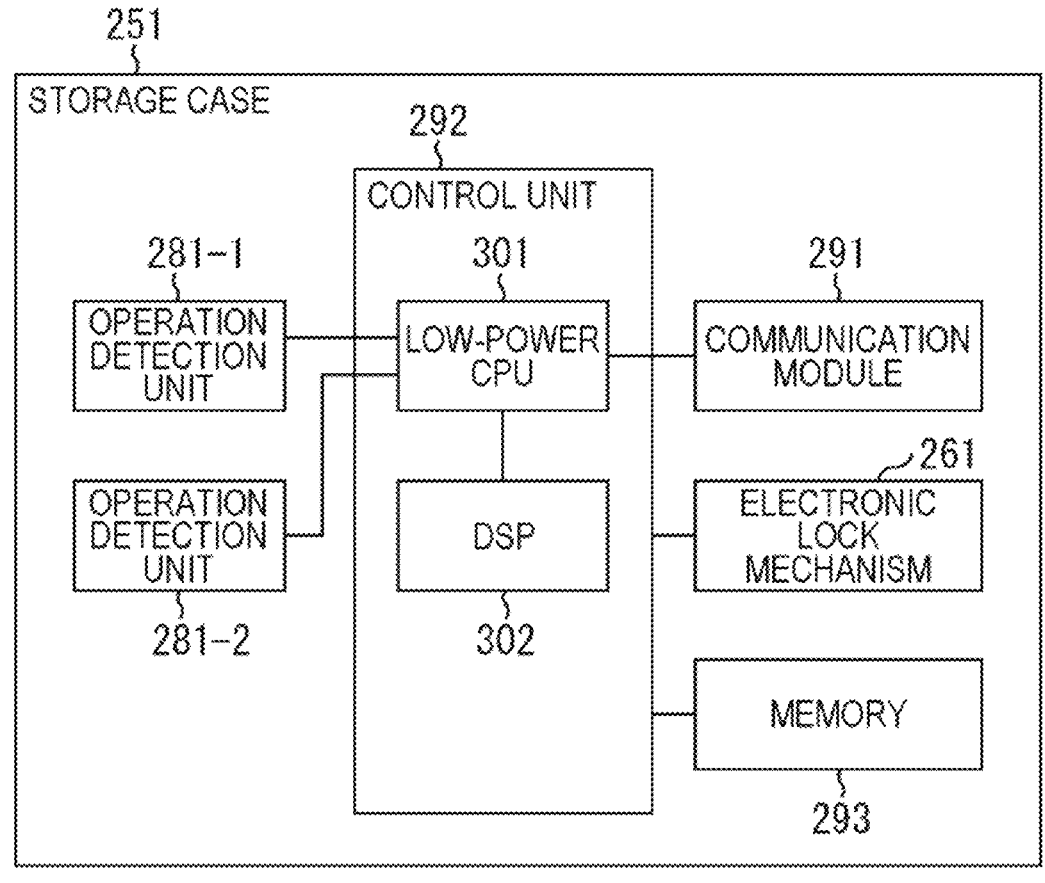
FIG. 45 is a diagram illustrating a configuration example of functions of a storage case.

FIG. 45 illustrates a functional configuration example of the storage case 251 as described above. Note that, in FIG. 45, portions corresponding to those in FIG. 43 or FIG. 44 are denoted by the same reference signs, and the description thereof will be omitted as appropriate.

The storage case 251 illustrated in FIG. 45 stores the terminal 11-1 and the terminal 11-2 worn on the left and right ears of the user, and also functions as a charger for charging the terminals 11.

The storage case 251 includes an operation detection unit 281-1, an operation detection unit 281-2, a communication module 291, a control unit 292, a memory 293, and the electronic lock mechanism 261.

The communication module 291 functions as a communication unit, and performs wireless communication with an information processing apparatus such as a smartphone or the terminal 11 by a communication scheme such as NFMI, Bluetooth (registered trademark), or Wi-Fi (registered trademark) under the control of the control unit 292.

The control unit 292 controls the entire operation of storage case 251.

For example, the control unit 292 supplies an authentication result or the like of the user to the communication module to cause the communication module 291 to transmit the authentication result or the like to the terminal 11, or supplies authentication information (passcode) input by the user to the memory to cause the memory 293 to record the authentication information or the like.

Furthermore, the control unit 292 includes a low-power CPU 301 having low power consumption and a DSP 302 having high power consumption and high performance.

The low-power CPU 301 and the DSP 302 correspond to the low-power CPU 51 and the DSP 52 of the terminal 11, and perform processes similar to those of the low-power CPU 51 and the DSP 52.

The electronic lock mechanism 261 performs locking such that the terminal 11 cannot be taken out from the storage case 251 according to the control of the control unit 292.

For example, the electronic lock mechanism 261 locks the lid of the storage case 251 so that the lid cannot be opened in the locked state.

The memory 293 is a nonvolatile recording unit, records various data such as authentication information supplied from the control unit 292, and supplies the recorded data to the control unit 292 as necessary.

<Description of Registration Process>

An operation of the storage case 251 having the personal authentication function will be described.

First, an operation at the time of registering authentication information (passcode) for authentication of an individual user will be described. That is, the registration process by the storage case 251 will be described below with reference to the flowchart in FIG. 46.

In step S401, the control unit 292 detects a tap input operation on one side on the basis of a sensor output signal supplied from the operation detection unit 281 on one of the left and right sides, such as the operation detection unit 281-1, for example, and holds tap number information indicating the detection result.

That is, in step S401, a tap input operation on the position where one operation detection unit 281 is provided in the storage case 251 is detected.

For example, in a case where the operation detection unit 281 includes an electrostatic sensor, the processing of step S401 is performed only by the low-power CPU 301 of the control unit 292.

In step S402, the control unit 292 detects a tap input operation on another side on the basis of a sensor output signal supplied from the operation detection unit 281 on the another side of the right and left sides, such as the operation detection unit 281-2, for example, and holds tap number information indicating a detection result.

That is, in step S402, the tap input operation with respect to the position where another operation detection unit 281 is provided in the storage case 251 is detected.

Note that, in a case where a light emitting unit such as a tally lamp is provided in the storage case 251, the control unit 292 may cause the light emitting unit to emit light according to a detection result each time a tap input operation on each of the left and right sides is detected. As a result, it is possible to notify the user that the tap input operation has been detected, the number of detected taps, and the like. In addition, the detection of the tap input operation and the notification of the number of taps in the tap input operation may be performed by sound, vibration, or the like.

In step S403, the control unit 292 determines whether or not to end the process for registering the authentication information.

For example, the control unit 292 determines to end the process in a case where a tap input operation has not been detected for a predetermined time or more, in a case where an operation indicating that the input of the passcode has ended has been detected, in a case where a tap input operation has been performed a prescribed number of times, or the like.

In addition, for example, it may be determined that the process is ended in a case where a registration end notification indicating that the registration of the passcode is ended is received from an information processing apparatus such as a smartphone wirelessly connected to the storage case 251.

In a case where it is determined in step S403 that the process is not yet ended, thereafter, the process returns to step S401, and the above-described processing is repeatedly performed.

On the other hand, in a case where it is determined in step S403 that the process is ended, processing of step S404 is then performed.

In step S404, the control unit 292 generates, as authentication information, information including the tap number information in each tap input operation input by the user in steps S401 and S402 and held, and supplies and records the authentication information in the memory 293. As a result, the authentication information for authentication of the user is registered.

Note that the control unit 292 may cause the authentication information to be recorded and supply the authentication information to the communication module 291 to cause the authentication information to be transmitted to the terminal 11 or the information processing apparatus such as a smartphone, or only the transmission of the authentication information may be performed instead of the recording of the authentication information.

That is, the control unit 292 may perform at least one of recording of the authentication information in the memory 293 and transmission of the authentication information to the terminal 11 or the like.

In a case where the authentication information is transmitted to terminal 11, the authentication information input on the storage case 251 side can be recorded in memory 202 of terminal 11. Therefore, in such a case, the registration of the authentication information can be performed in storage case 251, and the authentication of the user can also be performed on the terminal 11 side.

When the authentication information is registered, the registration process ends.

Note that, at this time, the control unit 292 may appropriately perform necessary processing so that a notification (presentation) indicating that the registration is completed may be appropriately made to the user on the storage case 251 side or the information processing apparatus side such as a smartphone connected wirelessly by display of an image, light emission, vibration, sound, or the like.

Furthermore, even in a case where such a registration process is performed, input of a passcode (registration of authentication information) may be performed again in response to a request or the like for re-registration performed by the user as appropriate. In such a case, the registration process is stopped in the middle in response to a request for redoing from the information processing apparatus, and thereafter, the registration process is newly started. That is, the registration process is performed again from the beginning by the storage case 251.

As described above, storage case 251 detects the tap input operation performed one or more times by the user alternately on the left and right, and generates and records the authentication information based on the detection result.

In this way, the personal authentication function can be realized without increasing the size of the terminal 11 by a simple operation called a tap input operation.

<Description of Authentication Process>

Next, an authentication process performed in the storage case 251 will be described.

Figure 47:
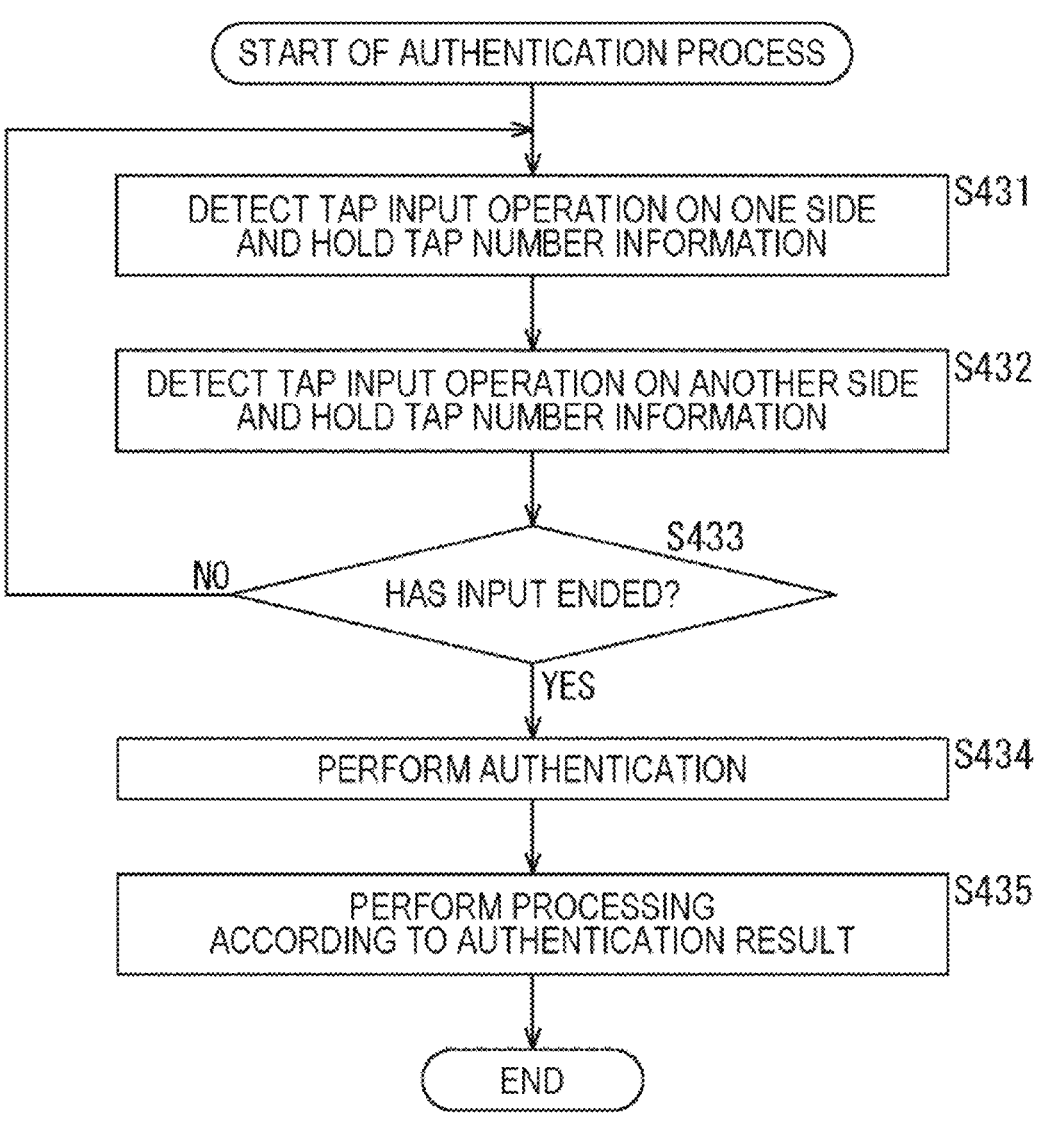
FIG. 47 is a flowchart for explaining an authentication process.

That is, the authentication process performed by the storage case 251 will be described below with reference to the flowchart of FIG. 47.

When the authentication process is started, processing of steps S431 and S432 is performed, and the tap input operation on each of the left and right sides performed by the user is detected.

Figure 46:
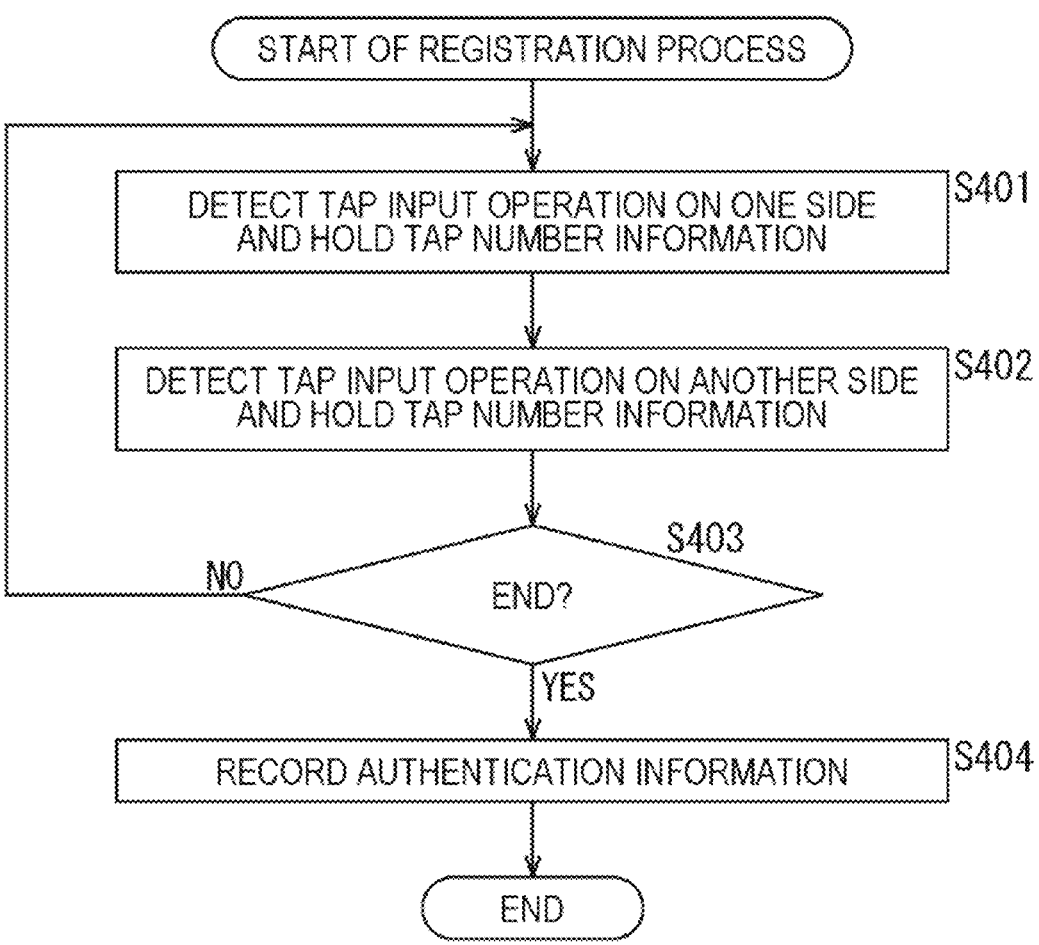
FIG. 46 is a flowchart illustrating a registration process.

Note that the processing in steps S431 and S432 is similar to the processing in steps S401 and S402 in FIG. 46, and thus the description thereof will be omitted.

In step S433, the control unit 292 determines whether or not the input of the passcode has ended.

For example, in step S433, in a case where the tap input operation has not been detected for a predetermined time or more, in a case where the operation indicating that the input of the passcode has ended has been detected, in a case where the tap input operation has been performed a prescribed number of times, or the like, it is determined that the input has ended.

In a case where it is determined in step S433 that the input has not been completed yet, thereafter, the process returns to step S431, and the above-described processing is repeatedly performed.

On the other hand, in a case where it is determined in step S433 that the input has ended, processing of step S434 is performed.

In step S434, the control unit 292 sets, as the number-of-times pattern information input at the time of authentication of the user, information that is input (obtained) by the user in steps S431 and S432 and includes the tap number information in one or a plurality of tap input operations on the left and right sides held. Then, the control unit 292 compares the number-of-times pattern information with authentication information recorded in advance in the memory 293, and performs authentication of the user.

In this case, in a case where the number-of-times pattern information matches the authentication information, it is determined that the authentication of the user has succeeded. That is, the user is authenticated as a valid user of the terminal 11.

On the other hand, in a case where the number-of-times pattern information does not match the authentication information, it is determined that the authentication of the user has failed.

In step S435, the control unit 292 performs processing according to the authentication result.

At this time, for example, the control unit 292 may notify the user that the authentication has succeeded or failed by light, sound, vibration, image display, or the like according to the authentication result.

In a case where the authentication of the user is successful, for example, the control unit 292 enables the user to use the terminal 11 stored in the storage case 251.

Specifically, for example, the control unit 292 controls the electronic lock mechanism 261 to release the locking of the lid of the storage case 251 so that the user can take out the terminal 11 from the storage case 251.

Furthermore, for example, when the terminal 11 is in the locked state, when the authentication of the user is successful, the control unit 292 may supply an authentication result notification indicating that the authentication is successful to the communication module 291 and cause the communication module to transmit the authentication result notification to the terminal 11.

In this case, the communication module 42 of the terminal 11 receives the authentication result notification transmitted from the storage case 251 and supplies the authentication result notification to the control unit 43. Then, the control unit 43 releases the locked state of the terminal 11 in response to the authentication result notification indicating that the authentication is successful supplied from the communication module 42, and sets the terminal to the usable state.

Note that the processing performed to enable the terminal 11 to be used may include, for example, at least one of releasing the locking by the electronic lock mechanism 261 and releasing the locked state of the terminal 11.

For example, in a case where the locked state is released or the locked state is maintained by the electronic lock mechanism 261 according to the result of the user authentication in the storage case 251, the user can take out the terminal 11 from the storage case 251 only when the authentication is successful. Therefore, in such a case, the terminal 11 may be always in the usable state. That is, it is not always necessary to provide the lock function in the terminal 11.

Furthermore, for example, in a case where the locked state of the terminal 11 is released when the authentication is successful, it is not always necessary to lock the lid by the electronic lock mechanism 261, and the user may always take out the terminal 11 from the storage case 251.

On the other hand, in a case where the authentication of the user fails, the control unit 292 keeps the terminal 11 stored in the storage case 251 unusable by the user.

For example, the control unit 292 keeps the locked state by the electronic lock mechanism 261 as it is and receives only an operation related to authentication.

Furthermore, at this time, the control unit 292 may supply an authentication result notification indicating that the authentication has failed to the communication module 291 and cause the communication module to transmit the authentication result notification to the terminal 11.

In this case, the communication module 42 of the terminal 11 receives the authentication result notification transmitted from the storage case 251 and supplies the authentication result notification to the control unit 43. Then, for example, the control unit 43 keeps the state of the terminal 11 in the locked state in response to the authentication result notification indicating that the authentication has failed supplied from the communication module 42.

Note that, as described above, the control of whether or not the terminal 11 is enabled to be used may be performed by at least one of, for example, control of locking by the electronic lock mechanism 261 and control of a state such as a locked state in the terminal 11.

When the processing of step S435 is performed and the user can use terminal 11 stored in storage case 251 or remains in an unusable state according to the result of the authentication, the authentication process ends.

As described above, the storage case 251 detects a tap input operation performed one or more times by the user alternately on the left and right, and performs authentication of the user using authentication information registered in advance. In this way, the authentication can be performed without increasing the size of the terminal 11 by a simple operation called a tap input operation.

Note that, in a case where the registration process described with reference to FIG. 46 is performed, and the authentication information obtained as a result is supplied to the terminal 11 and recorded, the authentication process illustrated in FIG. 47 does not necessarily need to be performed. In such a case, the processes described with reference to FIGS. 40 and 42 may be performed in the terminal 11.

Furthermore, the number of terminals 11 that can be stored in storage case 251 may be one. Moreover, the number of operation detection units 281 provided in the storage case 251 may be one or three or more. For example, in a case where there is one operation detection unit 281 provided in the storage case 251, the storage case 251 performs a process similar to the registration process described with reference to FIG. 41 and the authentication process described with reference to FIG. 42. In other words, the processing of step S402 is not performed in the registration process of FIG. 46, and the processing of step S432 is not performed in the authentication process of FIG. 47.

<Configuration Example of Computer>

Note that, the above-described series of processing may be executed by hardware or software. In a case where the series of processing is executed by the software, a program constituting the software is installed on a computer. Here, examples of the computer include a computer incorporated in dedicated hardware, and for example, a general-purpose personal computer capable of executing various functions by installing various programs.

Figure 48:
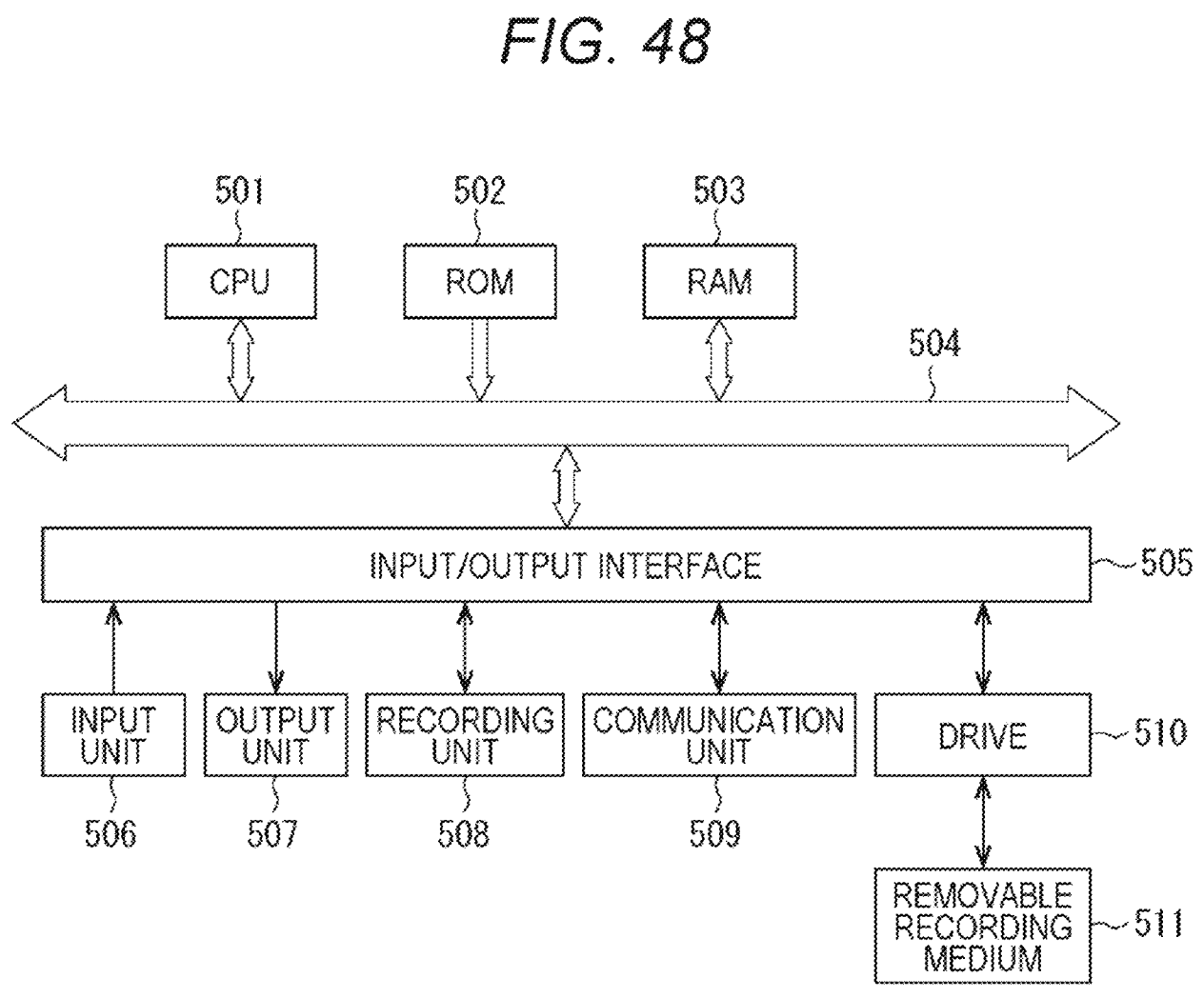

FIG. 48 is a block diagram illustrating a configuration example of hardware of a computer that executes the above-described series of processes by a program.

In the computer, a CPU 501, a read only memory (ROM) 502, and a random access memory (RAM) 503 are mutually connected by a bus 504.

Moreover, an input/output interface 505 is connected to the bus 504. An input unit 506, an output unit 507, a recording unit 508, a communication unit 509, and a drive 510 are connected to the input/output interface 505.

The input unit 506 includes a button, a microphone, and the like. The output unit 507 includes a speaker or the like. The recording unit 508 includes a nonvolatile memory or the like. The communication unit 509 includes a network interface and the like. The drive 510 drives a removable recording medium 511 such as a semiconductor memory.

In the computer configured as described above, the CPU 501 loads, for example, a program recorded in the recording unit 508 into the RAM 503 via the input/output interface 505 and the bus 504, and executes the program, so as to execute the above-described series of processing.

The program executed by the computer (CPU 501) can be provided by being recorded on the removable recording medium 511 as a package medium, or the like, for example. Furthermore, the program can be provided via a wired or wireless transmission medium such as a local area network, the Internet, or digital satellite broadcasting.

In the computer, the program can be installed in the recording unit 508 via the input/output interface 505 by mounting the removable recording medium 511 to the drive 510. Furthermore, the program can be received by the communication unit 509 via the wired or wireless transmission medium to be installed on the recording unit 508. In addition, the program can be installed in the ROM 502 or the recording unit 508 in advance.

Note that the program executed by the computer may be a program that performs processing in a time-series manner in the order described in the present specification, or may be a program that performs processing in parallel or at necessary timing such as when a call is made.

<Example of Hearing Aid System>

<Outline of Hearing Aid System>

Furthermore, the terminal 11 described in each of the above-described embodiments may be hearing aid equipment, that is, a hearing aid device. A hearing aid system including a hearing aid device will be described with reference to FIGS. 49 and 50. Hereinafter, the hearing device is simply referred to as a hearing aid.

Figure 49:
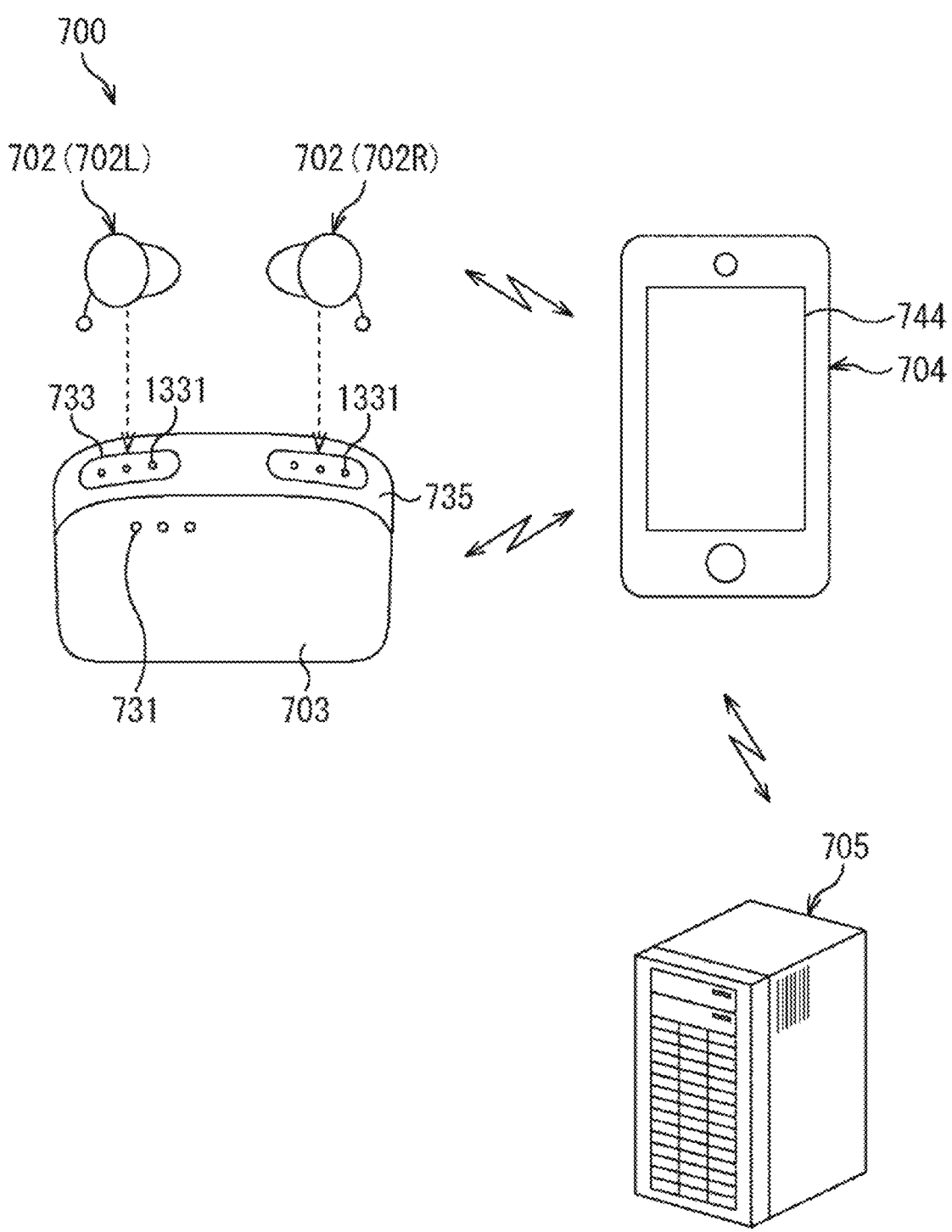
FIG. 49 is a diagram illustrating a schematic configuration of a hearing aid system.
Figure 50:
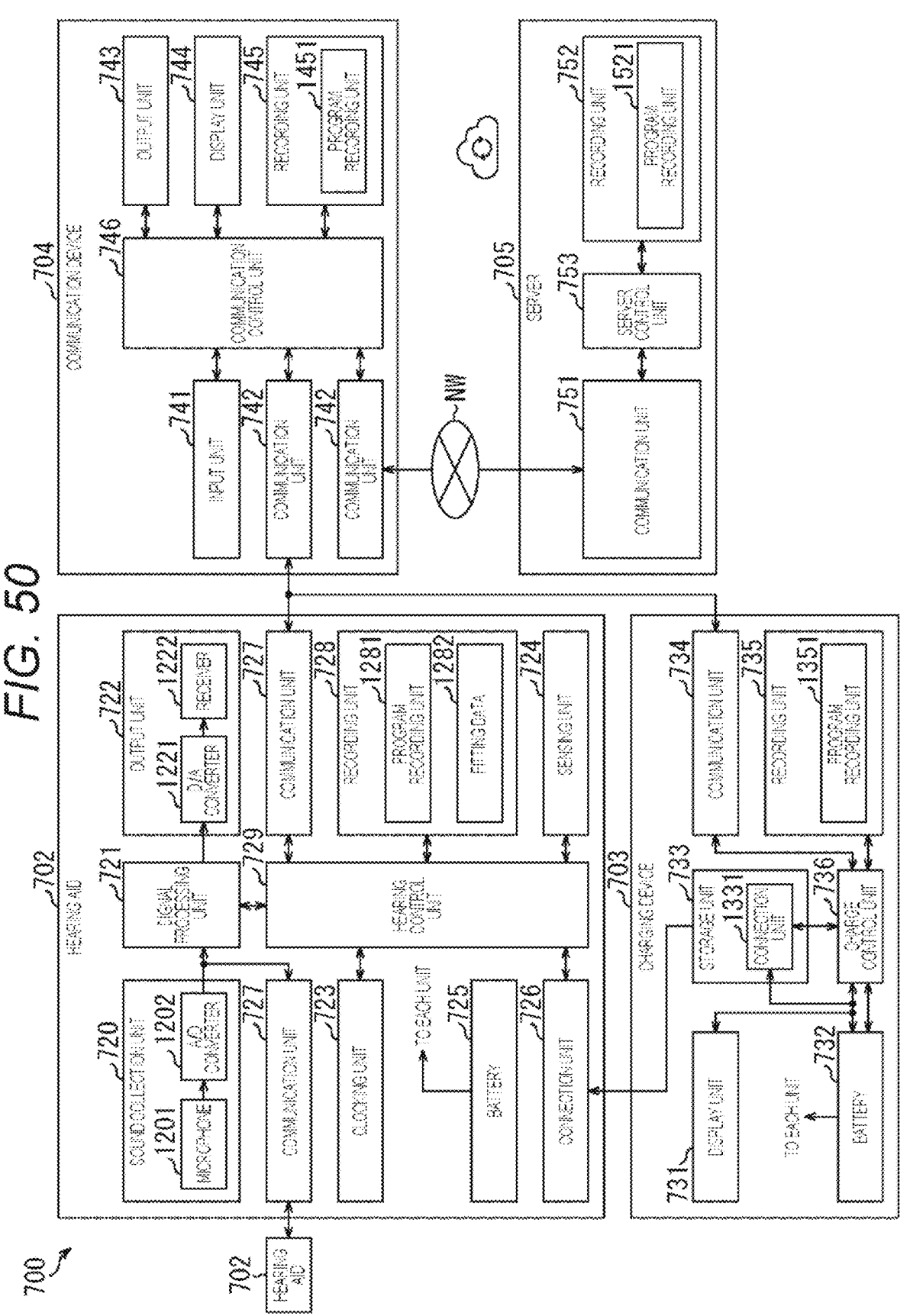
FIG. 50 is a block diagram illustrating a functional configuration of the hearing aid system.

FIG. 49 is a diagram illustrating a schematic configuration of a hearing aid system. FIG. 50 is a block diagram illustrating a functional configuration of the hearing aid system. An exemplified hearing aid system 700 includes a pair of left and right hearing aids 702, a charging device 703 (charging case) that stores the hearing aid 702 and charges the hearing aid 702, a communication device 704 such as a mobile phone capable of communicating with at least one of the hearing aid 702 and the charging device 703, and a server 705. Note that the storage case 251 described above can be used as the charging device 703, and the information processing apparatus 81 described above can be used as the communication device 704. Here, the hearing aid 702 may be, for example, a sound collector, or may be an earphone, a headphone, or the like having a hearing aid function. Furthermore, the hearing aid 702 may be configured by a single device instead of a pair of left and right devices.

Note that, in this example, a case where the hearing aid 702 is of the air conduction type will be described, but the present invention is not limited thereto, and for example, a bone conduction type can also be applied. Moreover, in this example, a case where the hearing aid 702 is an ear hole type (in-the-ear (ITE)/in-the-canal (ITC)/completely-in-the-canal (CIC)/invisible-in-the-canal (IIC), and the like) will be described, but the present invention is not limited thereto, and for example, an ear hook type (behind-the-ear (BTE)/receiver-in-the-canal (RIC), etc.), a headphone type, a pocket type, or the like can also be applied. Furthermore, in this example, a case where the hearing aid 702 is a binaural type will be described, but the present invention is not limited thereto, and can be applied to a single ear type to be worn on one of the left and right. In the following description, the hearing aid 702 to be worn on the right ear is referred to as hearing aid 702R, the hearing aid 702 to be worn on the left ear is referred to as hearing aid 702L, and in a case where one of the left and right is referred to, it is simply referred to as hearing aid 702.

<Configuration of Hearing Aid>

The hearing aid 702 includes a sound collection unit 720, a signal processing unit 721, an output unit 722, a clocking unit 723, a sensing unit 724, a battery 725, a connection unit 726, a communication unit 727, a recording unit 728, and a hearing control unit 729. Note that, in the example illustrated in FIG. 50, the communication unit 727 is divided into two. Each of the communication units 727 may be two separate functional blocks or may be the same one functional block.

The sound collection unit 720 includes a microphone 1201 and an A/D converter 1202. The microphone 1201 collects external sound, generates an analog sound signal (acoustic signal), and outputs the analog sound signal to the A/D converter 1202. The A/D converter 1202 performs A/D conversion processing on the analog sound signal input from the microphone 1201 and outputs a digital sound signal to the signal processing unit 721. Note that the sound collection unit 720 may include both an outer (feed-forward) sound collection unit and an inner (feedback) sound collection unit, or may include either one.

Under the control of the hearing control unit 729, the signal processing unit 721 performs predetermined signal processing on the digital audio signal input from the sound collection unit 720 and outputs the digital audio signal to the output unit 722. More specific examples of the signal processing include filtering processing of separating an audio signal for each predetermined frequency band, amplification processing of amplifying the audio signal with a predetermined amplification amount for each predetermined frequency band on which the filtering processing has been performed, noise reduction processing, noise canceling processing, beamforming processing, howling cancellation processing, and the like. The signal processing unit 721 includes a memory and a processor having hardware such as a digital signal processor (DSP). When the user enjoys the stereophonic content using the hearing aid 702, the signal processing unit 721 or the hearing control unit 729 may perform various kinds of stereophonic processing such as rendering processing and convolution processing such as a head related transfer function (HRTF). Furthermore, in the case of stereophonic sound content corresponding to head tracking, the head tracking processing may be performed by the signal processing unit 721 or the hearing control unit 729.

The output unit 722 includes a D/A converter 1221 and a receiver 1222. The D/A converter 1221 performs a D/A conversion process on the digital audio signal input from the signal processing unit 721 and outputs the digital audio signal to the receiver 1222. The receiver 1222 outputs an output sound (sound) corresponding to the analog sound signal input from the D/A converter 1221. The receiver 1222 is configured using, for example, a speaker or the like. For example, the receiver 1222 functions as the sound output unit 44 described with reference to FIGS. 4 and 38, and outputs a hearing aid sound or the like.

The clocking unit 723 clocks the date and time and outputs the clocking result to the hearing control unit 729. The clocking unit 723 is configured using a timing generator, a timer having a clocking function, or the like.

The sensing unit 724 receives an activation signal for activating the hearing aid 702 and an input from various sensors to be described later, and outputs the received activation signal to the hearing control unit 729. The sensing unit 724 includes various sensors. Examples of the sensor include a wearing sensor, a touch sensor, a position sensor, a motion sensor, and a biological sensor. Examples of the mounting sensor include an electrostatic sensor, an IR sensor, and an optical sensor. Examples of the touch sensor include a push switch, a button, and a touch panel (for example, an electrostatic sensor). An example of the position sensor is a global positioning system (GPS) sensor or the like. Examples of the motion sensor include an acceleration sensor and a gyro sensor. Examples of the biological sensor include a heart rate sensor, a body temperature sensor, and a blood pressure sensor. The processing contents in the signal processing unit 721 and the hearing control unit 729 may be changed according to the external sound collected by the sound collection unit 720 and various data sensed by the sensing unit 724 (the type of the external sound, the position information of the user, and the like). Furthermore, a wake word or the like from the user may be collected by the sensing unit 724, and voice recognition processing based on the collected wake word or the like may be performed by the signal processing unit 721 or the hearing control unit 729. Moreover, the sensing unit 724 can also function as the IMU 41 or the operation detection unit 201 described above.

The battery 725 supplies power to each unit constituting the hearing aid 702. The battery 725 is configured using a rechargeable secondary battery, for example, a lithium ion battery. Note that the battery 725 may be other than the above-described lithium ion battery. For example, a zinc-air battery which has been widely used in hearing aids may be used. The battery 725 is charged by power supplied from the charging device 703 via the connection unit 726.

When the hearing aid 702 is stored in the charging device 703 to be described later, the connection unit 726 is connected to the connection unit 1331 of the charging device

703, receives power and various types of information from the charging device 703, and outputs various types of information to the charging device 703. The connection unit 726 is configured using, for example, one or a plurality of pins.

Under the control of the hearing control unit 729, the communication unit 727 bidirectionally communicates with the charging device 703 or the communication device 704 according to a predetermined communication standard. The predetermined communication standard is, for example, a communication standard such as a wireless LAN or BT. The communication unit 727 is configured using a communication module or the like. Furthermore, in a case where communication is performed among the plurality of hearing aids 702, for example, a short-range wireless communication standard such as BT, near field magnetic induction (NFMI), or near field communication (NFC) may be used. For example, the communication unit 727 functions as the communication module 42 described above with reference to FIGS. 4 and 38.

The recording unit 728 records various types of information regarding the hearing aid 702. The recording unit 728 includes a random access memory (RAM), a read only memory (ROM), a memory card, and the like. The recording unit 728 includes a program recording unit 1281 and fitting data 1282. For example, the recording unit 728 functions as the memory 202 described above with reference to FIG. 38 and records various types of information.

The program recording unit 1281 records, for example, a program executed by the hearing aid 702, various kinds of data during processing of the hearing aid 702, a log at the time of use, and the like.

The fitting data 1282 includes adjustment data of various parameters of the hearing device used by the user, for example, a hearing aid gain for each frequency band set on the basis of a hearing measurement result (audiogram) of the user who is a patient or the like, a maximum output sound pressure, and the like. Specifically, the fitting data 1282 includes a threshold ratio of a multiband compressor, ON/OFF of various signal processing for each use scene, intensity setting, and the like. Furthermore, in addition to the user's hearing measurement result (audiogram), adjustment data or the like of various parameters included in the hearing aid device used by the user, which is set on the basis of an exchange between the user and the audiologist, a user input on an app as an alternative thereto, calibration involving measurement, or the like, may be included. Note that various parameters included in the hearing aid device may be finely adjusted through, for example, counseling with an expert. Moreover, the fitting data 1282 may also include a user's hearing measurement result (audiogram), which is data that does not generally need to be stored in the hearing aid main body, an adjustment formula (for example, NAL-NL, DSL, and the like) used for fitting, and the like. The fitting data 1282 may be stored not only in the recording unit 728 inside the hearing aid 702 but also in the communication device 704 or the server 705. The fitting data may be stored in both the recording unit 728 inside the hearing aid 702, the communication device 704, and the server 705. For example, by storing the fitting data in the server 705, it is possible to update the fitting data to the fitting data reflecting the user's taste, the degree of change in the user's hearing due to aging, and the like, and by downloading the fitting data to the edge device side such as the hearing aid 702, each user can always use the fitting data optimized for himself/herself, and it is expected that the user experience is further improved.

The hearing control unit 729 controls each unit constituting the hearing aid 702. The hearing control unit 729 includes a memory and a processor having hardware such as a central processing unit (CPU) and a DSP. The hearing control unit 729 reads and executes the program recorded in the program recording unit 1281 in the work area of the memory, and controls each component or the like through the execution of the program by the processor, so that the hardware and the software cooperate with each other to realize a functional module matching a predetermined purpose. For example, the hearing control unit 729 functions as the control unit 43 described above with reference to FIGS. 4 and 38. Note that one or both of the hearing control unit 729 and the signal processing unit 721 may function as the control unit 43.

<Configuration of Charging Device>

The charging device 703 includes a display unit 731, a battery 732, a storage unit 733, a communication unit 734, a recording unit 735, and a charge control unit 736.

The display unit 731 displays various states related to the hearing aid 702 under the control of the charge control unit 736. For example, the display unit 731 displays information indicating that the hearing aid 702 is being charged or that charging has been completed, and information indicating that various types of information have been received from the communication device 704 or the server 705. The display unit 731 is configured using a light emitting diode (LED), a graphical user interface (GUI), or the like.

The battery 732 supplies power to each unit constituting the hearing aid 702 and the charging device 703 stored in the storage unit 733 via a connection unit 1331 provided in the storage unit 733 described later. Note that power may be supplied to the hearing aid 702 stored in the storage unit 733 and each unit constituting the charging device 703 by the battery 732 included in the charging device 703, or power may be wirelessly supplied from an external power supply, for example, as in the Qi standard (registered trademark). The battery 732 is configured using a secondary battery, for example, a lithium ion battery. Note that, in this embodiment, in addition to the battery 732, a power supply circuit that supplies power to the hearing aid 702 by DC/DC conversion that converts AC power supplied from the outside into DC power and then converts the DC power into a predetermined voltage may be further provided.

The storage unit 733 individually stores the left and right hearing aids 702. Furthermore, the storage unit 733 is provided with the connection unit 1331 connectable to the connection unit 726 of the hearing aid 702.

When the hearing aid 702 is stored in the storage unit 733, the connection unit 1331 is connected to the connection unit 726 of the hearing aid 702, transmits power from the battery 732 and various types of information from the charge control unit 736, receives various types of information from the hearing aid 702, and outputs the information to the charge control unit 736. The connection unit 1331 is configured using, for example, one or a plurality of pins.

The communication unit 734 communicates with the communication device 704 according to a predetermined communication standard under the control of the charge control unit 736. The communication unit 734 is configured using a communication module. Note that power may be wirelessly supplied from the above-described external power supply to the hearing aid 702 and the charging device 703 via the communication unit 727 of the hearing aid 702 and the communication unit 734 of the charging device 703. Furthermore, the communication unit 727 of the hearing aid

702 and the communication unit 734 of the charging device 703 may communicate with each other to exchange various types of information.

The recording unit 735 includes a program recording unit 1351 that records various programs executed by the charging device 703. The recording unit 735 includes a RAM, a ROM, a flash memory, a memory card, and the like. For example, after the firmware update program is acquired from the server 705 via the communication unit 734 and stored in the recording unit 735, the firmware update may be performed while the hearing aid 702 is stored in the storage unit 733. Note that the firmware update may be directly performed from the server 705 via the communication unit 727 of the hearing aid 702 without via the communication unit 734 of the charging device 703. The firmware update program may be stored not in the recording unit 735 of the charging device 703 but in the recording unit 728 of the hearing aid 702.

The charge control unit 736 controls each unit constituting the charging device 703. For example, in a case where the hearing aid 702 is stored in the storage unit 733, the charge control unit 736 supplies power from the battery 732 via the connection unit 1331. The charge control unit 736 is configured using a memory and a processor having hardware such as a CPU or a DSP. The charge control unit 736 reads and executes the program recorded in the program recording unit 1351 in the work area of the memory, and controls each component and the like through the execution of the program by the processor, whereby the hardware and the software cooperate to realize a functional module matching a predetermined purpose.

Note that, in a case where the charging device 703 is caused to function as the storage case 251 illustrated in FIG. 45, for example, the charge control unit 736, the communication unit 734, and the recording unit 735 can be caused to function as the control unit 292, the communication module 291, and the memory 293. In this case, at least the operation detection unit 281 of the operation detection unit 281 and the electronic lock mechanism 261 is provided in the charging device 703.

<Configuration of Communication Device>

The communication device 704 includes an input unit 741, a communication unit 742, an output unit 743, a display unit 744, a recording unit 745, and a communication control unit 746. Note that, in the example illustrated in FIG. 50, the communication unit 742 is divided into two. Each of the communication units 742 may be two separate functional blocks or may be the same one functional block.

The input unit 741 receives inputs of various operations from the user, and outputs a signal corresponding to the received operation to the communication control unit 746. The input unit 741 includes a switch, a touch panel, and the like.

The communication unit 742 communicates with the charging device 703, the hearing aid 702, or the server 705 under the control of the communication control unit 746. The communication unit 742 is configured using a communication module.

The output unit 743 outputs a sound volume of a predetermined sound pressure level for each predetermined frequency band under the control of the communication control unit 746. The output unit 743 is configured using a speaker or the like.

The display unit 744 displays various types of information regarding the communication device 704 and information regarding the hearing aid 702 under the control of the communication control unit 746. The display unit 744 includes a liquid crystal display, an organic electroluminescent display (EL display), or the like.

The recording unit 745 records various types of information regarding the communication device 704. The recording unit 745 includes a program recording unit 1451 that records various programs executed by the communication device 704. The recording unit 745 is configured using a recording medium such as a RAM, a ROM, a flash memory, or a memory card.

The communication control unit 746 controls each unit constituting the communication device 704. The communication control unit 746 includes a memory and a processor having hardware such as a CPU. The communication control unit 746 reads and executes the program recorded in the program recording unit 1451 in the work area of the memory, and controls each component and the like through the execution of the program by the processor, whereby the hardware and the software cooperate to realize a functional module matching a predetermined purpose.

Note that, in a case where the communication device 704 is caused to function as the information processing apparatus 81 illustrated in FIG. 33, for example, the input unit 741, the communication unit 742, the display unit 744, the recording unit 745, and the communication control unit 746 can be caused to function as the input unit 91, the communication unit 93, the display unit 92, the recording unit 94, and the control unit 95 of the information processing apparatus 81.

<Configuration of Server>

The server 705 includes a communication unit 751, a recording unit 752, and a server control unit 753.

The communication unit 751 communicates with the communication device 704 via a network NW under the control of the server control unit 753. The communication unit 751 is configured using a communication module. An example of the network NW is a Wi-Fi (registered trademark) network or the like.

The recording unit 752 records various types of information regarding the server 705. The recording unit 752 includes a program recording unit 1521 that records various programs executed by the server 705. The recording unit 752 is configured using a recording medium such as a RAM, a ROM, a flash memory, or a memory card.

The server control unit 753 controls each unit constituting the server 705. The server control unit 753 includes a memory and a processor having hardware such as a CPU. The server control unit 753 reads and executes the program recorded in the program recording unit 1521 in the work area of the memory, and controls each component and the like through the execution of the program by the processor, whereby the hardware and the software cooperate to realize a functional module matching a predetermined purpose.

<Example of Utilization of Data>

The data obtained in connection with the utilization of the hearing device may be utilized in various ways. An example will be described with reference to FIG. 51.

Figure 51:
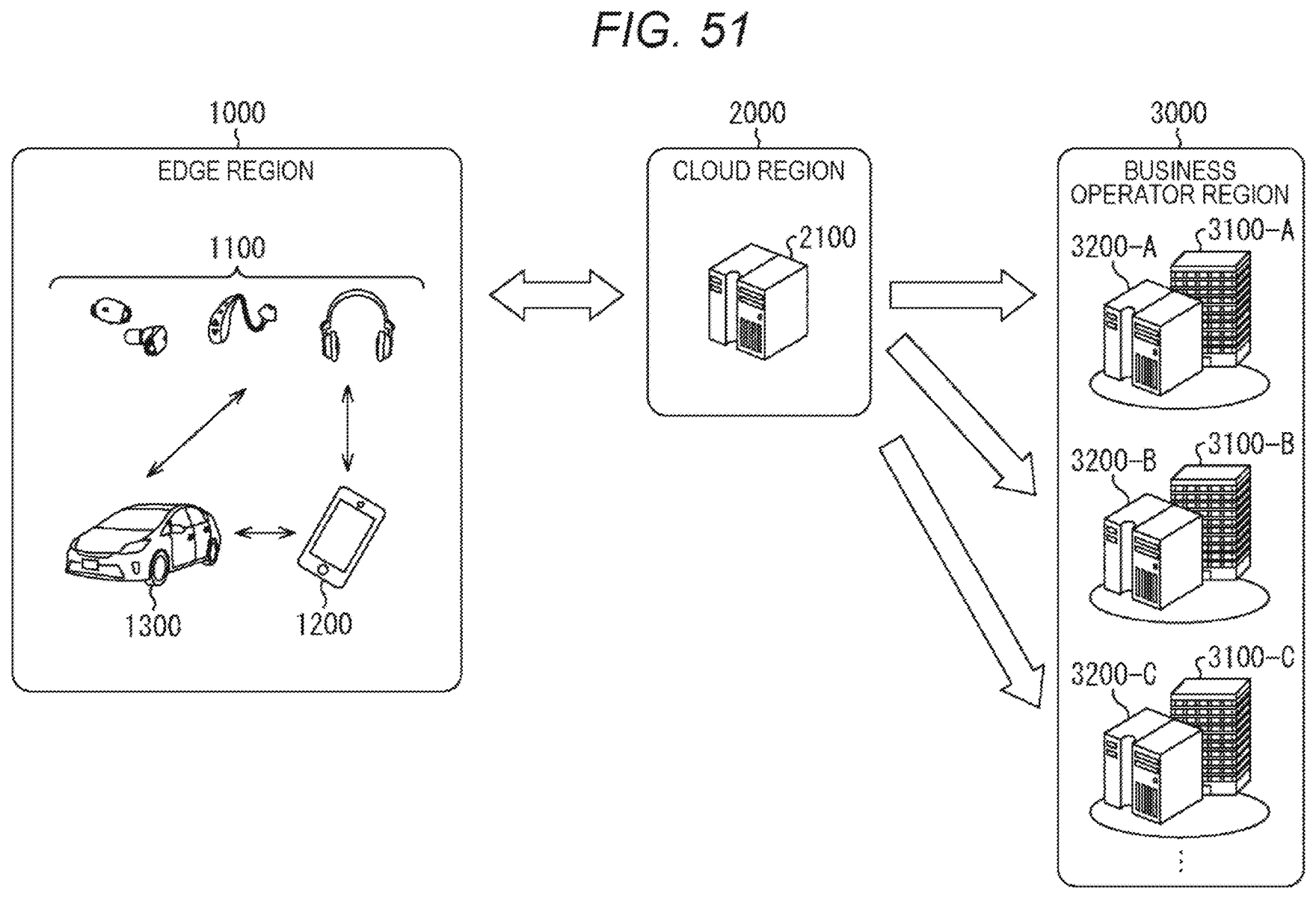

FIG. 51 is a diagram illustrating an example of data utilization. In the illustrated system, there are an edge region 1000, a cloud region 2000, and a business operator region 3000. Examples of elements in the edge region 1000 include a sound producing device 1100, a peripheral device 1200, and a vehicle 1300. A server device 2100 is exemplified as an element in the cloud region 2000. A business operator 3100 and a server device 3200 are exemplified as elements in the business operator region 3000.

The sound producing device 1100 in the edge region 1000 is used by being worn by the user or arranged near the user so as to emit a sound toward the user. Specific examples of the sound producing device 1100 include an earphone, a headset, and a hearing aid. For example, the terminal 11 described with reference to FIG. 4 or FIG. 38, the hearing aid 702 described with reference to FIG. 49, or the like may be used as the sound producing device 1100.

The peripheral device 1200 and the vehicle 1300 in the edge region 1000 are devices used together with the sound producing device 1100, and transmit signals such as content viewing sound and speech sound to the sound producing device 1100, for example. The sound producing device 1100 outputs a sound corresponding to a signal from the peripheral device 1200 or the vehicle 1300 to the user. A specific example of the peripheral device 1200 is a smartphone or the like. For example, the information processing apparatus 81 described above with reference to FIG. 33 may be used as the peripheral device 1200.

Within the edge region 1000, various data regarding utilization of the sound producing device 1100 may be obtained. A description will be given with reference to FIG. 52.

FIG. 52 is a diagram illustrating an example of data. Examples of data that can be acquired in the edge region 1000 include device data, use history data, personalized data, biometric data, emotional data, application data, fitting data, and preference data. Note that the data may be understood as meaning of information, and they may be appropriately read as long as there is no contradiction. Various known methods may be used to acquire the exemplified data.

The device data is data related to the sound producing device 1100, and includes, for example, type data of the sound producing device 1100, specifically, data identifying that the sound producing device 1100 is an earphone, a headphone, a TWS, a hearing aid (CIC, ITE, RIC, etc.), or the like.

The use history data is use history data of the sound producing device 1100, and includes, for example, data such as a music exposure dose, a continuous use time of a hearing aid, and a content viewing history (a viewing time and the like). The use history data can be used for safe listening, hearing aid of TWS, replacement notification of wax guard, and the like.

The personalized data is data related to the user of the sound producing device 1100, and includes, for example, an individual HRTF, an ear canal characteristic, a type of earwax, and the like. Data such as hearing may also be included in the personalized data.

The biometric data is biometric data of the user of the sound producing device 1100, and includes, for example, data such as perspiration, blood pressure, body temperature, blood flow, and brain waves.

The emotional data is data indicating the emotion of the user of the sound producing device 1100, and includes, for example, data indicating comfort, discomfort, or the like.

The application data is data used in various applications and includes, for example, data such as the position of the user of the sound producing device 1100 (which may be the position of the sound producing device 1100), schedule, age, gender, and the like, and data such as weather. For example, the position data may be useful to look for a missing sound producing device 1100 (such as HA).

The fitting data may be the fitting data 1282 described above with reference to FIG. 50, and includes, for example, data such as hearing (which may be derived from an audiogram), adjustment of sound image orientation, and beamforming. Data such as behavioral characteristics may also be included in the fitting data.

The preference data is data related to the preference of the user, and includes, for example, data such as the preference of music to listen during driving.

The above-described data is an example, and data other than the above-described data may be acquired. For example, data of a communication band, a communication status, data of a charging status of the sound producing device 1100, and the like may also be acquired. A part of the processing in the edge region 1000 may be executed by the cloud region 2000 according to the band, the communication status, the charging status, and the like. By sharing the processing, the processing load in the edge region 1000 is reduced.

Returning to FIG. 51, for example, data as described above is acquired in the edge region 1000 and transmitted from the sound producing device 1100, the peripheral device 1200, or the vehicle 1300 to the server device 2100 in the cloud region 2000. The server device 2100 stores (storage, accumulation, etc.) the received data.

The business operator 3100 in the business operator region 3000 uses the server device 3200 to acquire data from the server device 2100 in the cloud region 2000. The data can be used by the business operator 3100.

There may be different business operators 3100. Specific examples of the business operator 3100 are a hearing aid store, a hearing aid manufacturer, a content production company, a distribution business operator providing a music streaming service, and the like, which are referred to as a business operator 3100-A, a business operator 3100-B, and a business operator 3100-C so as to distinguish them. The corresponding server device 3200 is referred to as a server device 3200-A, a server device 3200-B, and a server device 3200-C in the drawing. Various data are provided to such various business operators 3100, and utilization of the data is promoted. The data provision to the business operator 3100 may be, for example, data provision by subscription, recurring, or the like.

Data can also be provided from the cloud region 2000 to the edge region 1000. For example, in a case where machine learning is required to realize processing in the edge region 1000, data for feedback, correction, and the like of learning data is prepared by an administrator or the like of the server device 2100 in the cloud region 2000. The prepared data is transmitted from the server device 2100 to the sound producing device 1100, the peripheral device 1200, or the vehicle 1300 in the edge region 1000.

In a case where a specific condition is satisfied in the edge region 1000, some incentive (benefit such as premium service) may be provided to the user. An example of the condition is that at least some devices of the sound producing device 1100, the peripheral device 1200, and the vehicle 1300 are devices provided by the same business. In a case of an incentive (electronic coupon or the like) that can be electronically supplied, the incentive may be transmitted from the server device 2100 to the sound producing device 1100, the peripheral device 1200, or the vehicle 1300.

<Example of Cooperation with Another Device>

In the edge region 1000, for example, the sound producing device 1100 may cooperate with another device using the peripheral device 1200 such as a smartphone as a hub. An example will be described with reference to FIG. 53.

Figure 53:
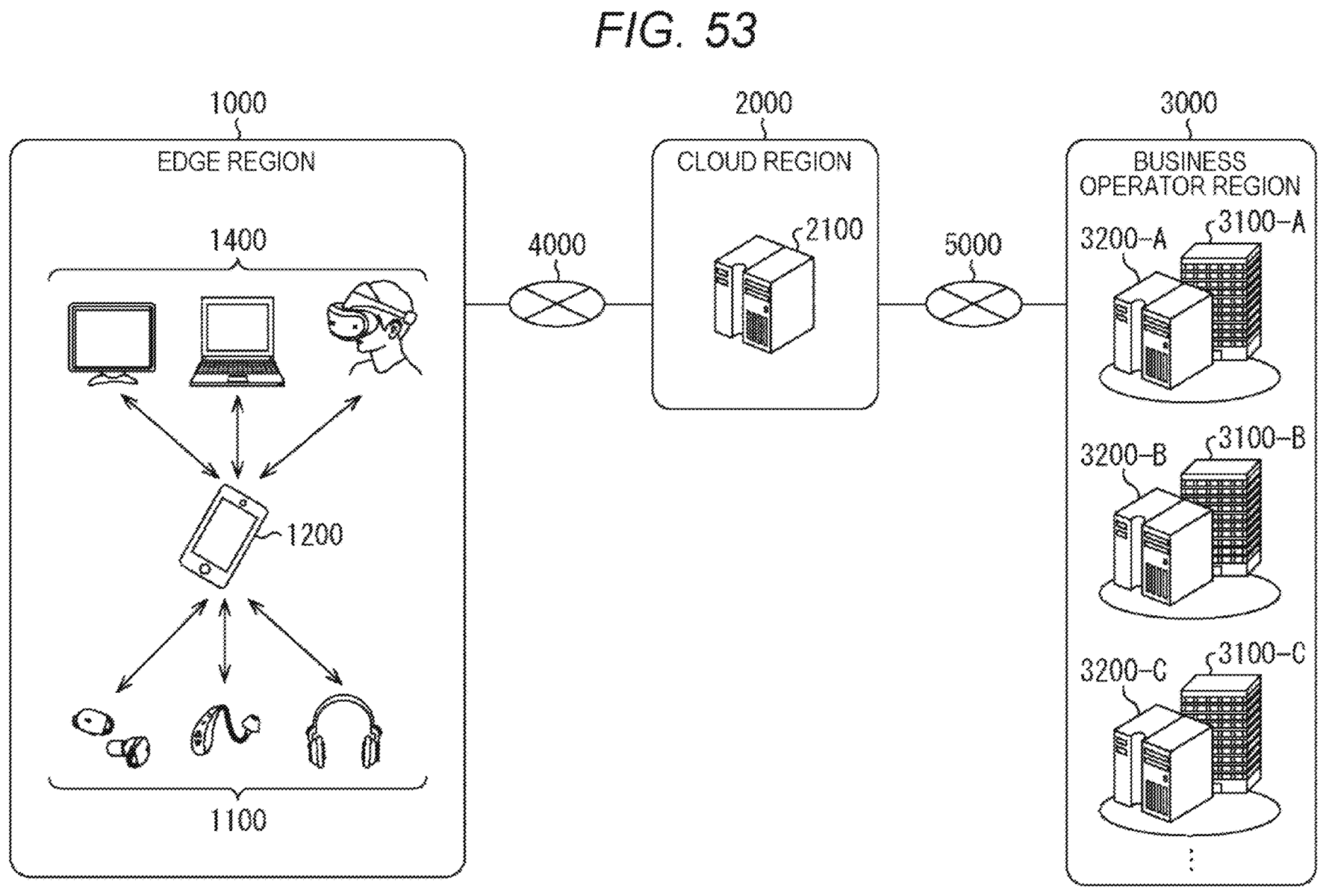

FIG. 53 is a diagram illustrating an example of cooperation with another device. The edge region 1000, the cloud region 2000, and the business operator region 3000 are connected by a network 4000 and a network 5000. A smartphone is exemplified as the peripheral device 1200 in the edge region 1000, and other devices 1400 are also exemplified as elements in the edge region 1000. Note that illustration of the vehicle 1300 (FIG. 51) is omitted.

The peripheral device 1200 can communicate with each of the sound producing device 1100 and the other devices 1400. The communication method is not particularly limited, but for example, Bluetooth LDAC, Bluetooth LE Audio described above, or the like may be used. Communication between the peripheral device 1200 and the other devices 1400 may be multicast communication. An example of the multicast communication is Auracast (registered trademark) or the like.

The other devices 1400 are used in cooperation with the sound producing device 1100 via the peripheral device 1200. Specific examples of the other devices 1400 include a television, a personal computer, and a head mounted display (HMD).

An incentive may also be provided to the user in a case where the sound producing device 1100, the peripheral device 1200, and the other devices 1400 satisfy a specific condition (for example, a condition that at least a part thereof is provided by the same business operator).

The sound producing device 1100 and the other devices 1400 can cooperate with the peripheral device 1200 as a hub. The cooperation may be performed using various data stored in the server device 2100 in the cloud region 2000. For example, information such as fitting data, viewing time, and hearing of the user is shared between the sound producing device 1100 and the other devices 1400, whereby volume adjustment and the like of each device are performed in cooperation. When a hearing aid (HA) or a sound collector (personal sound amplification product (PSAP)) is worn, setting for HA or PSAP can be automatically performed on a television, a PC, or the like. For example, when the user who uses HA uses another device such as a television or a PC, processing of automatically changing the setting of the other device may be performed so that the setting suitable for the user who uses HA becomes a setting suitable for a normal listener. Note that whether or not the user is using HA may be determined by automatically sending information indicating that the user wears HA (for example, wearing detection information) to a device such as a television, a PC, or the like as a pairing destination of HA when the user wears HA, or may be detected by using approach of the user using HA to another device such as a target television, a PC, or the like as a trigger. Furthermore, by imaging the face of the user with a camera or the like provided in another device such as a television, a PC, or the like, it may be determined that the user is an HA user, or may be determined by a method other than the above-described method. The earphone can also function as a hearing aid. A hearing aid can also be used in a style as if listening to music (action, appearance, etc.). The earphone/headphone and the hearing aid have many technically overlapping parts, and it is assumed that the barrier between the earphone/headphone and the hearing aid disappears in the future, and one device has functions of both the earphone and the hearing aid. When the hearing is normal, that is, in a case where the hearing is lowered due to aging or the like, the hearing aid can function as a hearing aid by turning on the hearing aid function. Since the device as the earphone can be used as it is as a hearing aid, continuous and long-term use by the user can be expected also from the viewpoint of appearance and design.

Data of the user's listening history may be shared. Prolonged listening can be a risk for future hearing loss. Notification or the like to the user may be performed so that the listening time does not become too long. For example, when the viewing time exceeds a predetermined threshold value, such a notification is made (safe listening). The notification may be performed by any device in the edge region 1000.

At least a part of the devices used in the edge region 1000 may be provided by a different operator. Information regarding device settings and the like of each business may be transmitted from the server device 3200 in the business operator region 3000 to the server device 2100 in the cloud region 2000 and stored in the server device 2100. By using such information, it is also possible to cooperate between devices provided by different service providers.

<Example of Application Transition>

The application of the sound producing device 1100 may transition according to various situations including the fitting data of the user, the viewing time, the hearing ability, and the like as described above. An example will be described with reference to FIG. 54.

FIG. 54 is a diagram illustrating an example of application transition. When the user is a normal listener, in this example, the sound producing device 1100 is used as headphones or earphones (headphones/TWS) while the user is a child and for a while after becoming an adult. In addition to the safe listening described above, adjustment of the equalizer, processing (For example, the noise canceling mode is switched to an optimal noise canceling mode for a scene in which the user is at a restaurant and a scene in which the user is on a vehicle) according to the user's behavior characteristic, current location, and external environment, collection of a viewing music log, and the like are performed. Communication between devices using Auracast is also used.

As the user's hearing declines, the hearing aid function of the sound producing device 1100 begins to be utilized. In this example, the sound producing device 1100 is used as an over the counter (OTC) hearing aid while the user has weak hearing, mild hearing or moderate hearing loss. When the user has severe hearing loss, the sound producing device 1100 is used as a hearing aid. Note that the OTC hearing aid is a hearing aid that is sold at a store without going through an expert, and has the ease of purchase without going through an expert such as a hearing test or an audiologist. A specific operation of the hearing aid such as fitting may be performed by the user himself/herself. While the sound producing device 1100 is used as an OCT hearing aid or a hearing aid, hearing measurement is performed or a hearing aid function is turned on. Furthermore, various types of information regarding hearing (hearing big data) are collected, fitting, sound environment adaptation, remote support, and the like are performed, and a transcription is performed.

The embodiment of the present technology is not restricted to the embodiments described above, and various modifications can be made without departing from the spirit of the present technology.

For example, the present technology may be configured as cloud computing in which one function is shared by a plurality of devices over the network to process together.

Furthermore, each step described in the flowchart described above can be executed by one device or executed by a plurality of devices in a shared manner.

Moreover, in a case where a plurality of processing is included in one step, the plurality of the processing included in the one step can be executed by one device or by a plurality of devices in a shared manner.

Moreover, the present technology may also have following configurations.

(1)
An information processing apparatus worn on one ear of a user, the information processing apparatus including:
a sensor that performs measurement related to vibration;
a communication unit that transmits an intensity value of vibration obtained from an output of the sensor to another information processing apparatus worn on another ear of the user, and receives the intensity value detected by the another information processing apparatus from the another information processing apparatus; and
a control unit that detects a tap operation on the basis of the intensity value obtained from the output of the sensor and the intensity value received from the another information processing apparatus.

(2)
The information processing apparatus according to (1), in which
the control unit detects a peak of a signal related to vibration on the basis of the output of the sensor, and
the communication unit transmits the intensity value at the peak.

(3)
The information processing apparatus according to (2), in which
the communication unit transmits the intensity value every time the peak is detected.

(4)
The information processing apparatus according to (2) or (3), in which
the control unit detects the tap operation on the basis of the output of the sensor; and
determines a detection result of the tap operation on the basis of a comparison result between the intensity value obtained from the output of the sensor and the intensity value received from the another information processing apparatus.

(5)
The information processing apparatus according to (4), in which
in a case where the intensity value has not been transmitted from the another information processing apparatus even after a predetermined timeout period has elapsed, the control unit determines the detection result of the tap operation without comparing the intensity values.

(6)
The information processing apparatus according to (5), in which
the control unit determines the timeout period on the basis of at least one of a communication time, a radio wave condition, and a communication scheme with the another information processing apparatus.

(7)
The information processing apparatus according to any one of (4) to (6), in which
the control unit includes:
a first processor that detects the peak based on the output of the sensor; and
a second processor that has higher power consumption than the first processor and detects the tap operation on the basis of the output of the sensor, and
the first processor activates the second processor to detect the tap operation when the peak is detected.

(8)
The information processing apparatus according to any one of (4) to (7), in which the control unit makes a discrimination on whether or not the output of the sensor is a signal corresponding to the tap operation on the basis of the output of the sensor, and determines a final detection result of the tap operation on the basis of a result of the discrimination and the detection result of the tap operation.

(9)

The information processing apparatus according to any one of (4) to (8), in which in a case where a predetermined peak does not satisfy a condition determined by a positional relationship among a plurality of the peaks including the predetermined peak or a relationship between the intensity values, the control unit determines that the predetermined peak is not the peak corresponding to a tap.

(10)

The information processing apparatus according to any one of (4) to (9), in which the control unit determines the detection result of the tap operation on the basis of a comparison result between a maximum value of one or a plurality of the intensity values obtained from the output of the sensor and a maximum value of one or a plurality of the intensity values received from the another information processing apparatus.

(11)

The information processing apparatus according to any one of (1) to (10), in which the control unit detects the tap operation on a periphery of an ear of the user.

(12)

The information processing apparatus according to any one of (1) to (11), in which the tap operation is a double tap operation or a triple tap operation.

(13)

The information processing apparatus according to any one of (1) to (12), further including a sound output unit that outputs a sound on the basis of audio data received from a reproduction control device.

(14)

An information processing method executed in an information processing apparatus including a sensor that performs measurement related to vibration, and being worn on one ear of a user, the information processing method including:

transmitting an intensity value of vibration obtained from an output of the sensor to another information processing apparatus worn on another ear of the user;

receiving the intensity value detected by the another information processing apparatus from the another information processing apparatus; and detecting a tap operation on the basis of the intensity value obtained from the output of the sensor and the intensity value received from the another information processing apparatus.

(15)

A program for causing a computer that controls an information processing apparatus including a sensor that performs measurement related to vibration and being worn on one ear of a user to execute processing of:

transmitting an intensity value of vibration obtained from an output of the sensor to another information processing apparatus worn on another ear of the user;

receiving the intensity value detected by the another information processing apparatus from the another information processing apparatus; and detecting a tap operation on the basis of the intensity value obtained from the output of the sensor and the intensity value received from the another information processing apparatus.

(16)

An information processing apparatus including:

an operation detection unit that detects a tap by a user; and a control unit that, in a case where a continuous hit start operation of continuously tapping a predetermined number of times is detected, reproduces once a sound effect corresponding to a continuous hit operation of continuously tapping the predetermined number of times or more, and executes a function assigned to the continuous hit operation by changing a control value by one step, and that, in a case where a continuous hit continuation operation of tapping one or more times within a predetermined time is detected after the continuous hit start operation is detected, reproduces the sound effect once, and executes the function by changing the control value by one step.

(17)

The information processing apparatus according to (16), in which the control unit reproduces the sound effect once and executes the function by changing the control value by one step in a case where a next continuous hit continuation operation is detected after the continuous hit continuation operation is detected.

(18)

The information processing apparatus according to (16) or (17), in which a detection condition is different between the continuous hit start operation and the continuous hit continuation operation.

(19)

The information processing apparatus according to (18), in which a time interval between taps at which the continuous hit continuation operation is detected is longer than a time interval between taps at which the continuous hit start operation is detected.

(20)

The information processing apparatus according to (18) or (19), in which an intensity of a tap on which the continuous hit continuation operation is detected is weaker than an intensity of a tap on which the continuous hit start operation is detected.

(21)

The information processing apparatus according to any one of (16) to (20), in which the information processing apparatus is worn on an ear of the user.

(22)

The information processing apparatus according to (21), in which the operation detection unit is a sensor that performs measurement related to vibration.

(23)

The information processing apparatus according to (22), further including a communication unit that transmits an intensity value of vibration obtained from an output of the sensor to another information processing apparatus worn on another ear of the user and receives the intensity value detected by the another information processing apparatus from the another information processing apparatus, in which the control unit determines a detection result of the continuous hit start operation or the continuous hit continuation operation on the basis of a comparison result between the intensity value obtained from the output of the sensor and the intensity value received from the another information processing apparatus.

(24)

The information processing apparatus according to any one of (16) to (23), further including a communication unit that receives setting information indicating a setting result related to the function assigned to the continuous hit operation, in which the control unit detects at least one of the continuous hit start operation and the continuous hit continuation operation on the basis of the setting information, or executes the function assigned to the continuous hit operation on the basis of the setting information.

(25)

An information processing method executed in an information processing apparatus, the information processing method including:

detecting a tap by a user;

in a case where a continuous hit start operation of continuously tapping a predetermined number of times is detected, reproducing once a sound effect corresponding to a continuous hit operation of continuously tapping the predetermined number of times or more, and executing a function assigned to the continuous hit operation by changing a control value by one step; and in a case where a continuous hit continuation operation of tapping one or more times within a predetermined time is detected after the continuous hit start operation is detected, reproducing the sound effect once, and executing the function by changing the control value by one step.

(26)

A program for causing a computer to execute processing including steps of:

detecting a tap by a user;

in a case where a continuous hit start operation of continuously tapping a predetermined number of times is detected, reproducing once a sound effect corresponding to a continuous hit operation of continuously tapping the predetermined number of times or more, and executing a function assigned to the continuous hit operation by changing a control value by one step; and in a case where a continuous hit continuation operation of tapping one or more times within a predetermined time is detected after the continuous hit start operation is detected, reproducing the sound effect once, and executing the function by changing the control value by one step.

(27)

An information processing system including: a terminal that is worn by a user, detects a tap operation by the user, and executes a function assigned to the tap operation; and an information processing apparatus, in which the information processing apparatus includes:

a first control unit that displays a setting screen for a setting related to the function and generates setting information indicating a setting result related to the function according to an operation on the setting screen; and a first communication unit that transmits the setting information to the terminal, and the terminal includes:

a second communication unit that receives the setting information from the information processing apparatus; and a second control unit that detects the tap operation on the basis of the setting information or executes the function assigned to the tap operation on the basis of the setting information.

(28)

The information processing system according to (27), in which the setting related to the function is at least one of selection of the function to be assigned to the tap operation, designation of a changeable range of a control value when the function is executed, and designation of a condition related to detection of the tap operation.

(29)

The information processing system according to (27) or (28), in which the tap operation is a continuous hit operation in which tapping is continuously performed a predetermined number of times or more.

(30)

An information processing apparatus including:

a control unit that displays a setting screen for a setting related to a function assigned to a tap operation by a user, the function being executed in a terminal worn by the user, and generates setting information indicating a setting result related to the function according to an operation on the setting screen; and a communication unit that transmits the setting information to the terminal.

(31)

The information processing apparatus according to (30), in which the setting related to the function is at least one of selection of the function to be assigned to the tap operation, designation of a changeable range of a control value when the function is executed, and designation of a condition related to detection of the tap operation.

(32)

The information processing apparatus according to (30) or (31), in which the tap operation is a continuous hit operation in which tapping is continuously performed a predetermined number of times or more.

(33)

An information processing method executed in an information processing apparatus, the information processing method including:

displaying a setting screen for a setting related to a function assigned to a tap operation by a user, the function being executed in a terminal worn by the user, and generating setting information indicating a setting result related to the function according to an operation on the setting screen; and transmitting the setting information to the terminal.

(34)

A program for causing a computer to execute processing including steps of:

displaying a setting screen for a setting related to a function assigned to a tap operation by a user, the function being executed in a terminal worn by the user, and generating setting information indicating a setting result related to the function according to an operation on the setting screen; and transmitting the setting information to the terminal.

(35)

An information processing apparatus worn on one ear of a user, the information processing apparatus including:

a control unit that detects one or a plurality of taps on a side of the one ear as a tap input operation and holds tap number information indicating a number of taps performed in the tap input operation; and a communication unit that receives the tap number information of the tap input operation performed on a side of another ear of the user transmitted from another information processing apparatus worn on the another ear, in which the control unit records in a recording unit information indicating a combination of the tap number information of the tap input operation alternately performed one or a plurality of times on the side of the one ear and the side of the another ear as authentication information to be registered for authentication of the user, or sets the information as number-of-times pattern information input by the user at a time of authentication, and performs authentication of the user on the basis of the number-of-times pattern information and the authentication information recorded in advance.

(36)

The information processing apparatus according to (35), further including a sound output unit that reproduces a sound effect for grasping the number of taps in the tap input operation in a case where the tap input operation is performed on the side of the one ear.

(37)

The information processing apparatus according to (35) or (36), further including a sound output unit that reproduces a sound effect indicating a result of the authentication of the user.

(38)

The information processing apparatus according to any one of (35) to (37), in which in a case where the authentication of the user is successful, the control unit releases a locked state of the information processing apparatus and sets the information processing apparatus in a usable state.

(39)

The information processing apparatus according to any one of (35) to (38), in which the control unit detects the one or plurality of taps around the one ear on a head of the user as the tap input operation.

(40)

The information processing apparatus according to any one of (35) to (38), in which the control unit detects the one or plurality of taps on the information processing apparatus worn on the one ear as the tap input operation.

(41)

The information processing apparatus according to any one of (35) to (40), in which in a case where a request to perform a registration process again is made during the registration process for registering the authentication information, the registration process including detection of the tap input operation on the side of the one ear, reception of the tap number information of the tap input operation detected on the side of the another ear, and recording of the authentication information, the control unit performs the registration process again from beginning.

(42)

An information processing method executed in an information processing apparatus worn on one ear of a user, the information processing method including:

detecting one or a plurality of taps on a side of the one ear as a tap input operation and holding tap number information indicating a number of taps performed in the tap input operation;

receiving the tap number information of the tap input operation performed on a side of another ear of the user transmitted from another information processing apparatus worn on the another ear; and recording in a recording unit information indicating a combination of the tap number information of the tap input operation alternately performed one or a plurality of times on the side of the one ear and the side of the another ear as authentication information to be registered for authentication of the user, or setting the information as number-of-times pattern information input by the user at a time of authentication, and performing authentication of the user on the basis of the number-of-times pattern information and the authentication information recorded in advance.

(43)

A program for causing a computer that controls an information processing apparatus worn on one ear of a user to execute processing including steps of:

detecting one or a plurality of taps on a side of the one ear as a tap input operation and holding tap number information indicating a number of taps performed in the tap input operation;

receiving the tap number information of the tap input operation performed on a side of another ear of the user transmitted from another information processing apparatus worn on the another ear; and recording in a recording unit information indicating a combination of the tap number information of the tap input operation alternately performed one or a plurality of times on the side of the one ear and the side of the another ear as authentication information to be registered for authentication of the user, or setting the information as number-of-times pattern information input by the user at a time of authentication, and performing authentication of the user on the basis of the number-of-times pattern information and the authentication information recorded in advance.

(44)

An information processing apparatus worn on one ear of a user, the information processing apparatus including a control unit that detects one or a plurality of taps on a side of the one ear as a tap input operation and holds tap number information indicating a number of taps performed in the tap input operation, in which the control unit records in a recording unit information indicating a combination of the tap number information of the tap input operation performed one or a plurality of times as authentication information to be registered for authentication of the user, or sets the information as number-of-times pattern information input by the user at a time of authentication, and performs authentication of the user on the basis of the number-of-times pattern information and the authentication information recorded in advance.

(45)

The information processing apparatus according to (44), further including a sound output unit that reproduces a sound effect for grasping the number of taps in the tap input operation in a case where the tap input operation is performed.

(46)

The information processing apparatus according to (44) or (45), further including a sound output unit that reproduces a sound effect indicating a result of the authentication of the user.

(47)

The information processing apparatus according to any one of (44) to (46), in which in a case where the authentication of the user is successful, the control unit releases a locked state of the information processing apparatus and sets the information processing apparatus in a usable state.

(48)

The information processing apparatus according to any one of (44) to (47), in which the control unit detects the one or plurality of taps around the one ear on a head of the user as the tap input operation.

(49)

The information processing apparatus according to any one of (44) to (47), in which the control unit detects the one or plurality of taps on the information processing apparatus as the tap input operation.

(50)

The information processing apparatus according to any one of (44) to (49), in which in a case where a request to perform a registration process again is made during the registration process for registering the authentication information, the registration process including detection of the tap input operation and recording of the authentication information, the control unit performs the registration process again from beginning.

(51)

An information processing method executed in an information processing apparatus worn on one ear of a user, the information processing method including:

detecting one or a plurality of taps on a side of the one ear as a tap input operation and holding tap number information indicating a number of taps performed in the tap input operation; and recording in a recording unit information indicating a combination of the tap number information of the tap input operation performed one or a plurality of times as authentication information to be registered for authentication of the user, or setting the information as number-of-times pattern information input by the user at a time of authentication, and performing authentication of the user on the basis of the number-of-times pattern information and the authentication information recorded in advance.

(52)

A program for causing a computer that controls an information processing apparatus worn on one ear of a user to execute processing including steps of:

detecting one or a plurality of taps on a side of the one ear as a tap input operation and holding tap number information indicating a number of taps performed in the tap input operation; and recording in a recording unit information indicating a combination of the tap number information of the tap input operation performed one or a plurality of times as authentication information to be registered for authentication of the user, or setting the information as number-of-times pattern information input by the user at a time of authentication, and performing authentication of the user on the basis of the number-of-times pattern information and the authentication information recorded in advance.

(53)

A storage case that stores terminals worn on left and right ears of a user, the storage case including:

a first operation detection unit that is provided at a predetermined position and outputs a sensor output signal according to a tap on the predetermined position by the user;

a second operation detection unit that is provided at another position different from the predetermined position and outputs a sensor output signal according to a tap on the another position by the user; and a control unit that detects one or a plurality of the taps on the predetermined position as a tap input operation on the basis of the sensor output signal supplied from the first operation detection unit and holds tap number information indicating a number of taps performed in the tap input operation on the predetermined position, and detects the tap input operation on the another position on the basis of the sensor output signal supplied from the second operation detection unit and holds the tap number information of the tap input operation on the another position, in which the control unit sets information indicating a combination of the tap number information of the tap input operation alternately performed one or a plurality of times at the predetermined position and the another position as authentication information to be registered for authentication of the user, and causes at least one of recording of the authentication information in a recording unit and transmission of the authentication information to be performed.

(54)

The storage case according to (53), in which the control unit sets the information obtained at a time of authentication of the user as number-of-times pattern information input by the user, and performs authentication of the user on the basis of the number-of-times pattern information and the authentication information recorded in advance.

(55)

The storage case according to (54), in which in a case where the authentication of the user is successful, the control unit sets the terminals stored in the storage case in a usable state.

(56)

The storage case according to (55), further including an electronic lock mechanism that performs locking such that the terminals cannot be taken out from the storage case, in which the control unit releases the locking in a case where the authentication of the user is successful.

(57)

The storage case according to (55), in which in a case where the authentication of the user is successful, the control unit causes an authentication result notification indicating that the authentication of the user is successful to be transmitted to the terminals.

(58)

The storage case according to any one of (53) to (57), in which the storage case functions as a charger.

(59)

The storage case according to any one of (53) to (58), in which in a case where a request to perform a registration process again is made during the registration process for registering the authentication information, the registration process including detection of the tap input operation and recording or transmission of the authentication information, the control unit performs the registration process again from beginning.

(60)

An information processing method executed in a storage case that stores terminals worn on left and right ears of a user, the storage case including:

a first operation detection unit that is provided at a predetermined position and outputs a sensor output signal according to a tap on the predetermined position by the user; and a second operation detection unit that is provided at another position different from the predetermined position and outputs a sensor output signal according to a tap on the another position by the user, the information processing method including:

detecting one or a plurality of the taps on the predetermined position as a tap input operation on the basis of the sensor output signal supplied from the first operation detection unit and holding tap number information indicating a number of taps performed in the tap input operation on the predetermined position, and detecting the tap input operation on the another position on the basis of the sensor output signal supplied from the second operation detection unit and holding the tap number information of the tap input operation on the another position; and setting information indicating a combination of the tap number information of the tap input operation alternately performed one or a plurality of times at the predetermined position and the another position as authentication information to be registered for authentication of the user, and performing at least one of recording of the authentication information in a recording unit and transmission of the authentication information.

(61)

A program for causing a computer that controls a storage case that stores terminals worn on left and right ears of a user, the storage case including:

a first operation detection unit that is provided at a predetermined position and outputs a sensor output signal according to a tap on the predetermined position by the user; and a second operation detection unit that is provided at another position different from the predetermined position and outputs a sensor output signal according to a tap on the another position by the user, to execute processing including steps of:

detecting one or a plurality of the taps on the predetermined position as a tap input operation on the basis of the sensor output signal supplied from the first operation detection unit and holding tap number information indicating a number of taps performed in the tap input operation on the predetermined position, and detecting the tap input operation on the another position on the basis of the sensor output signal supplied from the second operation detection unit and holding the tap number information of the tap input operation on the another position; and setting information indicating a combination of the tap number information of the tap input operation alternately performed one or a plurality of times at the predetermined position and the another position as authentication information to be registered for authentication of the user, and performing at least one of recording of the authentication information in a recording unit and transmission of the authentication information.

REFERENCE SIGNS LIST

11-1, 11-2, 11 Terminal
41 IMU
42 Communication module
43 Control unit
44 Sound output unit
51 Low-power CPU
52 DSP

The invention claimed is:

1. An information processing apparatus worn on one ear of a user, the information processing apparatus comprising:

a sensor that performs measurement related to vibration; and at least one processor configured to:

transmit an intensity value of vibration obtained from an output of the sensor to another information processing apparatus worn on another ear of the user, and receive the intensity value detected by the another information processing apparatus from the another information processing apparatus; and detect a tap operation on a basis of the intensity value obtained from the output of the sensor and the intensity value received from the another information processing apparatus;

detect a peak of a signal related to vibration on a basis of the output of the sensor;

transmit the intensity value at the peak;

determine a detection result of the tap operation on a basis of a comparison result between the intensity value obtained from the output of the sensor and the intensity value received from the another information processing apparatus; and in a case where the intensity value has not been transmitted from the another information processing apparatus even after a predetermined timeout period has elapsed, determine the detection result of the tap operation without comparing the intensity values.

2. The information processing apparatus according to claim 1, wherein the at least one processor is further configured to transmit the intensity value every time the peak is detected.

3. The information processing apparatus according to claim 1, wherein the at least one processor is configured to determine the timeout period on a basis of at least one of a communication time, a radio wave condition, and a communication scheme with the another information processing apparatus.

4. The information processing apparatus according to claim 1, wherein the at least one processor includes:

a first processor that detects the peak on the basis of the output of the sensor; and a second processor that has higher power consumption than the first processor and detects the tap operation on a basis of the output of the sensor, and the first processor activates the second processor to detect the tap operation when the peak is detected.

5. The information processing apparatus according to claim 1, wherein the at least one processor is configured to make a discrimination on whether or not the output of the sensor is a signal corresponding to the tap operation on a basis of the output of the sensor, and determine a final detection result of the tap operation on a basis of a result of the discrimination and the detection result of the tap operation.

6. The information processing apparatus according to claim 1, wherein in a case where a predetermined peak does not satisfy a condition determined by a positional relationship among a plurality of the peaks including the predetermined peak or a relationship between the intensity values, the at least one processor is configured to determine that the predetermined peak is not the peak corresponding to a tap.

7. The information processing apparatus according to claim 1, wherein the at least one processor is configured to determine the detection result of the tap operation on a basis of a comparison result between a maximum value of one or a plurality of the intensity values obtained from the output of the sensor and a maximum value of one or a plurality of the intensity values received from the another information processing apparatus.

8. The information processing apparatus according to claim 1, wherein the at least one processor is configured to detect the tap operation on a periphery of an ear of the user.

9. The information processing apparatus according to claim 1, wherein the tap operation is a double tap operation or a triple tap operation.

10. The information processing apparatus according to claim 1, wherein the at least one processor is further configured to output a sound on a basis of audio data received from a reproduction control device.

11. An information processing method executed in an information processing apparatus including a sensor that performs measurement related to vibration, and being worn on one ear of a user, the information processing method comprising:

transmitting an intensity value of vibration obtained from an output of the sensor to another information processing apparatus worn on another ear of the user;

receiving the intensity value detected by the another information processing apparatus from the another information processing apparatus; and detecting a tap operation on a basis of the intensity value obtained from the output of the sensor and the intensity value received from the another information processing apparatus;

detecting a peak of a signal related to vibration on a basis of the output of the sensor;

transmitting the intensity value at the peak;

determining a detection result of the tap operation on a basis of a comparison result between the intensity value obtained from the output of the sensor and the intensity value received from the another information processing apparatus; and in a case where the intensity value has not been transmitted from the another information processing apparatus even after a predetermined timeout period has elapsed, determining the detection result of the tap operation without comparing the intensity values.

12. At least one non-transitory computer-readable storage medium having instructions encoded thereon that, when executed by a computer that controls an information processing apparatus including a sensor that performs measurement related to vibration and being worn on one ear of a user, causes the computer to execute processing of:

transmitting an intensity value of vibration obtained from an output of the sensor to another information processing apparatus worn on another ear of the user;

receiving the intensity value detected by the another information processing apparatus from the another information processing apparatus; and detecting a tap operation on a basis of the intensity value obtained from the output of the sensor and the intensity value received from the another information processing apparatus;

detecting a peak of a signal related to vibration on a basis of the output of the sensor;

transmitting the intensity value at the peak;

determining a detection result of the tap operation on a basis of a comparison result between the intensity value obtained from the output of the sensor and the intensity value received from the another information processing apparatus; and in a case where the intensity value has not been transmitted from the another information processing apparatus even after a predetermined timeout period has elapsed, determining the detection result of the tap operation without comparing the intensity values.

* * * * *